（12） United States Patent
Chien

(10) Patent No.: US 12,104,779 B2
(45) Date of Patent: Oct. 1, 2024

(54) LED DESK/FLOOR LAMP

(71) Applicant: Tseng-Lu Chien, Walnut, CA (US)

(72) Inventor: Tseng-Lu Chien, Walnut, CA (US)

(73) Assignees: Aaron Chien, Walnut, CA (US); Te-Ju Chien, Walnut, CA (US); Hsin-Yi Chien, Walnut, CA (US)

( * ) Notice: Subject to any disclaimer, the term of this patent is extended or adjusted under 35 U.S.C. 154(b) by 325 days.

(21) Appl. No.: 16/715,625

(22) Filed: Dec. 16, 2019

(65) Prior Publication Data

US 2020/0263868 A1 Aug. 20, 2020

Related U.S. Application Data

(60) Division of application No. 14/870,601, filed on Sep. 3, 2015, now Pat. No. 10,753,598, and a
(Continued)

(51) Int. Cl.
*F21V 33/00* (2006.01)
*F21V 23/06* (2006.01)
(Continued)

(52) U.S. Cl.
CPC .......... *F21V 33/0048* (2013.01); *F21V 23/06* (2013.01); *F21V 33/0004* (2013.01);
(Continued)

(58) Field of Classification Search
CPC ................ F21V 33/0048; F21V 23/06; F21V 33/0004; F21W 2131/30; F21Y 2115/10; H02J 7/00
See application file for complete search history.

(56) References Cited

U.S. PATENT DOCUMENTS 6,474,823 B1  11/2002  Agata et al.
6,666,563 B2  12/2003  Brown
(Continued)

FOREIGN PATENT DOCUMENTS

CN  101949528 A  *  1/2011
CN  202484719 U  *  10/2012
DE  202009009433 U1  *  12/2009  ............. E04H 15/10

*Primary Examiner* — Daniel Cavallari
(74) *Attorney, Agent, or Firm* — BACON & THOMAS, PLLC

(57) ABSTRACT

A desktop USB device has power-wire(s) or storage-wire arrangement. The device has more than one separated distance away USB-Unit(s) by branch-wire(s) and have wire storage arrangement for at least one of an USB jump-wire, an AC power-wire, USB-charger wire or another charging related wire(s). The USB device and separated USB-Unit(s) to be installed on a desktop or floor at a hand-reachable distance from people, and install or attach anywhere by attachment so that there is no need for people to bend body or knee to get the USB-port(s) to charge i-phone or Tablet(s). The current invention use shortest #14 gauge AC wire for power strips and use long length of #18 gauge to supply DC power to USB ports built-in separated USB-unit(s) the charger. The USB-charger power-wire arrangement has by at least one main-wire and plurality of branch-wire(s) to connect with at least one of separated and distance away USB-Unit(s) incorporated with external USB-wire has at least 2 ends with male USB-plug to connect with each unit has at least one of female receiving USB-port(s) inside USB Unit(s), that can supply a desired output-current in the range of from 110 A to 50 A and at USB needed VDC by converting input AC power ranging from 110 VAC to 250 VAC. The USB device or power station may also optional to incorporate with at least one additional device such as at least one of (i) AC outlet, (2) sensor(s), (3) motion sensor, (4) remote controller, (5) time display, (6) LEDs, (7) IC, (8)

(Continued)

2nd LED(s) (9) Detector for charging status and system, (10) power fail device, (11) diffusor equipment, (12) color changing, color selection, function selection for LED(s) light illumination.

3 Claims, 19 Drawing Sheets

Related U.S. Application Data continuation-in-part of application No. 14/793,262, filed on Jul. 7, 2015, now abandoned, which is a continuation of application No. 14/642,169, filed on Mar. 9, 2015, now abandoned, which is a continuation of application No. 12/950,017, filed on Nov. 19, 2010, now Pat. No. 8,998,462, application No. 16/715,625, filed on Dec. 16, 2019 is a continuation-in-part of application No. 14/834,613, filed on Nov. 10, 2015, now Pat. No. 10,574,069, which is a continuation-in-part of application No. 14/827,810, filed on Aug. 17, 2015, now Pat. No. 10,476,286, which is a continuation-in-part of application No. 14/643,026, filed on Mar. 10, 2015, now Pat. No. 11,271,408, which is a continuation-in-part of application No. 14/144,703, filed on Dec. 31, 2013, now Pat. No. 11,239,667, application No. 16/715,625, filed on Dec. 16, 2019 is a continuation-in-part of application No. 13/117,227, filed on May 27, 2011, now abandoned, and a continuation-in-part of application No. 15/458,498, filed on Mar. 14, 2017, now Pat. No. 10,371,361, which is a continuation-in-part of application No. 13/367,816, filed on Feb. 7, 2012, now Pat. No. 8,944,669, which is a continuation-in-part of application No. 12/938,628, filed on Nov. 3, 2010, now abandoned.

(51) Int. Cl.
*F21W 131/30* (2006.01)
*F21Y 115/10* (2016.01)
*H02J 7/00* (2006.01)

(52) U.S. Cl.
CPC ...... *F21W 2131/30* (2013.01); *F21Y 2115/10* (2016.08); *H02J 7/00* (2013.01)

(56) References Cited

U.S. PATENT DOCUMENTS

| | | |
|---|---|---|
| 7,679,317 B2 | 3/2010 | Veselic |
| 7,736,033 B2 | 6/2010 | Patel |
| 7,897,277 B2 | 3/2011 | Meyer et al. |
| 8,432,667 B2 | 4/2013 | Strauser |
| 8,545,039 B2 | 10/2013 | Patel |
| 8,562,187 B2 | 10/2013 | Smed |
| 8,687,392 B2 | 4/2014 | Sims |
| 8,758,031 B2 | 6/2014 | Cheng et al. |
| 8,783,936 B2 | 7/2014 | Chien |
| 8,853,884 B2 | 10/2014 | Genannt Berghegger |
| 8,899,797 B2 | 12/2014 | Schaak |
| 8,911,137 B2 | 12/2014 | Chien |
| 8,915,608 B2 | 12/2014 | Chien |
| 9,057,490 B2 | 6/2015 | Sharrah |
| 9,583,977 B1 * | 2/2017 | Beranek .................. F21S 9/024 |
| 2006/0209530 A1 | 9/2006 | Schaak |
| 2008/0143185 A1 * | 6/2008 | Ingles ..................... G06F 1/266 |
| | | 307/44 |
| 2009/0067161 A1 | 3/2009 | Nagata |
| 2010/0321939 A1 | 12/2010 | Patel |
| 2015/0070896 A1 | 3/2015 | Chien |

* cited by examiner

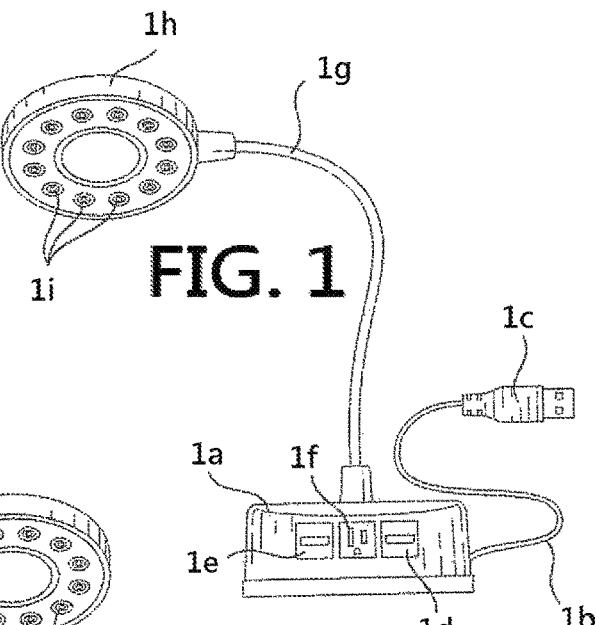
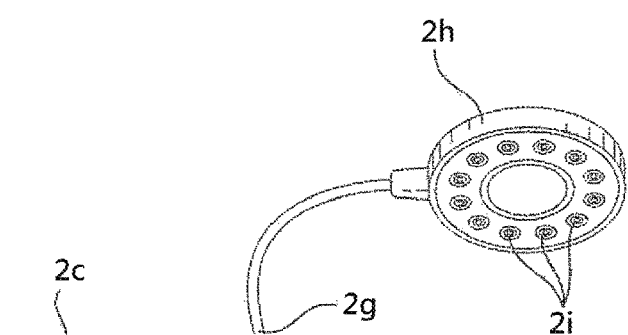
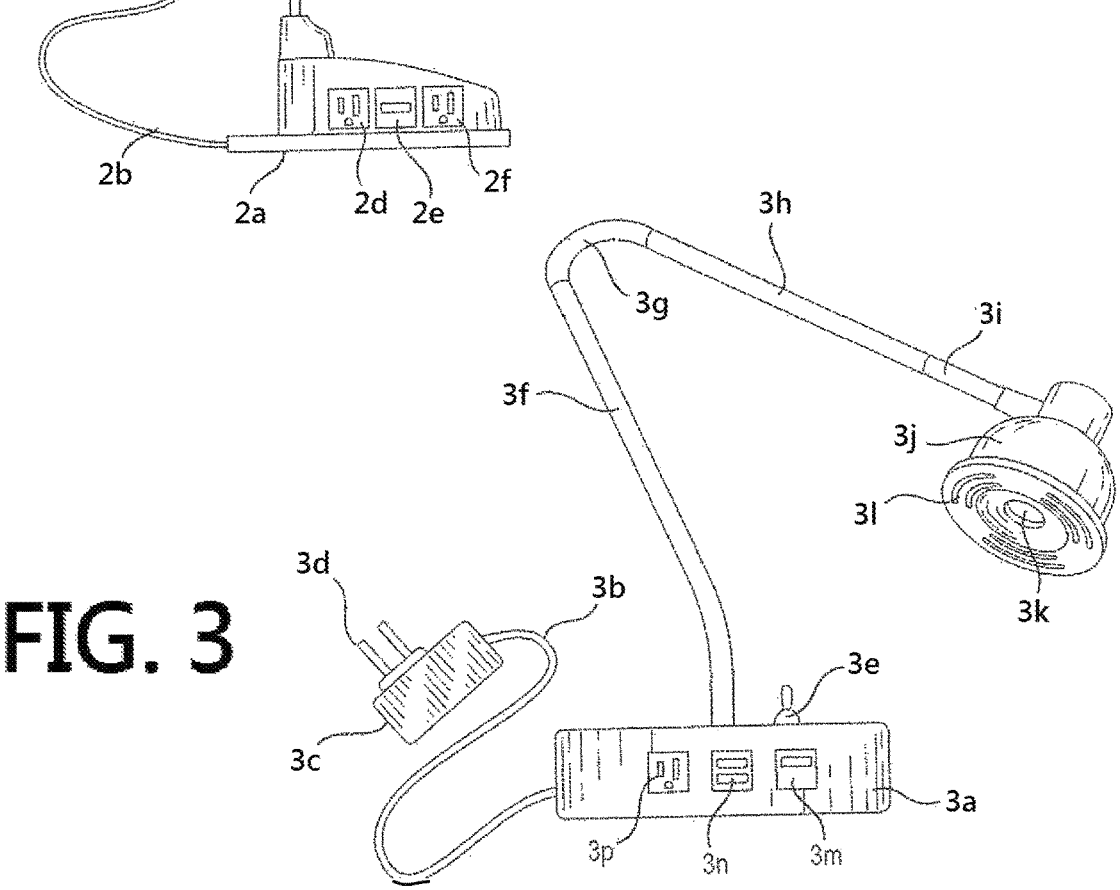
FIG. 1
FIG. 2
FIG. 3

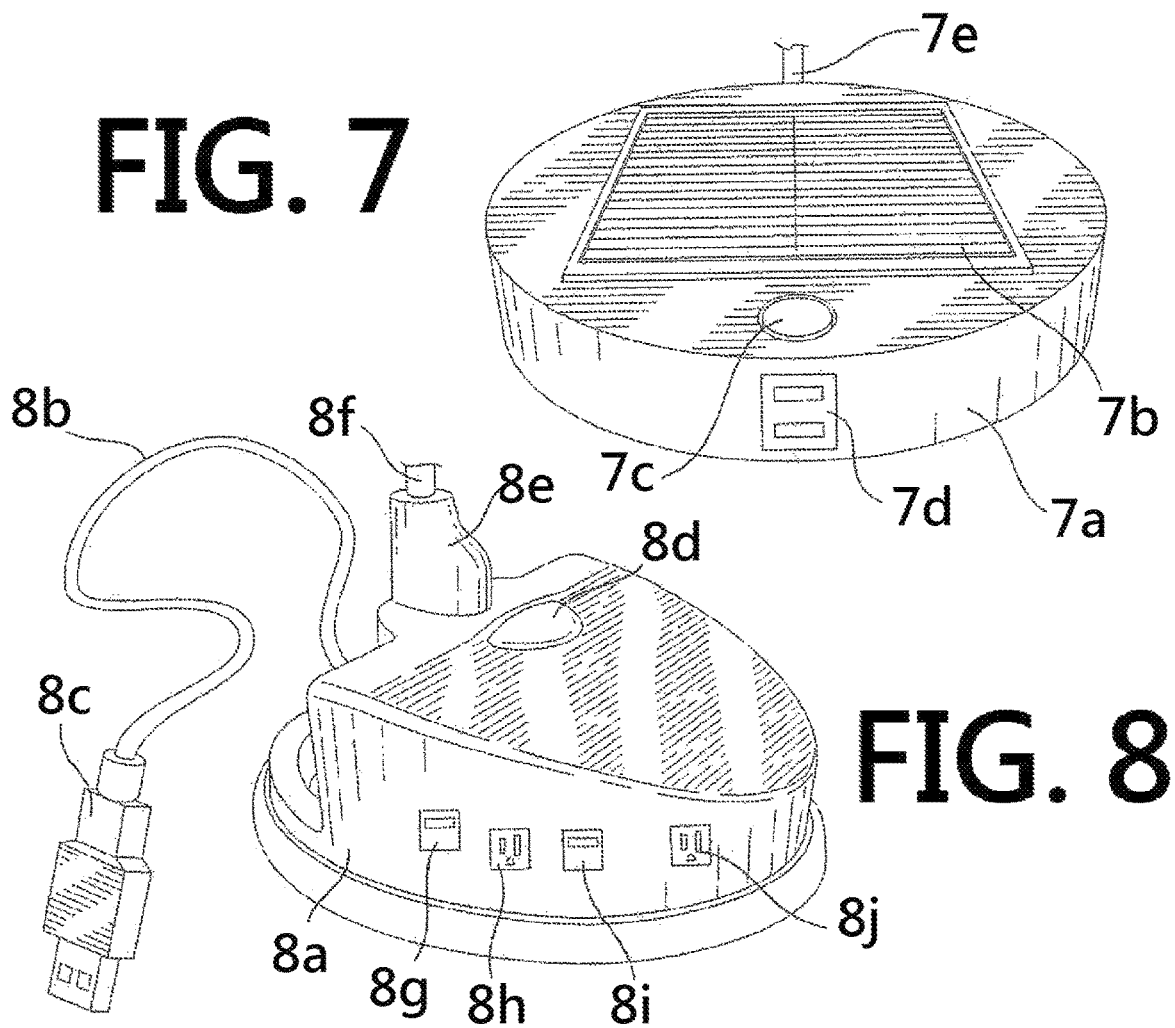
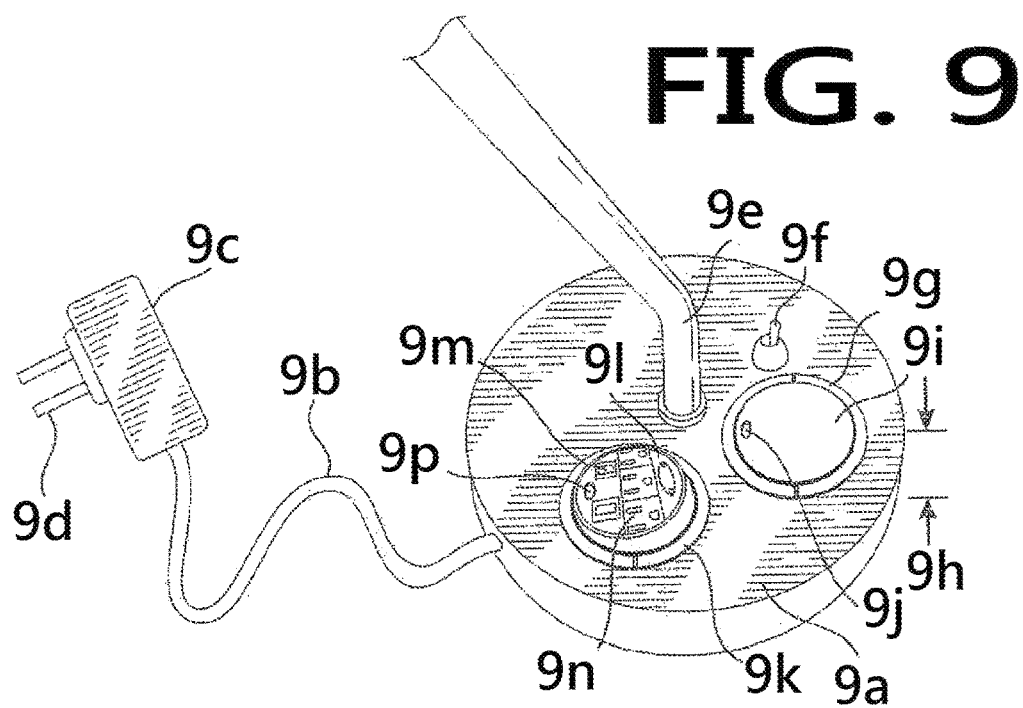

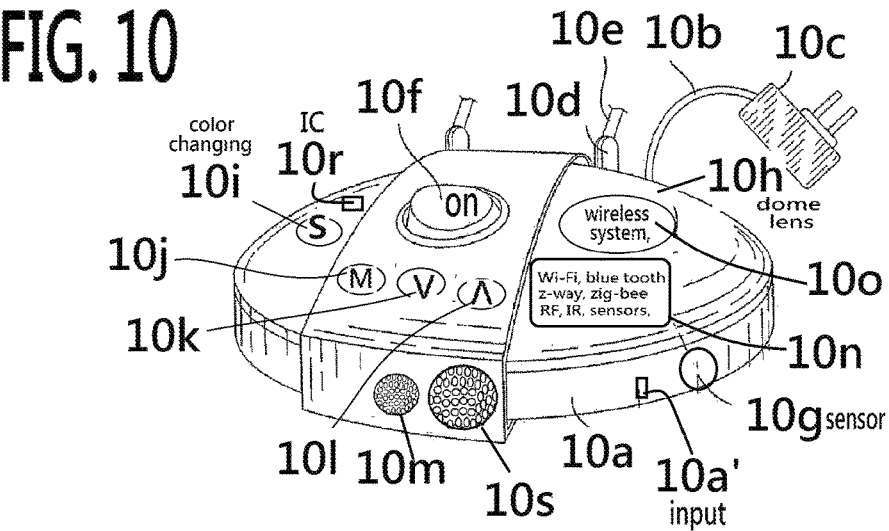
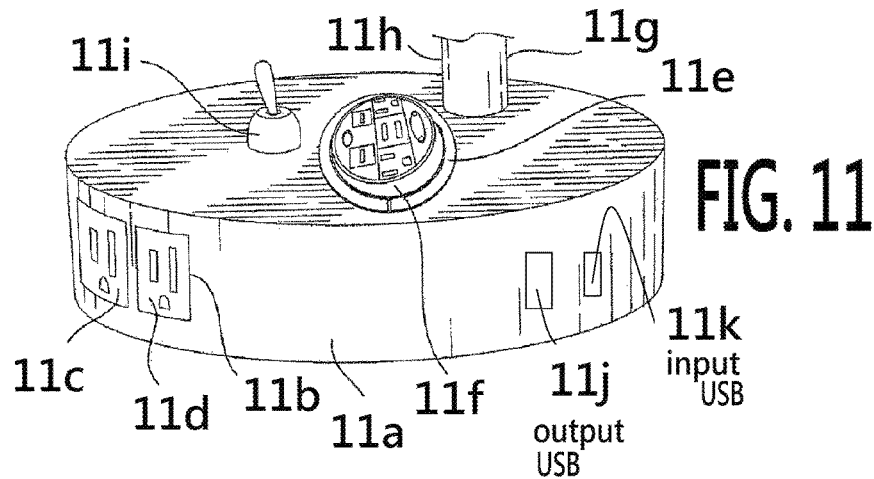
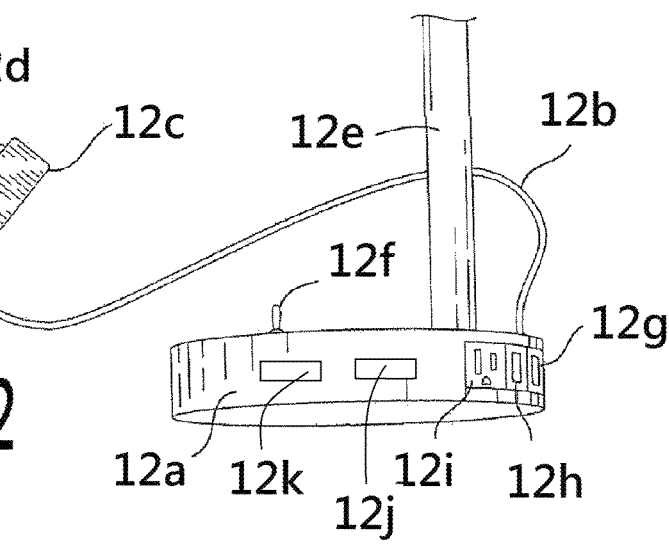

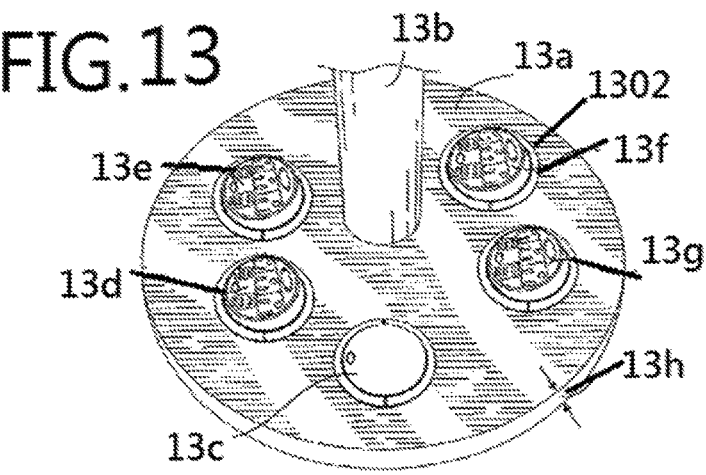
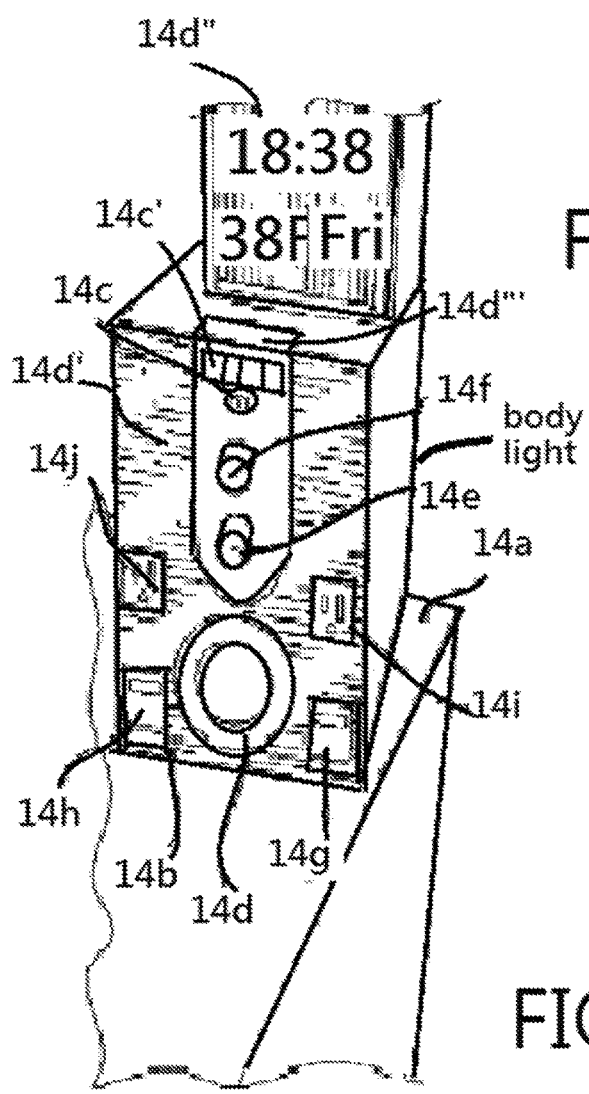
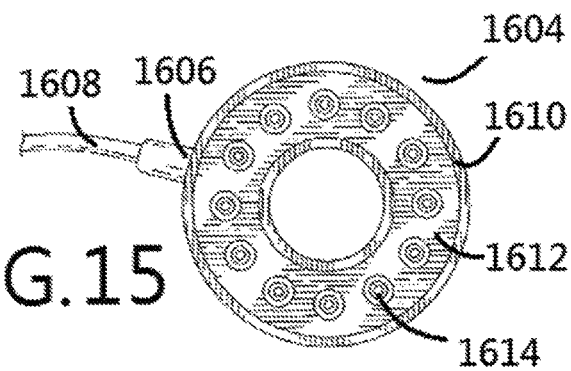

Parent filing (#CCC)
11-19-2010 filed
12-950,017

FIG. 22

Co-Pending filed 12-950,017

FIG. 21-2

The 1st surface may has LED means with its own cover, shade, lens, stencil to make design light device for recess or top of the surface.

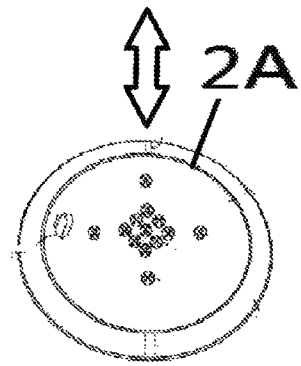
2A

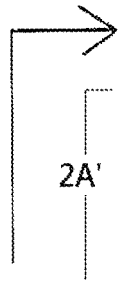
2A'

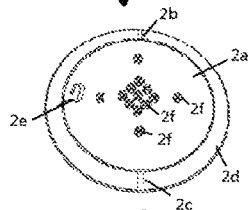

Parent filing
US Ser No.
12-950,017(#CCC)
11-19-2010 filed

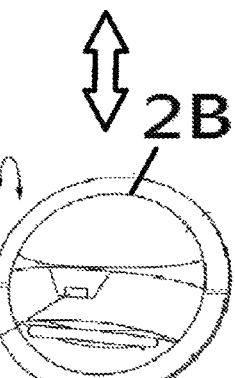
2B

FIG. 21  2B'

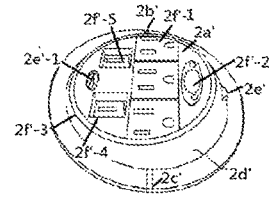

FIG. 21-3

1st surface change to other surface rotate by force

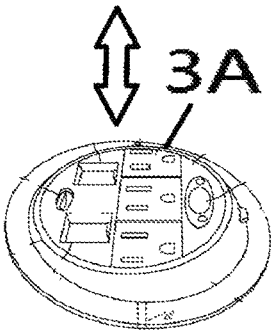
3A

3A'

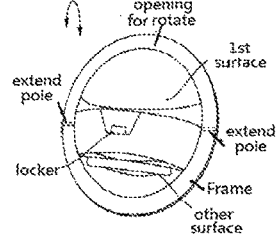

opening for rotate
1st surface
extend pole
extend pole
locker
Frame
other surface Parent filing
US Ser No.
12-950,017(#CCC)
11-19-2010 filed

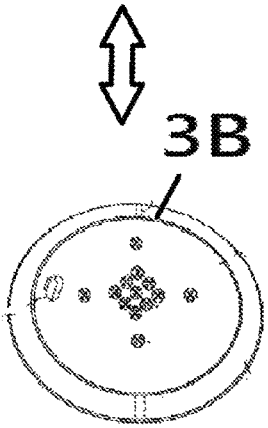
3B

3B'

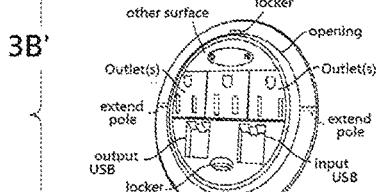

other surface — locker — opening
Outlet(s) — Outlet(s)
extend pole — extend pole
output USB — input USB
locker
frame

Rotating USB-unit(s) in an universal module with plurality of functions such as outlet-unit(s), surge or other protection system, wi-fi, Zigbee, Zway, blue tooth, RF, IR wireless communiactions. It also can use individual USB-unit(s) or outlet(s) separated distance away from USB-device Quick Charger USB above 2.0A

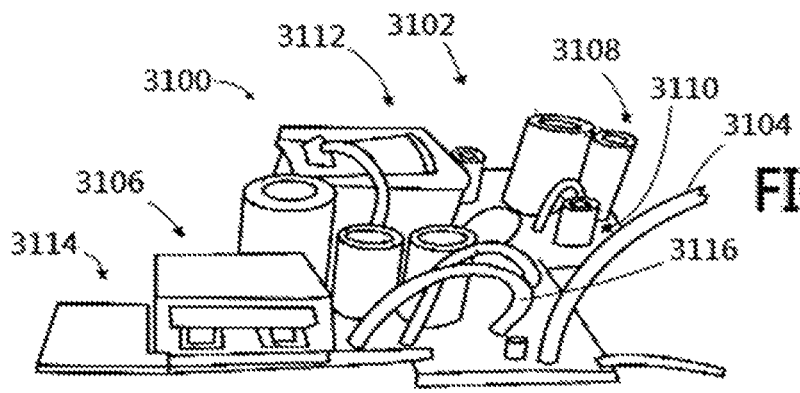
(1) USB-unit: No housing, Not sealed and install within housing has one or more than one PCBs.
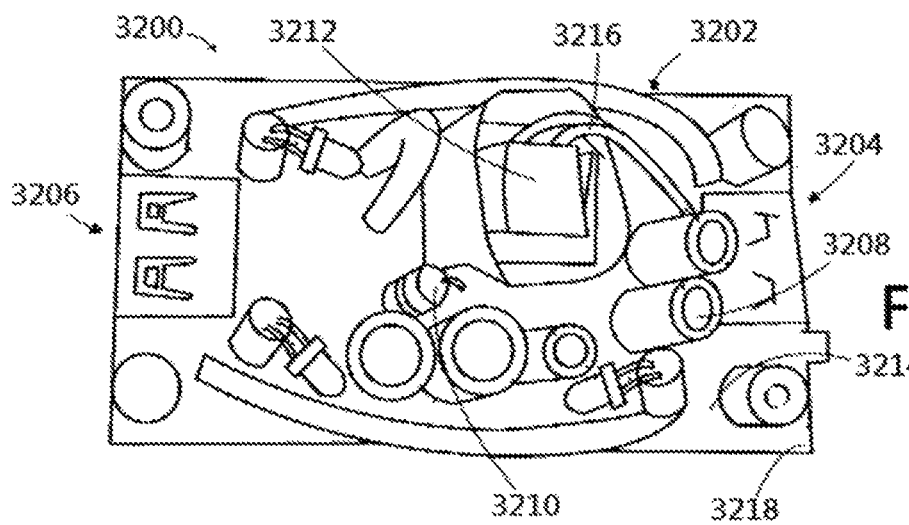
(2) USB Module: more than one USB or optional outlet-unit(s) into 1 PCB to fit within the said desk top items (lamp).

FIG. 32B1
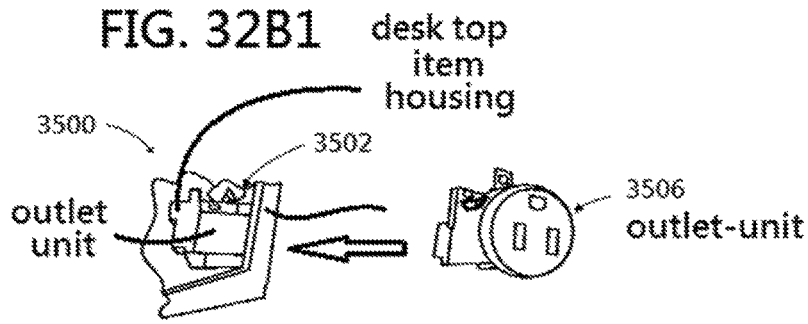
FIG.32B2
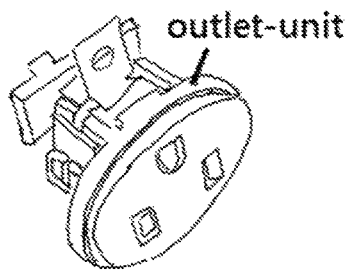
Outlet-unit: Outlet-unit is one unit has 2 or 3 prong receiving-ports to supply AC current to others device
FIG.32B4
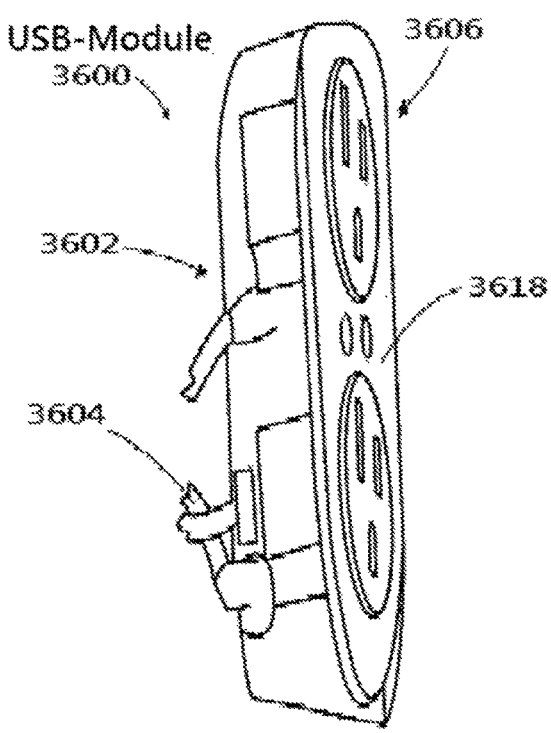
USB-Module; hsae more than one of outlets or-and preferred USB-unit(s) or LED(s) inside its own housing or PCB(s) to fit into desk top item housing
FIG. 32B3
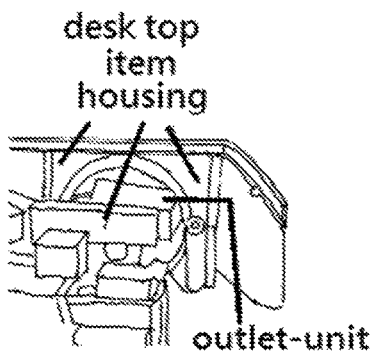

FIG. 32C1

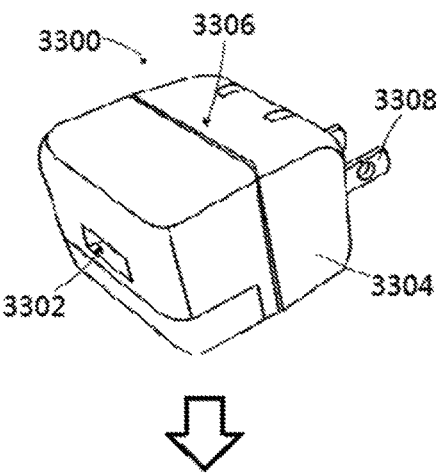

FIG. 32C3

Universal-unit has desired function fit into desk-top items housing.

FIG. 32C4

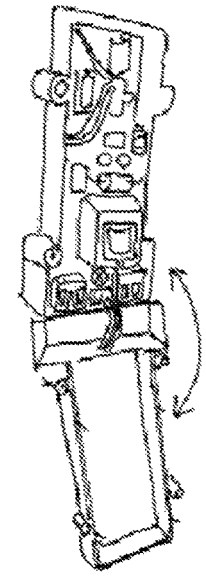

Universal-unit or module: is a sealed-unit has its functions such as fan or light and fit into any main housing. No safety certification.

FIG. 32C2

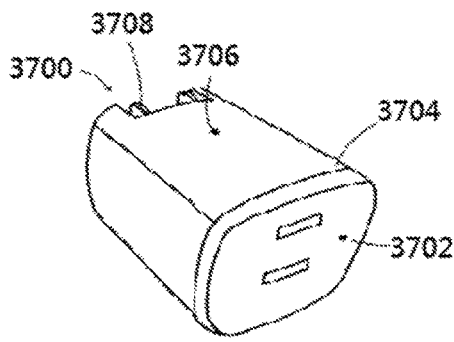

Sealed-Unit: Unit has safety certification can sell individual assemble with desk-top item by conductive-piece, and movable to use for itself while plug-into other outlets while detached from desk-top item outlets.

FIG.32C5

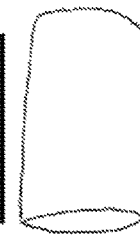

housing of desk top item or lamp housing

FIG.32C6

Optional optics-parts fit on desk top items

FIG.32C7

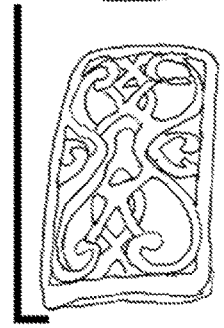

decorative parts fit on desk top item

Co-Pending Filing (12-950,017) Drawing shown USB-Unit, USB-Module, Outlet-unit

1st surface  Other surface

FIG. 32D4

LED light select from any market avaiable type for function, effects, feature, peoformance, brightness with IC chip.

LED light has control select from motion or photo sensor, switch, ,remote control, wireless controller,...etc.

LED is chip type surface mounting to reduce tall and high-end looking LED light is 4 matrix-unit or 4pcs high power LEDs LED light has 4 matrix-units or 4 high powerLED LED light has 3 matrix-unit or high power LEDs for high-bright & color temperaure and changs.

LED light is 5 LEDs COB with rotate pole change

LED light fixture may selecte from any kind of LED(s) and functiions(s) from market available models.

USB-module any combination has USB-unit on it incorporate other receiving-ports to form USB-module 6 receiving-ports =4 USB+2 outlets 6 receiving-ports =2 USB+2outlet+ 1internet+ 1phone 6 receiving-ports = 2 USB+ 2 Outlet +2 adaptor 4 receiving ports= 2USB_ 2 Outlet 3 receiving-port= 2USB + 1 outlet Receiving-ports can be any combination for desired application available from market place.

power strip housing can be any type just let USB-module rotate by frame

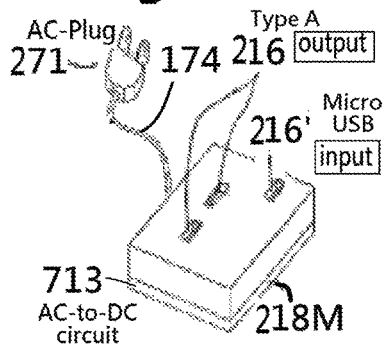
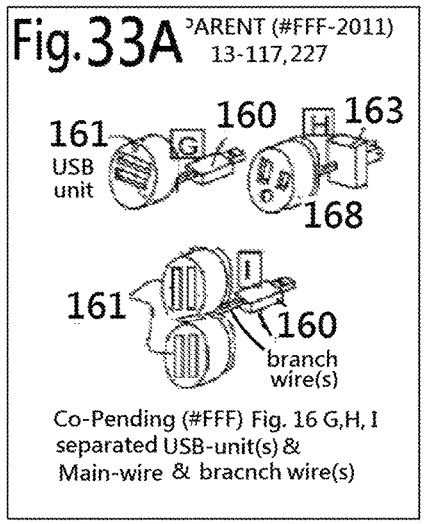
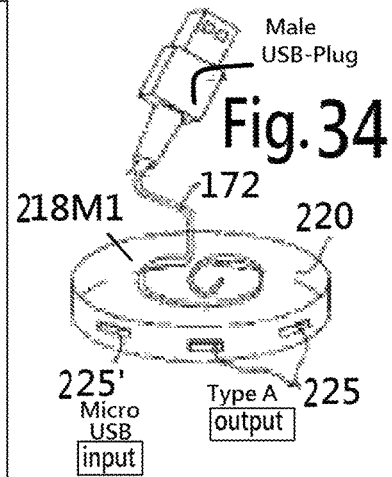
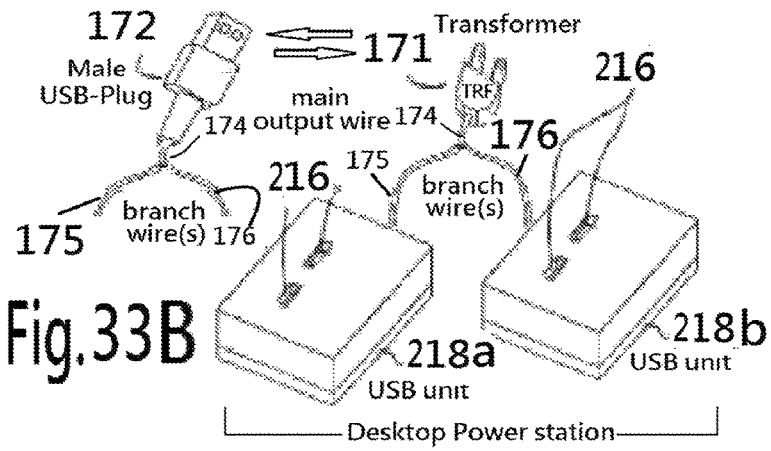
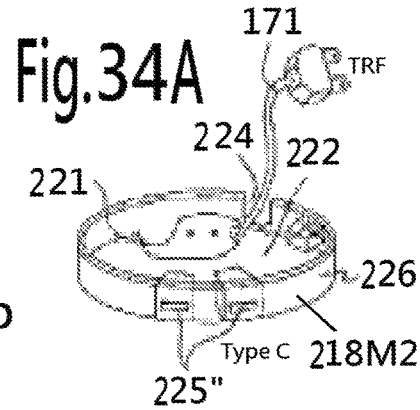
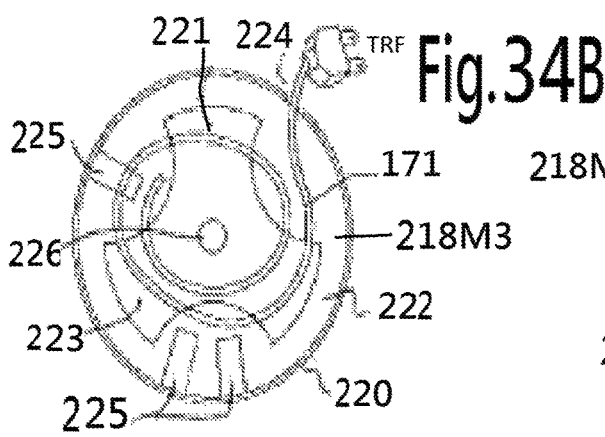
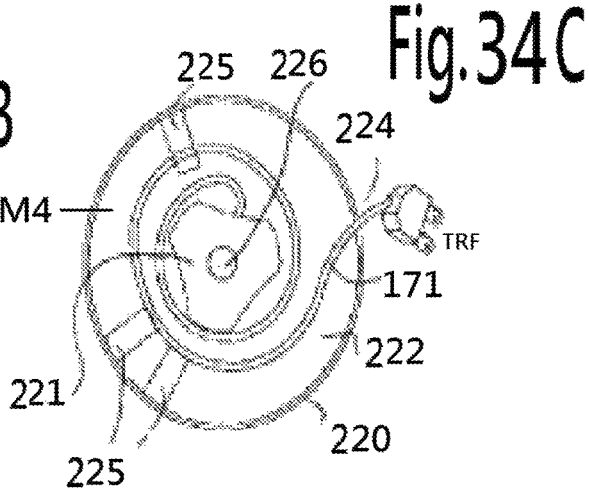

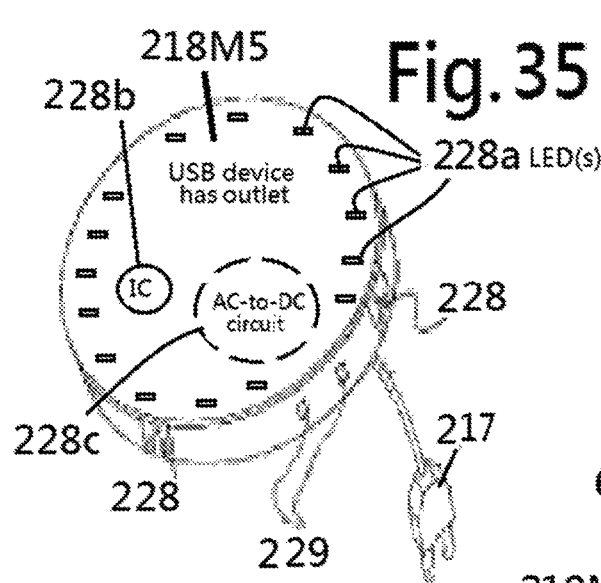
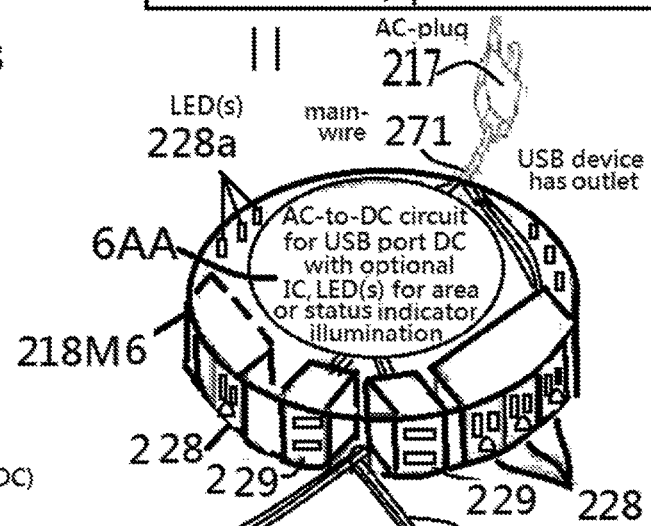
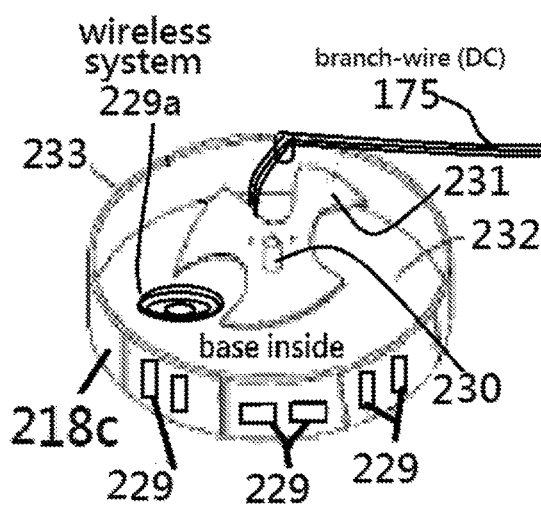
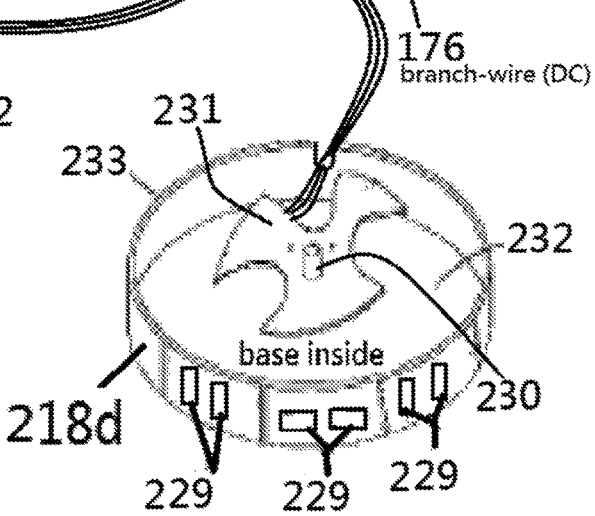

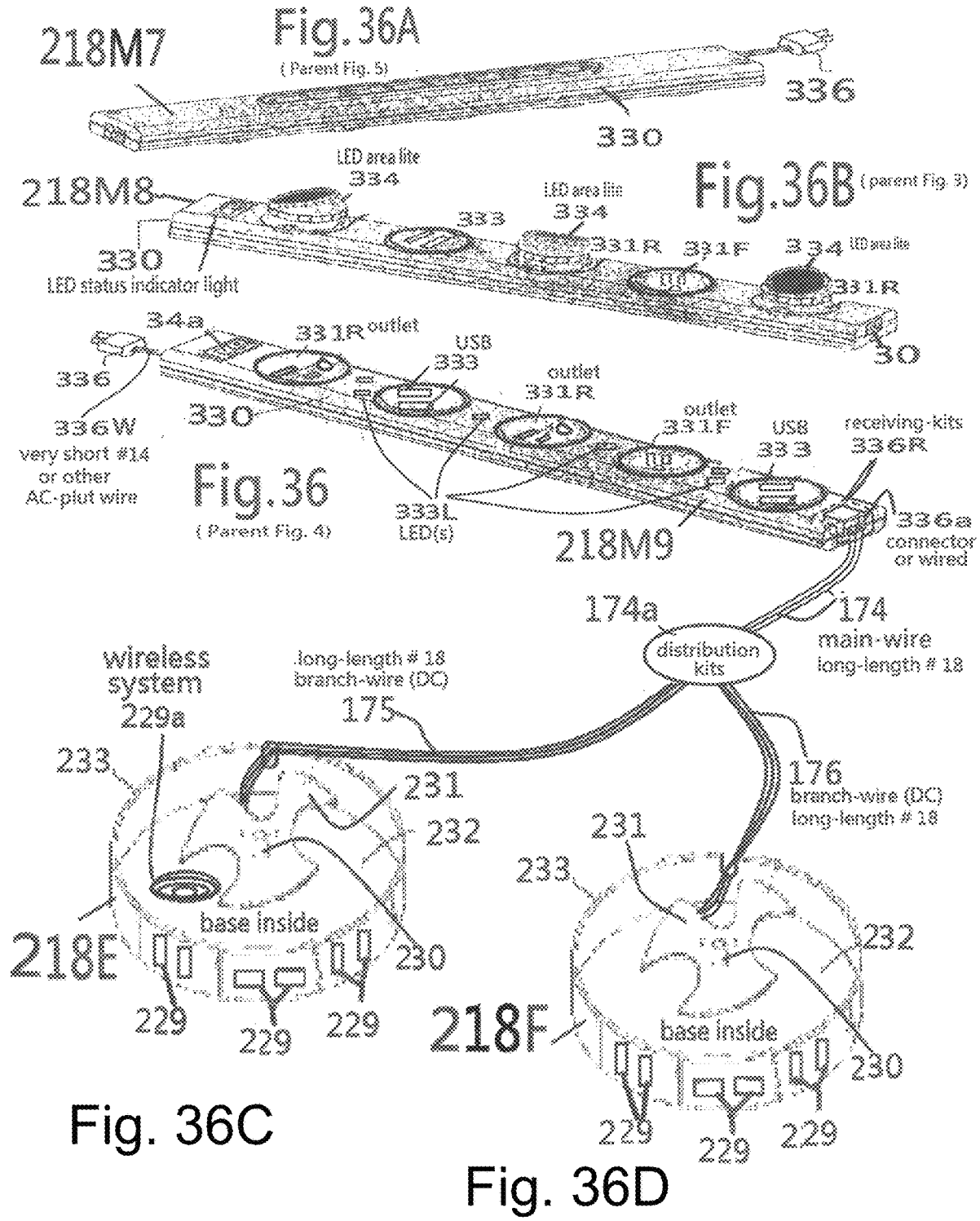

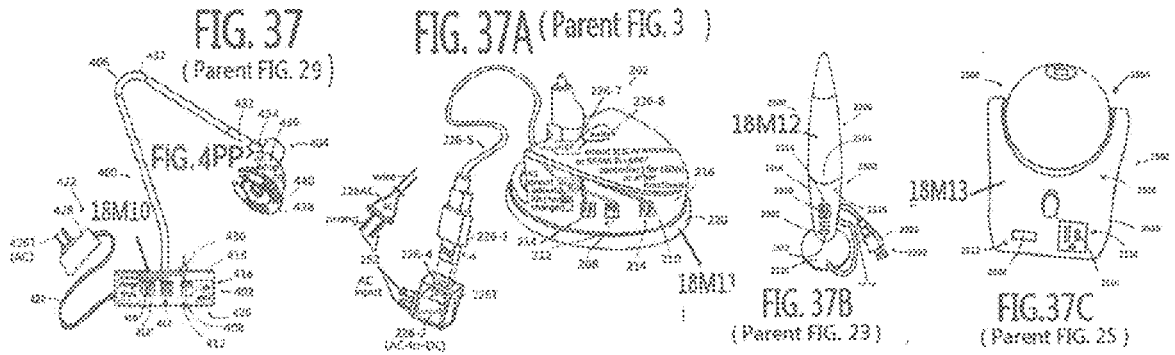
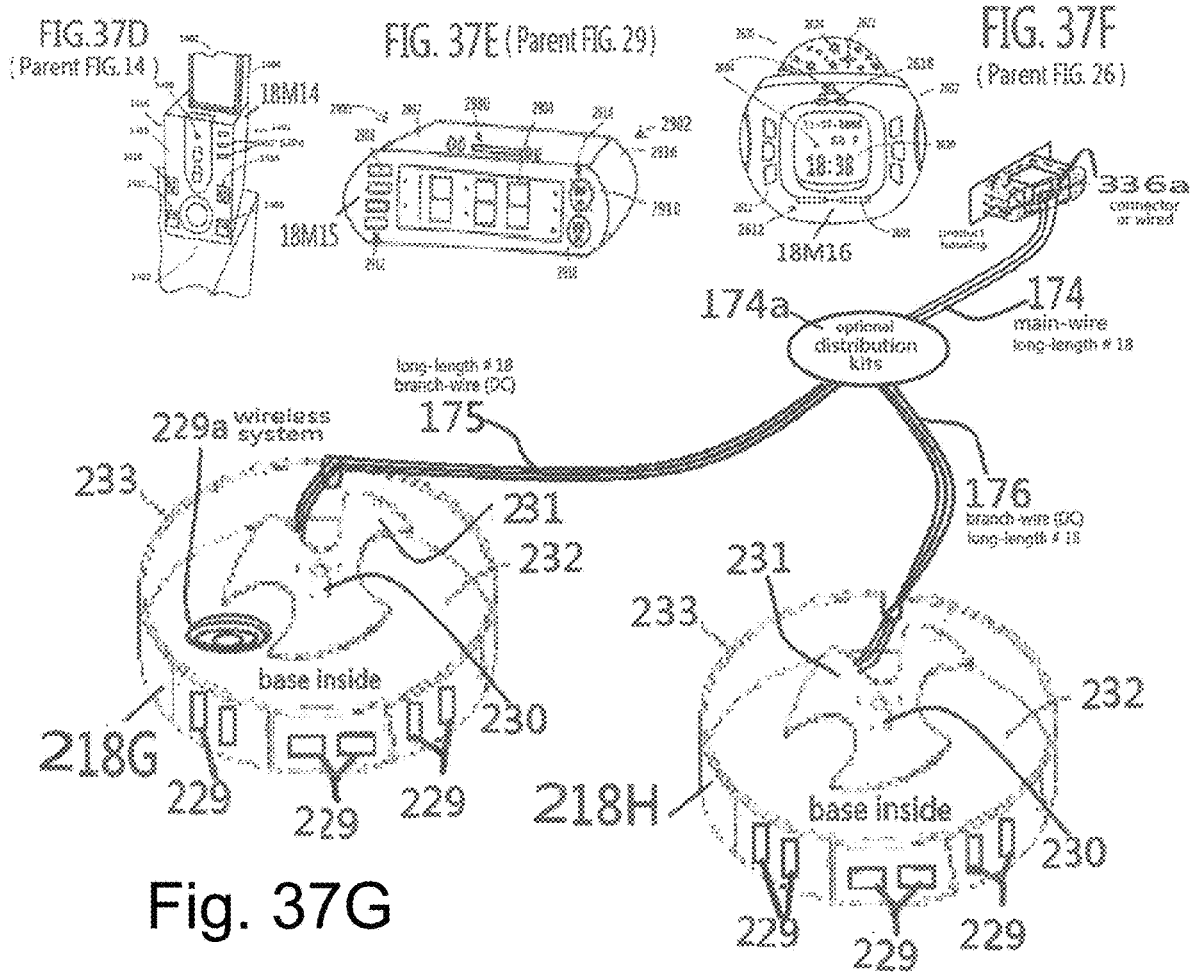
Fig. 37G
Fig. 37H

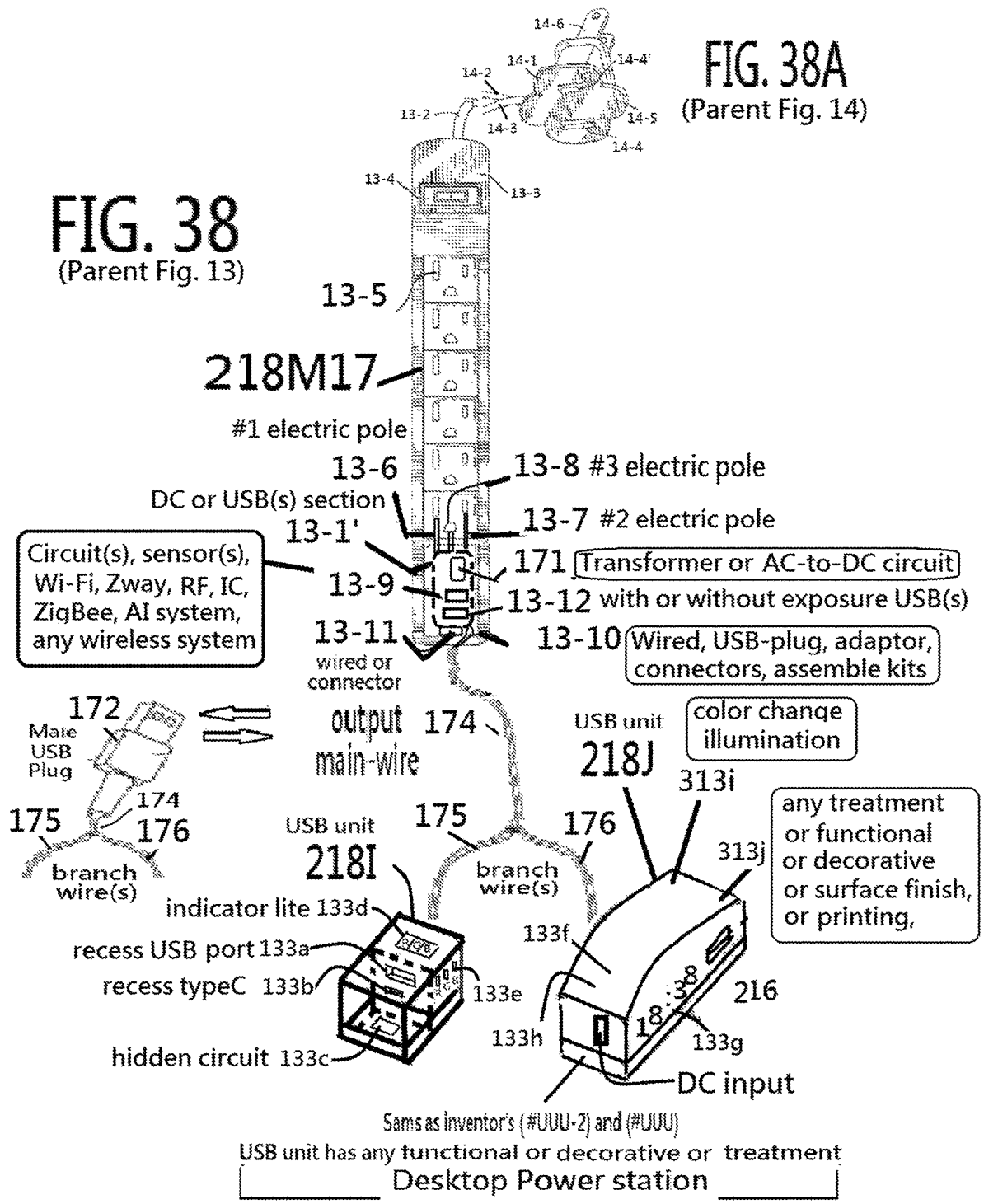

LED DESK/FLOOR LAMP

RELATED US PARENT PATENTS

U.S. application Ser. No. 13/117,227 filed on May 27, 2011 (hereafter as #FFF-2011) and
U.S. application Ser. No. 13/161,643 filed on Jun. 16, 2011 (hereafter as #GGG-2011)
U.S. application Ser. No. 15/899,492 filed on Feb. 20, 2018 (hereafter as #UUU-2) which is CIP of
U.S. application Ser. No. 15/340,367 filed on Nov. 1, 2016 (hereafter as #UUU-1) which is CIP of
U.S. application Ser. No. 13/870,447 filed on Apr. 25, 2013 (hereafter as #UUU-2013)
which is CIP of
which is CIP of
U.S. application Ser. No. 12/938,628 filed on Nov. 3, 2010 (hereafter as #UU-2010).
which is CIP of
U.S. Ser. No. 14/951,872 (hereafter as #GGG-10)
which is CIP filing of
U.S. Ser. No. 14/870,601 (hereafter as #GGG-9),
which is CIP filing of
U.S. Ser. No. 14/834,613 (hereafter as #GGG-8),
which is CIP
U.S. Ser. No. 14/834,823 (hereafter as #GGG-7),
which is CIP filing of
U.S. Ser. No. 14/834,557 (hereafter as #GGG-6),
which is CIP filing of
U.S. Ser. No. 14/858,538 (hereafter as #GGG-5-1),
which is CIP filing of
U.S. Ser. No. 14/839,935 (hereafter as #GGG-5),
which is CIP filing of
U.S. Ser. No. 14/827,810 (hereafter as #GGG-4C),
which is CIP filing of
U.S. Ser. No. 14/189,062 (hereafter as #GGG-4),
which is CIP filing of
U.S. Ser. No. 14/643,026 (hereafter as #GGG-3C),
which is CIP filing of
U.S. Ser. No. 14/548,620 (hereafter as #GGG-2C),
which is CIP filing of
U.S. Ser. No. 14/548,561 (hereafter as #GGG-1C),
which is CIP filing of
U.S. Ser. No. 14/189,062 (hereafter as #GGG-3)
which is CIP filing of
U.S. Pat. No. 8,911,137,
which is CIP filing of
U.S. Pat. No. 8,915,608 (hereafter as #GGG-1),
which is CIP filing of
U.S. Pat. No. 8,783,936 (hereafter as #GGG-2011)
(#GGG) family has all details discussion for the USB charging port features and method to making same.
This filing is Continue of filing of below 2 co-pending filing case
(#GGG-2011) U.S. application Ser. No. 13/161,643 filed Jun. 16, 2011 &
(#FFF-2011) U.S. application Ser. No. 13/117,227 filed on May 27, 2011.
The current invention also CIP for
U.S. application Ser. No. 15,458,498 Filed on Mar. 14, 2017 (hereafter as #LLL-1)
which is CIP filing for
U.S. application Ser. No. 13/367,687 (hereafter as #LLL-2011) now pay issue fee.
U.S. application Ser. No. 12/938,628 filed on Nov. 3, 2010 (hereafter as #UU-2010) for Power strips or extension cord or LED light bar has built-in LED(s) and outlet(s) with additional added USB charger with USB-port(s).

This application is a continuation of (#GG-4C) U.S. patent application Ser. No. 14/827,810 filed on Aug. 17, 2015 which is Continuation of (#GG-3C) U.S. patent application Ser. No. 14/643,026 filed on Mar. 10, 2015 which is Continuation of (#GGG-2C) U.S. patent application Ser. No. 14/548,620 filed on Nov. 20, 2014 now is U.S. Pat. No. 9,182,111 which is Continuation of (#GGG-1C) U.S. patent application Ser. No. 14/540,561 filed on Nov. 20, 2014 which is Continuation of (#GGG-4) U.S. patent application Ser. No. 14/189,162 filed on Feb. 25, 2014 now is U.S. Pat. No. 8,931,947 which is continuation of (#GGG-3) U.S. patent application Ser. No. 14/144,703, filed Dec. 31, 2013, which is continuation of (#GGG-2) U.S. patent application Ser. No. 14/105,737 filed Dec. 13, 2013 now is U.S. Pat. No. 8,911,137 which is continuation of (#GGG-1) U.S. patent application Ser. No. 14/105,607 filed on Dec. 13, 2013 now is U.S. Pat. No. 8,915,608 which is continuation of (#GGG-2011) U.S. patent application Ser. No. 13/161,643 filed on Jun. 16, 2011 now is U.S. Pat. No. 8,783,936.

The current invention is continuously filed case of (#CCC-2) Ser. No. 14/793,262 filed on Jul. 7, 2015 which is Continuation filed case of (#CCC-1) U.S. Ser. No. 14/642,169 Filed on Mar. 9, 2015 which is continuation filed case of (#CCC-2010) U.S. Ser. No. 12/950,017 filed on Nov. 19, 2010, Public on May 24, 2012 Publication Number US 2012/0127708 A1 and now is U.S. Pat. No. 8,998,462 issued on Apr. 7, 2015.

BACKGROUND

This application is having subject matter in common with the inventor's U.S. patent application Ser. No. 13/117,227, filed on May 30, 2011, and U.S. application Ser. No. 13/161,643 filed Jun. 16, 2011 Now is U.S. Pat. No. 8,783,936 and entitled "Universal module of USB-unit or Outlet-units for electric or digital data device(s)."

This application also has subject matter in common with the inventor's U.S. patent application Ser. Nos. 12/502,661, 12/292,580, 12/566,322, 11/498,874, 11/527,629, 12/622,000, 12/624,621, which disclose a sealed-unit with uniform dimensions and shape to fit into the same uniformly dimensioned compartment so that the universal sealed-unit can fit into a variety of LED light devices. The sealed unit(s) disclosed in these applications share the following features:
  a. The sealed unit(s) has uniform dimensions to fit into the uniform compartment of any kind of LED light device.
  b. The sealed-unit(s) has passed all related safety standards and received a laboratory's safety certification so that it can be used with other LED light device's parts and accessories which may or may not meet the safety standard passed by the said sealed-unit(s).
  c. The sealed unit(s) can be any individually salable unit because it has passed all related safety requirements and standards. The other parts or accessories may or may not be just decorative or have other functions to make the LED light device more valuable.

The current invention utilizes the sealed-unit concept in the following manner:
  (1) The current invention utilizes the concept disclosed in the above-cited applications of providing a sealed-unit that has passed all the relevant safety standards but applies the concept to other electric device(s) which are not limited to an LED light device. It The concept may be applied to an LED light device, power strip device, wall outlet device, surge protection device, wall adaptor device, charging device(s), smart phone related device(s), computer related device(s), and other consumer electric device(s).

(2) The USB-unit or outlet-unit may be in the form sealed-unit of a rather than the previously disclosed LED-Unit, battery-pack, or prong and the said Sealed unit may just (2a) a charging circuit board assembly for USB-unit to charge (not supply) the energy storage unit which built-inside of the said other device only, (2b) maybe is a conductive-piece assembly for Outlet-unit to deliver or supply the input AC current to the other device (2c) USB-unit maybe just a USB-receiving device to get power from the outside transformer, adaptor, invertor which already change outlet's AC current to DC current so can just pass though the said USB-Unit to charge (Not supply) the current to the said energy storage unit inside the said other electric or digital device.

(3) The USB-unit or outlet-unit are arranged to charge or supply power from these units to a variety of electric devices to keep the electric device(s) in good power condition for people to use but USB-Unit is to charge the energy-storage unit and preferred is rechargeable battery and not directly supply power to the said electric device such as said mobile phone. The Outlet-unit which simple just is conductive-piece assembly to deliver the AC current to the said other device power input end such as prongs directly and optional have surge protection or wireless controller.

(4) The USB-unit or outlet-unit may each include its own related circuit, conductive piece, contact-piece, custom-pins, receiving-ends, output-ends, input-ends, electric parts and accessories to get the electric power from:

(4-a) AC power by a prong-cable from out-lets; or (4-b) DC power from USB-cable to get power from outside power bank/energy storage unit or assembly which has multiple Amperage current storage capacity not from the computer export-ends which only limited 500 ma too slow for charging; or (4-c) DC power from outside housing transformer, adaptor, invertor unit which already has circuit built-in and already change the AC current to DC current, and through a receiving-wire or delivery-wire or USB-wire has at least 2 male USB-plugs to insert into above USB-Unit or USB-Module female receiving-port (USB Charging-ports) for supplying DC power to a variety of electric device's female receiving-port which has desire contact or connector or Custom-Pin ports for the other device USB receiving port which depend on the other device's design so it is variable. The USB Charging-ports prefer to use Type A which is most common for the desktop items so can fit for all kind of the USB-wires at least one-plug of the said 2 plugs on each USB-Wire or jump wire or bridge wire at this time. On later time maybe will prefer to use Type C because more compact and majority of the other electric device will have this type of Type C USB-unit from now device so can make the other device has smaller new Type C USB-unit to make the overall size become more compact and thinner. Anyway, the one end of the USB-wire can be any type such as Type C, or any kind of Custom-Pin contact depend on market design and requirement.

The said USB port type may in Type A, Type B, Type C each of these has Female receiving end and male plug so can build the electric power delivery. It also has digital data delivery but at this invention do not use and do not need to use the electric data or digital data delivery functions and the current invention only for Charging purpose only so can prevent slow charging or overheat issue happened.

The desktop items USB port (USB Charging-pots) do not use special of custom-pin to fit the other electric device's USB receiving-pots because this will become ony can charge one of other electric or digital device. The current invention's USB charging-port preferred to use Type A which is most popular same as all laptop computer USB receiving ports because this can easily built-in on the Desktop items which is no need to have super compact size like the be charged items such as mobile phone, iPad™ which need as slim as possible so these communication or consumer electric products need use special custom-pin such as mini USB, Micro USB, or even type C for the USB receiving port so can allow the mail-plug of mini USB or micro USB can insert into so can make the communication or hand-held iPad™ as slim and thin as possible. For Desktop still use the Type A will be more popular and can fit almost every USB-wire, jump-wire, bridge wire so can charge any kind of other electric or digital device. As for special USB Charging-pots allow to charge minimum 1.0 Amp to 5 Amp specification release on 2007 and update on 2010 which is for quickly charging capacity this is what the current invention specify for charging capacity minimum from 1.0 Amp and has details discuss on hereafter.

(5) The current invention offers USB-unit or Outlet-unit is a universal module design with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc. The universal module design means can fit into more than one of the other devices and no need to change its electric circuit, PCB, trace with current invention use quickly charging USB Charging-ports has 2007 & 2010 definition and has minimum 1.0 Amp up charging capacity.

(6) Once the USB-unit or outlet-unit in circuit board assembly, in sealed unit assembly, in a universal module assembly and has passed all related safety standards and has its own issued certification, the finished electric device in which it is used does not need to get an additional safety certification related to USB-units or outlet-units. This means can save a lot of time and resource to apply each finish product's USB-unit or Outlet-unit meet the local safety standard and no fire, no electric shock, no electric shortage hazard. Plus, the current invention uses the quickly charging USB Charging-ports which has 2007 & 2010 definition and has minimum 1.0 Amp up charging capacity.

(7) The modules of the current invention can utilize any combination of suitable USB-unit or outlet-unit parts, such as a conductive wire, conductive plate, conductive piece, contact-kit, prong-cable kits, USB-cable, prongs, resilient conductive kit, printed circuit, flexible circuit board, related electric parts and accessories, fixing, positioning kit, and/or installation device to enable the module, outlet-unit, or USB-unit to pass the safety standard and get the relevant safety certification and be added onto more than one or a lot of others electric device.

(8) The modules of the current invention may have different specifications, such as:
1 module has 1 USB-unit+1 USB-port, 1 module has 2 USB-ports+1 outlet-unit, 1 module has 2 USB-ports+2 outlet-units, 1 module has only had 1 USB-unit, or 1 Outlet or, any combination of USB-units and outlet-units that still permits a standard module to fit into many of different electric device(s) as needed with current invention has quickly charging USB Charging-ports which has 2007 & 2010 definition and has minimum 1.0 Amp up charging capacity.

(9) The module can also have the following different specifications: 2 USB ports having different current outputs including; 1 Amp, 1.1 Amp, and/or 2.2 Amps to enable the 2 USB-ports to charge different electric devices such as an iPhone™, which need 1 Amp, and an iPad™, which requires 2.1 Amps.

If people want to charge 1 iPhone™+1 iPad™ at the same time, at least 3.1 Amps will be needed, which will be very expensive. Or more high-speed charge for 4.2 Amp for 2 pcs of 2.1 Amp, or for higher charge capacity for 4.8 Amp for 2 pcs of 2.4 Amp. from data the current invention preferred for USB Charging-port basing on 2007 released for USB2.0 standard and 2010 upgrade for charging-port. However, as the current invention all desktop has no any digital data delivery and only charging function, so the current invention can have bigger current charging than out of date (Before 2007) for limited 500 ma or less charging with overheat issues as the wiki reported on below text for cross reference!

If people want to charge the 1 iPhone™ or 1 iPad™ at different times, the standard module can be 1 port 1 Amp+1 port 1.1 Amp=2.1 Amps total, and the cost will be cheaper.

If people want to charge only 1 iPhone™, only need 1 USB-unit with 1 port which has only 1 Amp is needed for the most economical product. Hence, the module of the invention should not be limited to only one specification. But the current invention has quickly charging USB Charging-ports application which meet 2007 & 2010 released definition and has minimum 1.0 Amp up charging capacity.

The current invention specify the Charging capability start from 1.0 Amp up to hundreds of Amp and the old date before 2007 has limited for 500 ma charging capacity for out of date USB construction and also has overheat or burn problem for bigger than 500 ma so from 2007 has update USB charging port so market can has a lot of USB-charging device coming from 2010 for Big charging current such as the current invention. The below is copy from Wiki-encyclopedia, The Free Encyclopedia has the details (Charging port and Charging speed and Charging port) to support the current invention for update charging capability.

USB
From Wikipedia, the Free Encyclopedia
USB 2.0
Battery Charging Specification 1.1: Released in March 2007 and updated on 15 Apr. 2009. Adds support for dedicated chargers (power supplies with USB connectors), host chargers (USB hosts that can act as chargers) and the No Dead Battery provision, which allows devices to temporarily draw 100 mA current after they have been attached. If a USB device is connected to dedicated charger, maximum current drawn by the device may be as high as 1.8 A. (Note that this document is not distributed with USB 2.0 specification package, only USB 3.0 and USB On-The-Go.)
Battery Charging Specification 1.2:[25] Released in December 2010. Several changes and increasing limits including allowing 1.5 A on charging ports for unconfigured devices, allowing High Speed communication while having a current up to 1.5 A and allowing a maximum current of 5 A.

USB 3.0[edit]
Main Article: USB 3.0
As with previous USB versions, USB 3.0 ports come in low-power and high-power variants, providing 150 mA and 900 mA respectively, while simultaneously transmitting data at SuperSpeed rates.[28] Additionally, there is a Battery Charging Specification (Version 1.2—December 2010), which increases the power handling capability to 1.5 A but does not allow concurrent data transmission.[25] The Battery Charging Specification requires that the physical ports themselves be capable of handling 5 A of current[citation needed] but limits the maximum current drawn to 1.5 A.

The USB Battery Charging Specification Revision 1.1 (released in 2007) defines a new type of USB port, called the charging port. Contrary to the standard downstream port, for which current draw by a connected portable device can exceed 100 mA only after digital negotiation with the host or hub, a charging port can supply currents between 500 mA and 1.5 A without the digital negotiation. A charging port supplies up to 500 mA at 5 V, up to the rated current at 3.6 V or more and drops its output voltage if the portable device attempts to draw more than the rated current. The charger port may shut down if the load is too high.[92]

Two types of charging port exist: the charging downstream port (CDP), supporting data transfers as well, and the dedicated charging port (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.[92]

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).[92]

Before the battery charging specification was defined, there was no standardized way for the portable device to inquire how much current was available. For example, Apple's iPod and iPhone chargers indicate the available current by voltages on the D− and D+ lines. When D+=D−= 2.0 V, the device may pull up to 500 mA. When D+=2.0 V and D−=2.8 V, the device may pull up to 1 A of current.[93] When D+=2.8 V and D−=2.0 V, the device may pull up to 2 A of current.[94]

Dedicated charging ports can be found on USB power adapters that convert utility power or another power source (e.g. a car's electrical system) to run attached devices and battery packs. On a host (such as a laptop computer) with both standard and charging USB ports, the charging ports should be labeled as such.[92]

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time.[92]

The USB Battery Charging Specification Revision 1.2 (released in 2010) makes clear that there are safety limits to the rated current at 5 A coming from USB 2.0. On the other hand, several changes are made, and limits are increasing including allowing 1.5 A on charging downstream ports for unconfigured devices, allowing high speed communication while having a current up to 1.5 A, and allowing a maximum current of 5 A. Also, revision 1.2 removes support for USB ports type detection via resistive detection mechanisms

(10) If the (10-1) module, or (10-2)a sealed-unit or (10-3) USB-Unit, or (10-4) USB-unit in a circuit board form, or (10-5) Outlet-unit, or (10-6) Outlet-unit is a conductive-piece assembly has its own issued safety certification and that can fit into the any compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

However, Some cases, it no need get pre-certification for the all (10-1) to (10-6) because factory may only make 1 model of the products or other reason for limited products productions, so no need get pre-certification is also fall within the current invention has built-in USB related parts & accessories to Charging the DC current into the built-in energy storage unit of other device or Deliver the AC power though conductive assembly to the other device. To get pre-certification good only for factory has a lot of desktop items so need to do pre-certification to save each time test the USB-Charger or Outlet-unit or the items listed on above (10-1) to (10-6).

The co-pending application entitled "Universal module of USB-unit or Outlet-unit for electric or digital data device," U.S. Ser. No. 13/117,227, (#FFF-11) discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) or above discussed (10-1) to (10-6) and reduce the cost for related electric components, parts, or accessories to make the items more cost attractive to the consumer.

The USB-unit(s) and all above discussed (10-1) to (10-4) is an electric USB-charging unit which has a USB-female receiving means (hereafter as USB-Charging port as wiki release on 2007 has minimum 1.0 Amp charging capability) to receive a wire's USB-male plug (hereafter as USB-plug) to deliver electric power from the USB-female receiving means (USB—Charging port release on 2007 as wiki disclosure) to the other wire device's USB-male plug (USB-Plug).

The preferred USB-female receiving means (USB Charging-Ports) gets power from a power source and uses circuit to convert the in-put AC electric power to an out-put power has desired waveform, voltage, and current flow or amperage (A or ma) by circuit which may be one of following;

(AA-1) circuit install inside the desk top housing has at least one of transformer, adaptor, invertor, converter to change AC current to DC current.

(AA-1) circuit install within outside housing's and has at least one of transformer or adaptor or invertor or converter to change AC current to DC current to enable the wire device 1st USB-male plug (USB-Plug) to supply power from wire's $1^{st}$ input-end USB-plug to $2^{nd}$ wire-output end's USB-plug which has desire connector type selected from (T-1) Type A, (T-2) Type B, (T-3) Type C or (T-4) mini-USB, (T-5) micro-USB or (T-6) custom-pin USB while the $2^{nd}$ end's USB-Plug of USB-Wire to insert into the USB-receiving port of the other electric or digital device(s). The current invention all the related USB Charging-Port has min. 1.0 Amp up to 5 Amp and meet the USB 2.0 and USB 3.0 and has NO electric data or digital data delivery functions as co-inventor's plurality issued and co-pending filing case including parent filing case U.S. Pat. No. 8,783,936 filed on Jun. 16, 2011 and issued on Jul. 22, 2014 of inventor's reference series number (#GGG-2011), and child-Filed U.S. Pat. No. 8,911,137 (#GGG-2), U.S. Pat. No. 8,915,608 (#GGG-1), U.S. Pat. No. 8,931,947 (#GGG-4) and co-pending filing cases. Also, all the current invention only accepts ONLY ONE input current not allow more than one input current such as normal time is AC power and change to DC power while power fail which will had a lot of controller or additional circuit need to do which may have more risk for fire case happened.

The USB-module(s) described in the co-pending application is an electric charging module which has at least one (aa) USB-female charging receiving means (USB Charging-Port as wiki release on 2007) but also has several receiving means selected from (bb) an outlet-female receiving means (hereafter as Outlet-ports), (cc) USB-female Charging receiving means (hereafter as be charged device's USB Ports), (dd) USB-female Hub receiving means for digital or electric data delivery (hereafter as USB-HUB Ports)

(ee) an adaptor's female receiving means (hereafter as Adaptor-ports), or (ff) any conventional female receiving means (hereafter as Any-Other-ports)

to form a single body which has more than one (aa) USB-female Charging receiving means (USB Charging-port) to offer the same or different electric power though the different female receiving means (hereafter as different ports) within the one body.

The USB-module connects with an input power source and circuit to offer a desired waveform, voltage, and current (Amperage or mini-amperage) as output power to charge energy-storage unit or assembly inside of the said other device(s) when the female receiving means (USB ports) is connected with other device's the male plug (USB-Plug) of desire style of the connect, style, size, construction or custom-pin for connection for be charged device(s).

Hereof, also attached the USB history charter for different years for the USB generation;

| | Version history [edit] | | |
|---|---|---|---|
| | Version history overview [edit] | | |
| Release name | Release date | Speed and max signaling rate | Note |
| USB 0.8 | December 1994 | | |
| USB 0.9 | April 1995 | | |
| USB 0.99 | August 1995 | | |
| USB 1.0 Release Candidate | November 1995 | | |
| USB 1.0 | January 1996 | Low Speed (1.5 Mbit/s), Full Speed (12 Mbit/s) | |
| USB 1.1 | August 1998 | | |
| USB 2.0 | April 2000 | High Speed (480 Mbit/s) | |

-continued

Version history [edit]
Version history overview [edit]

| Release name | Release date | Speed and max signaling rate | Note |
|---|---|---|---|
| USB 3.0 | November 2008 | SuperSpeed (5 Gbit/s) | Also called USB 3.1 Gen 1[19] |
| USB 3.1 | July 2013 | SuperSpeed+ (10 Gbit/s)[20] | Also called USB 3.1 Gen 2[21] |

So, the current invention offers a quick USB charging-port to offer the min. 1.0 Amp and the current invention only for Charring function from the charging circuit connected with power source from (4-a) AC power by a prong-cable from the AC outlets from wall or extension cord, power strips and has circuit inside of Desktop item's housing has at least one of transformer, adaptor, invertor unit to change AC current to DC current, or (4-b) DC power from USB-cable to get power from outside housing's power bank or/energy storage unit directly do not have other circuit or controller which has multiple amperage current storage so can offer minimum charging capacity from 1.0 A up to 5 Amp range or higher, or (4-c) DC power from circuit inside of outside housing has at least one of transformer, adaptor, invertor unit which already change the AC current to DC current, And though a receiving-wire or delivery-wire has at least 2 male USB-plugs to insert into above USB-Unit or Outlet-unit female receiving USB charging-port for supplying power to a variety of electric device's female receiving-port to charge the inside energy-storage unit or assembly DC current so can make other electric or digital device can work or operation.

To enable people to easily reach, touch, operate, or manage the desk top items, the USB-unit(s) or USB-module(s) are installed on or within the item/housing or a substrate(s). The items may be positioned at a location where people will stay for a period, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period, the nearby desk top items has built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™ or iPad™ USB-unit, which is very small in size, needs to use a very high cost compact transformer or inverter with super big power output to achieve a very short time to fully charge the other electric or digital data device(s). This problem can be resolved if, in order to get the USB-2.0 or new standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desktop lighted mirror, desk top clock, desk top radio, desk top fan, desk top lighting, reading light, wall reading light, head lighting, book light, electric picture display, night light with AC to DC power source or adaptor with prong and wire, projection light with AC to DC power source or adaptors with prong and wire, electric candle set with AC to DC power source or adaptors with prong and wire, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will STAY there for a period of time sufficient to also enable charging of other electric or digital data device(s).

Wherein the definition for Desktop Item which have desired parts and accessories to make desktop item can stay on desktop surface including:

1. From FIGS. 1, 2, 3, 4, 5, 6, The said One of Desktop items is LED desk top lighting have large size of the LED light or From FIGS. 1, 2, 3, 4, 5, 6 LED desktop light device have its big base with or without weight-unit(s) inside so prevent from the heavy wires or people hit the light to fall down from desktop surface, and/or 2. From FIG. 1, 2, 3, 4, 5, 6, The said desktop item including the LED light device with LED illumination or added other functions which enables the LED device to serve as a non-portable desk top" as FIGS. 1, 2, 3, 4, 5, 6 have big size base, and FIGS. 7, 8, 9, 10, 11, 12 have thicker or more bigger size with or without heavy-unit(s) inside.

3. From FIGS. 1, 2, 3, 4, 5, 6, 7, 8, 9, 10, 11, 12, 13, 14, The said desktop items have USB-charging port or USB-unit has USB-pot(s) to supply DC current to other products.

4. From FIGS. 1, 2, 3, 4, 5, 6, 7, 8, 9, 10, 11, 12, 13, 14, one of Desktop items including at least one of USB Charging-port(s) or the said USB-unit, or USB-module has USB-port and/or outlet-port. Or USB-charging pot(s) inside the sealed-unit or universal-unit which install on desktop items 5. From FIGS. 23, 24, 25, 26, 27, 28, The said desktop item shows some of the desktop items people use on desktop and all these functions can add into the said Desk top LED lighting.

6. From FIG. 24 show one of desktop items or added function into said LED light device which is other one of the desktop items or added function into said LED light device which is (1) the project lighting to project the desired LED light-beam, lighted-pattern, lighted-image, and/or (2) the added function is offering the night light, or accent light, or status indicator light has at least one of IC and controller or circuit to create the at least one of multiple color LED light beam or changeable color LED lighting. and/or combination with color selection and function selection and desired market available LED light effects, performance, and/or 7. From FIG. 27 show one of desktop items or added function into said LED light device which is (1) alarm clock, LED digital clock to offer time, date, week, month, year, weather related information including temperatures basing on current invention and all above listed co-pending and earlier filed case drawing. Or (2) the added function is offering the night light, or accent light, or status indicator light has at least one IC and controller or circuit to create the at least one of multiple color LED light beam or changeable color LED lighting. and/or combination with color selection and function selection and desired market available LED light effects, performance, and/or 8. From FIG. 28 show one of desktop items or added function into said LED light device which is offer food FIG. 28 or offer show one of desktop items or From FIG. 25 show one of desktop items having added function into said LED light device which is (1) any electric function into said LED light device or (2) offer the coffee or water or soup or liquid device. or (3) the added function is offering the night light, or accent light, or status indicator light has at least one IC and controller or circuit to create the at least one of multiple color LED light beam or changeable color LED lighting. and/or combination with color selection and function selection and desired market available LED light effects, performance, And/or 9. From FIG. 29 show one of desktop items or added function into said LED light device which is (1) a multiple functions air-flow device, or (2) offer LED lighted patterns lighted image for desired color and brightness for light-beam, lighted patterns, lighted image or any, or (3) the added function is offering the night light, or accent light, or status indicator light has at least one IC and controller or circuit to create the at least one of multiple color LED light beam or changeable color LED lighting. and/or combination with color selection and function selection and desired market available LED light effects, performance, 10. The said semi-permanent device except people replace or move out to use anymore such as
    (a) From FIG. 1, 2, 3, 4, 5, 6, 7, 8, 9, 10, 11, 23, 24, 25, 26, 27, 28 is some of desktop items which is desktop non-movable LED light as FIG. 1,2, 3, 4, 5, 6, 7, 8, 9, 10, 11 because too big size and too heavy, or These desktop item or added function into LED desktop lighting device is too heavy and no any consumer will carry it for a portable device, so this is means semi permanently installed on a desktop except people do not use anymore. This called semi-permanently.
    The common sense from people or market traditional concept and acknowledgement the said desktop items which has big size or big-base or base with weight-unit inside so can solid to arrange on desktop and these big-size base or add heavy-unit(s) to prevent the LED from falling off the desktop until removed by a user despite a cord of the LED light hanging over an edge of the desktop are common sense against the portable-items which like US prior art Quirky can put into backpack and carry all the time and use for anywhere.
    (b) From FIG. 23,24,25,26,27,28,29 with at least LED light to supply illumination and USB-port and/or added other functions selected from the
    (b-1) FIG. 23 is LED lava light which sold anywhere in USA and it have the glitter or reflector or wax inside with chemical compound or salt water or motor to make the inner miniatures, reflector, liquid to move with color changing, brightness changing or setting or selection as all market available items for LED light beam for multiple color or single color or low brightness or high brightness with sensor, switch, motion sensor, power fail, RF or wireless controller as market existing items functions, or has added function is offering the night light, or accent light, or status indicator light has at least one IC and controller or circuit to create the at least one of multiple color LED light beam or changeable color LED lighting. and/or combination with color selection and function selection and desired market available LED light effects, performance,
    (b-2) FIG. 24 for project light to project lighted image, lighted patterns or light beam. The said project is including the said project inner image-forming-unit or project outside object shape so can project the said lighted-image, lighted-pattern, light-beam or has added function is offering the night light, or accent light, or status indicator light has at least one IC and controller or circuit to create the at least one of multiple color LED light beam or changeable color LED lighting. and/or combination with color selection and function selection and desired market available LED light effects, performance.
    (b-3) FIG. 24 LED is project light-beam or lighted-pattern or lighted-image which desired round top-piece which has built-in project lighted image or patterns or light-beam from the ball or half ball surface while have reflector on half-ball surface to project the lighted-image. It also has the project optic-lens on full ball to project inner image-forming-unit for far-away distance surface or has added function is offering the night light, or accent light, or status indicator light has at least one IC and controller or circuit to create the at least one of multiple color LED light beam or changeable color LED lighting. and/or combination with color selection and function selection and desired market available LED light effects, performance.
    (b-4) FIG. 25 is liquid machine including liquid, moisture, steam, smell, essential oil diffusor with or without multiple color and IC circuit to control multiple color changing and selection and adjustable brightness by desired switch LED light(s) same as all market items with LED for operation status which is same as current invention said is one of desktop items with LED light or has added function is offering the night light, or accent light, or status indicator light has at least one IC and controller or circuit to create the at least one of multiple color LED light beam or changeable color LED lighting. and/or combination with color selection and function selection and desired market available LED light effects, performance.

(b-5) FIG. 26 for air-freshener, air-purifier, air-sprayer, moisture sprayer device as all market items which install on desktop to offer fresh air or smell air to people with LED light to offer colorful or desired accent light for this kind of device as market available items or has added function is offering the night light, or accent light, or status indicator light, or air-flow volume indicator light or temperature indicator light those has at least one IC and controller or circuit to create the at least one of multiple color LED light beam or changeable color LED lighting. and/or combination with color selection and function selection and desired market available LED light effects, performance.

(b-6) FIG. 27 LED alarm clock which is LED 8 segments to form the time or LCD display unit which has LED light-source light-beam to passing through the light passable LCD to show the time or weather related data, or FIG. 27 is LED weather station or time piece which has the LED light-source to offer the light-beam or back light to glow the front LCD display for many time and weather data or (b-7) FIG. 28 show candy machine has LED light as market and playground exiting items to let people can try their luck while people put into coin has or has added function is offering the night light, or accent light, or status indicator light has at least one IC and controller or circuit to create the at least one of multiple color LED light beam or changeable color LED lighting. and/or combination with color selection and function selection and desired market available LED light effects, performance.

(b-8) FIG. 29 LED air-flow device which create the desired temperature air-flow including air-flow or cold-air or hot-air or air with moisture, air-with frequent device with built-in LEDs to emit the desired LED light-beam for colorful and brightness which can have all LED light-effects, light-functions for change or setting or select the color and brightness, From FIG. 29, shown one of market available air-flow device to offer air-flow, or other airflow including heat, moisture, air-freshener, and/or (c) From FIG. 1, 2, 3, 4, 5, 6 show the said Desktop LED light device which has angle adjustable bar, pole, tube which can be adjustable as common sense or market all models as FIG. 1, 2, 3, 4, 5, 6 shown the tube, bar, pole has not seen the inner snake-hose or angle-adjustable-knit inner construction, but all marketing items which none-of the desk lighting without the angle adjustable arm, tube, bar so this means all the ugly snake-hose or adjust-angle-kit is inside the said coating, sleeve, envelope, soft-sealing. So, each bar or tube or pipe or pole for angle adjust purpose is "The adjustable arm has inner bendable parts sealed within an outer plastic material or tube, a coating or a metal material that is comfortable to touch"

(d) From FIG. 23, 24, 25, 26, 27, 28, 29 each of the Existing market products as (d-1) FIG. 23 is market available LED laser light offer area-illumination and have built-in USB-Charging port(s) and Outlet-ports and the moving liquid by motor or liquid-compound by heat-means to show the desktop items have built-in (i) offer the area-illumination, and (ii) USB-charging ports and (iii) added outlet-port to supply AC current to other products, and (iv) desired color and brightness with desired setting or adjustable or selection of color and brightness This is FACT to prove the said Desktop items had "At least one added function".

(d-2) Same as other FIG. 27 here is the LED digital alarm clock has the (i) LED for area illumination and (ii) project light from top-cover have design or arts to emit desired color light-beam or lighted-pattern or lighted-image or combination, and (iii) offer the time, date, week, monthly, year and weather including temperature, and (iv) built in speaker on two sides, and (v) has the setting, selection, adjustable total 8 switch on surrounding the LCD or 8 LEDs segments LED light-source, and (v) the said built-in USB and outlet to match the claim "At least one added function".

(d-3) Same as FIG. 29 show the Air-flow device has the (i) LED offer area illumination including light-beam or lighted-patterns or lighted-image or any combination as drawing show and also have (ii) air-flow which can be air, cool air, hot-air, air with humility, air with smell including freshener, or air-fragrance, and have (iii) USB-port and (iv) Outlet ports which have 4 functions inside the LED desktop items have LED for offer the illumination and have the other added functions to meet the claim "At least one added function".

Same as FIG. 24 for LED project light device which have (i) LED to offer area illumination and (ii) project light-beam or lighted-image or lighted-pattern from internal image-forming-unit or outside object shape through the built-in optics-piece including refractive and/or reflective lens so can show the projected light-beam and/or lighted-image and/or light-beam to be seen at the LED project device or areas away from the project device to match the claim said "At least one added function".

The current invention is different with the $3^{rd}$ group of US prior art including:

1. U.S. Pat. Nos. 7,736,033 and 8,545,039 Patel.

The Lamp Base with Electric device recharge receptacle & means. The Bhart's disclosure the Outlets device and the Cigar lighter build on the lamp base. The Lamp Base make the input AC current transfer to output current to automobile current (12 Volt), then the Automobile cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.

The current invention direct installs the USB Charger unit which transfers the input-end 120 VAC to output-end 5 VDC so this is practically.

2. US Prior Public 2011-017703 Rotatable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclosure the any USB charger concept, circuit, design and application so not have any related with the current invention for USB charger and the current invention device use overlay to sit on existing lamp base to offer multiple power type power station with a lot of features.

3. US prior art: U.S. Pat. No. 7,897,277 Meyer et al, disclosure the reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which not belong to computer itself parts to transfer the 120V Outlet power. Through external transformer get 5 VDC current (Outside the computer). The computer itself input-end current is 5 VDC and output-end current of USB ports also is 5 VDC so its proof, computer itself is no any USB Charger circuit inside.

5. US Prior art: U.S. Pat. No. 8,562,187 Smed disclosure FIG. 2 function for outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end. Also, The Smed other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15 Volt 2 Amp DC current to power LED or other and USB port.

This is not workable for the Ivan's because 15 Volt DC is too high and will damage the be-charged items or create the over heat. The current invention transformer is 5 Volt DC with. So, the '187 SMED 15 Volt DC just to supply power to the Plurality of LEDs and do not charged other be-charged 5V batteries.

5-2. The Smed '187 SMED not teach the USB ports is Quickly Charging-port min. has 1.0 Amp Charging capacity at the DC 5 Volt.

5-3. The Smed '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the outside Transformer housing or inside the lighting housing.

5-5. The Smed '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge be-Charged items such as the APPLE™ iPhone™ or iPad™ which need 2.1 Amp or higher to charge properly. SMED 15 Volt not only too risk for Too high voltage to charge the Be-charged inside batteries but also has too few current to charge single one-piece APPLE™ iPhone™ or iPad™, it is impossible to charge APPLE™ iPhone™ or iPad™ at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention need $2^{nd}$ or more circuit so can has $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. teach the inside wall USB charger device which is not same as the current invention. Also, Cheng's filed date is Jul. 23, 2012 which is too late than current inventions. Also, this is for the Power Box inside wall has USB charger. Not same as current invention.

7, 8, 9, US prior art: U.S. Pat. Nos. 7,742,293, 8,116,007, 8,432,667 Strauser teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10. Even Strauser teach the USB plug to power the music-player as below content;

In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into which the power cable plugs 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it's do not supply the power to other device which is different with current invention is music device has built-in circuit and transfer input current to DC 5 Volt to charge the other electric device. So, this is not same as current invention for desktop definition and people will stay for a period to charge the other device.

10. U.S. Pat. No. 8,899,797 which for has USB port install on the movable (Movable parts & accessories or Organizer, Or Addable parts & Accessories).

(The alternative may add the USB-unit or USB-Module or Outlet-unit or Outlet-Module on the MOVEABLE or ADDED parts of Desk lamp)

The '797 who is filed on Aug. 26, 2012 after Co-inventor's U.S. Pat. No. 8,783,936 (#GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

Hereof, The comparison for the

11. US Prior art 2006-020-9530 as below:
1. '9530 has bulb-socket so it is not the Built-in LED lamp. This maximum can add LED bulb Lamp device.
   Fact Column (0005) Line 10
   A terminal housing is disposed relative to the neck second portion, a bulb socket including a seat portion is attached to the terminal housing, and a shell portion of the terminal housing is shaped to receive the base of a light bulb.
2. '9530 The Transformer and Bulb-socket in parallel connection. So, the light source is getting 120 Volt current which is not built-in LED lamp device
   Fact Column (0006) The lamp support may also house a transformer
   electrically coupled to the power cord in parallel to the bulb socket.
3. '9530 The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged.
   FACT [0007]
   Alternatively, the lamp may include a second socket disposed on the support, the socket having a first end directed internally of the support and coupled to the speaker and a second end positioned externally on the support for connecting to a media device compatible cable.
4. '9530 without any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-female-receiving end and Charging wire's USB insert male-plug to deliver the current and the though charging wire's other ends to connect with the electric or digital device.
   The audio output cable (17) though Round Plug (17*a*) to transmit the data to speaker (15) (15*a*), Audio Output cable (17) one end to Music media device (100) and another end to Speaker (15*a*) (15*b*)
   FACT [0019]
   As illustrated in FIGS. 1 and 2, an audio output cable 17 is electrically connected via a plug 1711 at one end to each of speakers 15*a* and 15*b*. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17*b* of output cable 17
5. '9530 do not has built-in LED light source, only can install the LED bulb at the bulb-base. Not like the co-inventor's (3) issued patents or co-pending case has LED built-in as light source, No Bulb-Base at all.
   FACT (0021) line 10
   The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.
6. '9530 The contact (44) is Custom Pin-Out type which only can charge one and ONLY one model of the phone. Also, the Recess Slot which also become Big limited to fit one and ONLY one phone.
   FACT (0025)
   As illustrated in FIG. 2, the recess 42 is provided on the top surface of the support 12 for receiving the media player 100. A plurality of contacts 44 are formed at the base or on a Wall of the recess 42.
7. '9530 Only can charge one and ONLY ONE phone because (A) Recess (42) size is fixed (B) The contact (44) need align precisely to the phone contact so can charge one and Only One. Not like Ivan the charging port is common USB-Port!!
   FACT (0026)
   Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530 The LEE unit only can charge one and ONLY One phone and the charge contact all is Custom Pin-Out type. The current invention's items have USB-Port which can work with any USB-Port charging wires to connect with the Other electric device and digital device.

FACT [0027]

In accordance with an alternative arrangement of the present invention and with reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.

9. '9530 LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

FACT (0027) Line 2

Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.

10. '9530 LEE device can transmit BOTH DATA and CHARGING. This is not happening at Ivan item because Ivan item only has the CHARGING FUNCTION. This is not same on basic CHARGING of CHARGER DEVICE!! So, this is totally different with Ivan's CHARGER patent.

Fact (0027) Line 14 to 19

The cable allows both transmission of data between the computer and the iPod and charging of the iPod's internal battery through the USB port on the computer.

11. '9530 LEE device cable is associated audio media device & get power from the inner charging-circuit and get power from CUSTOM PIN-OUT contact (44) or Outer socket (50). This is totally different with Ivan's can charge and ONLY CHARGE many different electric or digital device. Not one and ONLY one as LEE claimed and details description for AUDIO MEDIA DEVICE (100).

FACT (0027) Line 2

Socket 50 is adapted to interface with the charging and/or data cable associated with media player 100.

Also, US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US abandonment public prior art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So, this prior art is nothing to do with current invention.

SO, From Above (12) $3^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

Furthermore, the other two US and China Prior and more discussed for all related US prior arts for $2^{nd}$ time discussion as below;

To make clearer for the current invention has big improvement than all US prior arts which mainly not same categories with current invention as bellow list is $2^{nd}$ times for more detail's comparison for (15) US and China prior arts as below:

1. DANIEL, Quirky Ember "Portable study lamp with USB port and power outlets, Jan. 28, 2011.

US Quirky device is a portable study lamp with USB port and power outlet

And as the Sep. 15, 2015 Third party page 45 show very clear "Quirky confession the device is" PORTABLE STUDY LAMP and POWER STRAP➔ WANT A LAMP INTEGRATED BOTH OF FUNCTION", and the page 45 show apply the power-strap on wall-outlet and light is hanging on the wall . . . . (This is totally different the definition of current invention for DESKTOP ITEM, No need dictionary to explain the meaning for "Desktop items" vs. "Portable POWER-STRAP & PORTABLE Study Light".

This is strong-evidence for (Quirky "Quirky confession the device is "PORTABLE STUDY LAMP and POWER STRAP➔ WANT A LAMP INTEGRATED BOTH OF FUNCTION" is not for the permanently installation on desk top items. This is totally different categories for (Portable device) vs. (Current invention for only for permanently desktop items except people not use or replace it.

However, the different for both as below discussion, including:

The current invention is;

a. Non-portable device, and never can put into backpack to carry anywhere often (supported by FIG. 1, 2, 3, 4, 5, 6, 7, 8, 9, 10, 11).

b. Permanently install on desktop which will not move evenly because always put on desktop surface and it is big and heavy and impossible to fit into backpack. (supported by FIG. 1, 2, 3, 4, 5, 6, 7, 8, 9, 10, 11).
c. Has Big size or big base or too heavy stop fall out from desk top surface (supported by FIG. 1, 2, 3, 4, 5, 6, 7, 8, 9, 10, 11).
d. Has the bendable arms which is sealed by plastic or chemical coated to form soft touch surface (Supported by FIG. 11 and FIG. 13 and FIG. 14)
e. Current invention has adjustable arm or bar or rod which has base which is 90 degree install on the LED desktop base (Supported by FIG. 8, 9, 11, 12)
f. The USB port install base wherein the base and base of flexible arms is on vertical or around 90-degree relation and not can changeable angle (Supported by FIG. 8, 9, 11, 12)
g. All USB-port is face outside install on the base contour side wall to prevent water or ash get into the USB-Charging port(s) to make the electric shortage or overheat because accumulated dust or ash to reduce the electric contact-surface. (Support by FIG. 7, 8, 11, 12 and FIG. 1, 2, 3, 4, 5, 6)
h. Quirkily not use Transformer for outside AC-to-DC power source which is AC-wired because Quirky is one of extension cord and add snake-house arms LED for light. (Supported by FIG. 3➔3C) (FIG. 5=>5C) (FIG. 9➔9c)
i. Quirkily has no any the added functions such as 1. FIG. 23 Lava light with moving reflector, miniature moving effects, or FIG. 24 project built-in image forming-piece or outside object lighted-image or lighted-patterns or light-beam, or FIG. 25 liquid supplier, or FIG. 26 air-freshener or air-fragrances or moisture functions, or FIG. 27 digital LED clock, or LCD alarm clock offer time, date, weather, sound, 8 switch for adjust, setting, selection for colorful and desired brightness, or FIG. 29 offer Air-flow, lighted patterns, lighted-image or light-beam, or FIG. 28 lighted candy or food supplier or vending machine all have the said LED light-source building to supply area-illumination (Support by Ivan FIG. 22, 24, 25, 26, 27, 28, 29).
j. Added function need different DC working voltage such as super brightness LED Or COB LED (Chip-on-board LED which is same as dice LED have to install on the Pronged circuit board, this is not new, Just Nick-Name of Chip-on-board same as Dice-on-Board—DOB) need to use 6V or higher which is not same as LED light or USB port 3/5 Volt. Quirky did not have this kind of other DC-to-DC current to offer other added-function because Quirky do not have other added-functions for extension cord with LED light, No Air-flow, No cosmetic mirror, No Clock or alarm clock, No air-sprayer, No music, No speaker, No project the object or built-in image-forming-unit lighted-patterns or lighted-image or light-beam. The current invention had this. (supported by FIG. 15+16+18 LED matrix, array, circle+ FIG. 23, 24, 25, 26, 27, 28, 29 for added-functions into LED light-device and meet the current invention Claim add limitation)
k. The LED light device of one of Desktop items, the said adjustable arm or bar or tube or pole must have longer length which need higher than people waist to shoulder and need width must from base location to people at least one eye this width, so people can use while reading or working. The current invention LED lighting is Big-size or Big-base or heavy unit, so it is not able to move like Quirky extension-cord very light so can put base in any movable location(s) for each time carry out to new place so Quirky just need short arms or bar or tube. The current invention because different concept, construction, application so must be much longer than cross section length of LED Desktop light Cross section! This means the current invention from FIG. 1 to FIG. 6 the arm/bar/pole/tube (Y-axis) or height need close from people waist to shoulder. The (X-axis) or aid width need to from base-location to people eyes position (Normally people will put big and heavy bas away from right or left arms, so the width needs min. have 1 foot or more.==>this is not happening on Quirky (Refer to Third-party submission date on Sep. 18, 2015) Page 45 and 46➔ Show it is not for Desktop items, Page 25 show the light use on the wall outlet and on the bed. Page 46 show on the Floor.➔ This because quirky is use Power strip as base and add one snake house and put a single LED on top,)

Furthermore, Quirky copy co-inventor earlier filed cases (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.

➔ These limitations should be covering the Quirky whatever he said the PORTABLE Lighting!!

2. China patent 2007-2015 3487 Miss Lin Wa0Yeh filed on Jun. 11, 2007 issued Jun. 25, 2008

From the electric drawing can see that patent disclosure the light source is connect with AC current and the said AC/DC transformer only supply the 3/5V current into the USB ports, Not link to the (Light source) so that is the typical AC power light source. Even at the text said light source can use LED but at 2007 Jun. 11 did not had super bright white LED has market available can use for desk-lamp further said as current invention use a Plurality number of LEDs or recently COB LED-unit at that time before the 2007 June.

The current invention listed the major difference at:
a. The LED is Plurality LEDs arrangement for geometric positions to get desired area illumination. (Reason: On 2007 it is impossible for white color super bright LEDs+Cost issues) Even do not have COB for built-in plurality of the LED dice into one piece including square, rectangular, even 2017 came out for circle type.
b. The current invention details listed the current get from:
b-1: outside AC-to-DC transformer so can get $1^{st}$ DC. Also, the current invention had $2^{nd}$ added functions, so may incorporate with built-in at least one of DC-to-DC circuit to make more than one or only one DC to fit for LED light source or-and added function or IC or USB export ports for same or different Current. (This is not even existing and mentioned by China 2007 filed patent for concept, application for use Outside transformer)➔ So this claim should be granted allowance!
b-2: Inside AC-to-DC transformer to get $1^{st}$ DC. The same incorporated with inner one or more than one DC-to-DC circuit to get $2^{nd}/3^{rd}/4^{th}$ DC circuit to let different LEDs or added functions to use which may use same or many different voltages. Such as LED array may need 6 Volt operation voltage which is not all same within 3/5 Volt.

Especially the COB or the High brightness output LED. (This is not happening on the 2007 for the more LEDs. Because update technical for different LED especially for super brightness or super power saving energy, assembly cost need use different working voltage with USB export 5 Volt current).

b-3: Inside AC-to-DC transformer to supply same current to LED or-and another added device. (This is other features no shown on quirky or China 2007 patent to disclose at all) . . . .

These (3) Specialized my filing feature has these Big Difference for LED desktop light. Which power by AC-wired Is different by (Outside AD-to-DC transformer) because all inner electric parts is different at all!

3. U.S. Pat. No. 7,736,033 Patel

Patel teach one lamp has the cigarette lighter round output receptacle and to receiving the (210) screw in by thread round transformer which transfer from 12 Volt to USB output voltage 5 Volt which is not same as the current invention has the UBS-receiving port which directly offer the 5 Volt current to another electric device.

This prior art been argued so many times. Not know why examiner cannot find one of prior art is similar with current application to let us know has real prior art existing. Not use this old prior art.

4. U.S. Pat. No. 8,687,392 (1) and U.S. Pat. No. 8,687,392 (2) Sims et al

This is other application which said the device itself need has the (50 of FIG. 1) capacitor or other energy storage element while the power converter is operating in the standby mode beside the AC-DC power convertor circuit (122 of FIG. 1) and plus other monitor system (54 of FIG. 1) This is not same as current invention for non-itself energy storage device or capacitor to make this expensive circuit for the current invention. So, this is nothing to do with current invention because from AC power source is unlimited power no need to waste money for power saving.

5. U.S. Pat. No. 8,853,884 Genannt berghegger et al

Teach the how to save power while the current is not operation. This kind of circuit is not use for Outlet which is only get power from AC power source only through the inner conductive receptacles to supply the current to inserted into male AC plug no matter when the male AC plug into or not into the receptacle, no any switch to control it. Same as USB ports output current, the current USB-port always relates to AC power source and through AC-to-DC transformer or at least one of DC-to-DC circuit so can get the preferred DC current volt to the said USB-port or other added functions again no any controller to make power less consumption or become big current to supply the current. That is fixed Amperage and voltage for each USB port.

So, this is nothing to do with current invention because from AC power source is unlimited power no need to waste money for power saving 6. U.S. Pat. No. 8,783,936 Chien This is the co-inventor parent filing case which has all same drawing with current invention. So, it is not the any prior art vs. tis continuously filing case.

The current invention earlier co-pending filed case including:

1. (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.

From (A-1) and (A-2) Both is enough to argue with Anabel for Quirky Is not the inventor for these (Power strip) and Outlet+USB+LED . . . . As above 3 Evidence.

A-3: From Quirky photos show, everyone know the Main-unit is (Power strip with USB and Outlet). There is No one will use the Quirky items for desk top lamp for reading.

A-3-1: Quirky items for short arms which not higher than people sited-shoulder height or not has horizon-axis for min. half-chest length . . . . The shorter arms not have vertical-height, it only can be treated for PROTABLE or WORKING TOURCH . . . . Meaning from Desk Lamp . . . . This should be having enough height above people shoulder or front arms height and has horizon-axis min. ½ chest width, so can let people have good desk lamp.

A-3-2: Quirky base is 100% can recognized is (Power strip) . . . .

A-3-3: Quirky main-unit is (Power strip) so easily can carry, but same time, while it is power-strip for main-housing➔ Then it is very easily to portable or put into Backpack . . . . However, All Market Desk Lamp is very difficult to put into backpack and carry. Because Desk top lamp must very good installation on desk top surface because need to overcome 3 kind of Force at any time . . . .

(Desk top Lamp) must overcome below 3 force including:

(A-3-3-1) Super Heavy 14 gauge-wire (US safety standard) if has outlets-unit for min. 6 feet long. Quirky power strip is not way to overcome this heavy 14 gauge 6 feet long wire weight . . . . So, is there any market power strip is there any one Can put on desktop and no fall from desktop?? The answer is NO!!

(A-3-3-2) The weight from Top LED-unit has LEDs and housing or another optics-lens, PCB.

(A-3-3-3) Arms or LED-Box/housing weight on horizon-axis so can let LED desk lamp not fall down or these 3 Weight can overcome only while the Desk Lamp has (1) Bigger Main-Base so can let all Top LED-unit housing or/and horizon arms center-of-gravity can fall within the Bigg-main base range. Or (2) The main-base must add weight-unit to overcome the center-of-gravity of top LED-unit housing and horizon arms weight So, this is not possible to add on the Quirky shown photos for (Power strips because inside is full of the metal piece for outlets and USB circuit!!

Hence, these are all arguments with Anabel. The Quirky is Not the 1$^{st}$ one inventor for his photos because Ivan already show on parent filed case (#AA) and (#BB) and (#CCC) all these 3 cases drawing show very clear Quirky cannot filed USA patens so use publication on some medium.
  (2) China patent=2007 Filed, this is very earlier date. Almost same year of Steve Jobs (Apply) came out 1$^{st}$ iPhone on 2007.
The difference with current invention:
  1. From China patents show the circuitry for incandescent radiation light source (105)
  2. From the Chien patent the circuitry shows the Incandescent or other light source is work under
    the AC current while the Input AC power (100) from outside AC wire (101) and the AC current will go through the conductive-trace or wire to the incandescent bulb (105) and has one on-off switch (103) to turn on or turn off the AC current into the AC power light source.
From whole China patent background, brief drawing, details description did not discuss anything for the LED light source at all only show on the claim 5 said all kind of light source(s) but lack of support from the anywhere of the whole patent for how to get work for DC-Operated LED can use shown circuitry which is AC current deliver to the light source (105).

Basing on the 2$^{nd}$ times discussion of the top 2 Prior art for (A) Quirky and (B) China patent, both is invalid US prior art not only for above list discussion, but also current inventor had earlier than Quirky filed date Jan. 22, 2011 as below evidences;
  Evidence A; FIG. 1+2+3+8+9=U.S. Pat. No. 7,824,185 (#BB-05) Ser. No. 12/232,035-9-22-10F (extension cord has outlet and LED and 3 contact-points.
  Evidence B. FIG. 6=U.S. Pat. No. 7,722,230 (#41) (#AA-08) Filed on 2008
  Evidence C; Column1 Line44 (USB port)+FIG. 10C=U.S. Pat. No. 8,998,462 (#CCC-10) Multiple Surface LED Light filed on Nov. 19, 2010, U.S. Ser. No. 12/950,017 Public date on May 24, 2012 Public Number 2012-012-7708 now is U.S. patent and issued on Apr. 7, 2015.
  Evidence D; (Child Filed patent of #CCC-2010) FIG. 3+4+6+7+8+9=(#FFF) U.S. Ser. No. 13/117,227 for the PUB PDF File.
  Evidence E: (#UU-2010) filed on Nov. 3, 2010 U.S. Ser. No. 12/938,628 on PUB PDF
The current invention is different with the 3$^{rd}$ group of US prior art including:
  1. U.S. Pat. Nos. 7,736,033 and 8,545,039 Patel. The Lamp Base with Electric device recharge receptacle & means. The Bhart's disclosure the Outlets device and the Cigar lighter build on the lamp base. The LampaBase make the input AC current transfer to output current to automobile current (12 Volt), then the Automobile Cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all.
The current invention direct installs the USB Charger unit which transfer the input-end 120 VAC to output-end 5 VDC so this is practically.
  2. US Prior Public 2011-017703 Rotatable & concealable device which only has the outlets device with manual switch. This is directly for 120 VAC outlets power source directly though metal piece and delivery 120 VAC to rotatable & concealable device's receptacles to offer 120 VAC current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.
  3. US prior art: U.S. Pat. No. 7,897,277 Meyer et al, disclosure the Reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).
  4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which is not belong to computer itself parts to transfer the 120V Outlet power. Though EXTERNAL transformer gets 5 VDC current (Outside the computer). The Computer itself input-end current is 5 VDC and output-end current of USB ports also is 5 VDC so its proof, Computer itself is no any USB Charger circuit inside.
  5. US Prior art: U.S. Pat. No. 8,562,187 Smed disclosure FIG. 2 function for outlet-module has the PCBA to transfer the input AC current to 15 Volt 2 A to turn on the said LED or to change the input AC current to US power outlet or Other country outlet. This is different with the current invention for AC outlet-unit which is directly to deliver the AC current from input-end directly to the AC current output-end. Also, The Smed other output for 15 Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15 Volt 2 Amp DC current to power LED or other and USB port.
  This is not workable for the Ivan's because 15 Volt DC is too high and will damage the be-charged items or create the Overheat. The Ivan transformer must be 5 Volt DC with.
  So, the '187 SMED 15 Volt DC just to supply power to the Plurality of LEDs and cannot charged other be-charged 5V batteries.

5-2. The '187 SMED not teach the USB ports is Quickly Charging-port min. has 1.0 Amp Charging capacity at the DC 5 Volt.

5-3. The '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner
  inside the Outside Transformer housing or inside the lighting housing.

5-5. The '187 SMED not discuss USB charging-port at DC 5 Volt and Connection for Be-Charged items. The USB-port 30 distribution the current to what purpose for 15 Volt DC current this too dangerously to use super high voltage 15 Volt DC to charge 5 Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15 Volt 2 Amp DC current which SUPPLY power to LEDs or others, this is not a current invention discussed to charge be-Charged items such as the iPad which need 2.1 Amp or higher to charge properly. SMED 15 Volt not only too risk for
  Too high voltage to charge the Be-charged inside batteries but also has too few current to charge single one-piece iPad, it is impossible to charge iPad or iPhone at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0 Volt DC range for output voltage and not harm to other be-charged device which inside battery is 5.0 Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5 VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5 Volt 4.8 Amp so one transformer is not enough and not good to supply 2 applications. So the current invention need $2^{nd}$ or more circuit so can has $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. Teached the inside wall USB charger device which is not same as the current invention. Also, Cheng's filed date is Jul. 23, 2012 which is too late than current inventions. Also, this is for the Power Box inside wall has USB charger. Not same as current invention.

7, 8, 9, US prior art: U.S. Pat. Nos. 7,742,293, 8,116,007, 8,432,667 Strauser teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.

Even Strauser had teach the USB plug to power the music-player as below content;
  In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into Which the power cable plugs 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it does not supply the power to other device which is different with current invention is music device has built-in circuit and transfer input current to DC 5 Volt to charge the other electric device. So, this is not same as current invention for desktop definition and people will stay for a while to charge the other device.

10. U.S. Pat. No. 8,899,797 which for has USB port install on the movable (Movable parts & accessories or Organizer, Or Addable parts & Accessories).
  (may add the USB-unit or USB-Module or Outlet-unit or Outlet-Module on the MOVEABLE or ADDED parts of Desk lamp).
  The '797 who is filed on Aug. 26, 2012 after Co-inventor's U.S. Pat. No. 8,783,936 (#GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

11. US Prior art 2006-020-9530 as below:
  1. '9530 has bulb-socket so it is not the Built-in LED lamp. This maximum can add LED bulb Lamp device.
    Fact; Column (0005) Line 10
      A terminal housing is disposed relative to the neck second portion, a bulb socket including a seat portion is attached to the terminal housing, and a shell portion of the terminal housing is shaped to receive the base of a light bulb.
  2. '9530 The Transformer and Bulb-socket in parallel connection. So, the light source is getting 120 Volt current which is not built-in LED lamp device
    Fact; Column (0006)

3. '9530 The 2$^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!

FACT [0007] Alternatively, the lamp may include a second socket disposed on the support, the socket having a first end directed internally of the support and coupled to the speaker and a second end positioned externally on the support for connecting to a media device compatible cable.

4. '9530 No wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-Female-receiving end and Charging wire's USB insert male-plug to deliver the current and the though charging wire's other ends to connect with the electric or digital device.

The audio output cable (17) though Round Plug (17a) to transmit the data to speaker (15) (15a), Audio Output cable (17) one end to Music media device (100) and another end to Speaker (15a) (15b)

FACT [0019] As illustrated in FIGS. 1 and 2, an audio output cable 17 is electrically connected via a plug 17*11* at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17

5. '9530 do not has built-in LED light source, only can install the LED bulb at the bulb-base. Not like the co-inventor's (3) issued patents or co-pending case has LED built-in as light source, No Bulb-Base at all.

FACT; (0021) line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

6. '9530 The contact (44) is Custom Pin-Out type which only can charge one and ONLY one model of the phone. Also, the Recess Slot which also become Big limited to fit one and ONLY one phone.

FACT; (0025) As illustrated in FIG. 2, the recess 42 is provided on the top surface of the support 12 for receiving the media player 100. A plurality of contacts 44 are formed at the base or on a Wall of the recess 42.

7. '9530 Only can charge one and ONLY ONE phone because (A) Recess (42) size is fixed (B) The contact (44) need align precisely to the phone contact so can charge one and Only One. Not like Ivan the charging port is common USB-Port! !

FACT; (0026) Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

8. '9530 The LEE unit only can charge one and ONLY One phone and the charge contact all is Custom Pin-Out type. The current invention's items have USB-Port which can work with any USB-Port charging wires to connect with the Other electric device and digital device.

FACT; [0027] In accordance with an alternative arrangement of the present invention and with reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.

9. '9530 LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

FACT; (0027) Line 2 Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.

10. '9530 LEE device can transmit BOTH DATA and CHARGING. This is not happening at current invention item because Ivan item only has the CHARGING FUNCTION. This is not same on basic CHARGING of CHARGER DEVICE!! So, this is totally different with Ivan's CHARGER patent.

Fact; (0027) Line 14 to 19 The cable allows both transmission of data between the computer and the iPod and charging of the iPod's internal battery through the USB port on the computer.

11. '9530 LEE device cable is associated audio media device & get power from the inner charging-circuit and get power from CUSTOM PIN-OUT contact (44) or Outer socket (50). This is totally different with Ivan's can charge and ONLY CHARGE many different electric or digital device. Not one and ONLY one as LEE claimed and details description for AUDIO MEDIA DEVICE (100).

FACT; (0027) Line 2 Socket 50 is adapted to inter face with the charging and/or data cable associated with media player 100.

Also, US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US Abandonment Public Prior Art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had zero internal transformer to change incoming AC current to DC current.

The foldable mirror had no outside transformer get power from outlet AC power source.

So, this prior art is nothing to do with current invention.

SO, From Above (12) $3^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

13. US Prior Art US 2010/0296298 Martin, J R. U.S. Ser. No. 12/761,514 Filed on Apr. 16, 2010

The '298 teach one Rea-Beveled Mirror (12*a*) of Rear-Beveled cut edge (12) of FIG. 4 and FIG. 5 or the Rear-Beveled Mirror (14*a*) of mirror (14) of FIG. 7 shown the special made mirror which is out-of-date mirror design.

Further, from FIG. 7 and FIG. 8 shown the light-strip (14) and LED light source (14-2) which is light strips (14) to fit within the beveled-edge (12*a*) which is out-of-date because update LED arrangement is dice or chip for Surface mounted on rigid-piece printed-circuit-board and which is just inward to emit light to the curved magnify-mirror to let the curved-mirror-surface work as reflector to emit all light to front which is diffusion light effect emit out to form plurality of the parallel light-beam so not dark and bright area on be-lighted object. The current invention cosmetic mirror is one of magnify have N-time magnify for vanity mirror or cosmetic mirror. Not the focus light effects like '298 get focus as FIG. 6 for all '298 concepts and construction and details.

Furthermore, the said current invention for the other side may is N-time magnify which the N-number is 1 (×1 times), the Surround light on the peri sphere is from the vertical position flexible printed-circuit-board (which is not available on 2010 because the chip-on-board or dice-on-board not available at market because too expensive and too difficult to make reasonable cost for application yet).

From the '298 for beveled edge mirror (12) (14) with the beveled-edge (12*a*) (14*a*) to arrange LED light-beam to form focus on front which will cause the center is Big brighter lighted spots and hurt people eyes for '298 design. The current invention apply for cosmetic is for diffusion light-beams to front for plurality of parallel light-beam to make front panel or area for even brightness without the super-bright focus light-beam.

So, the '298 is not same and not right for the optics-design and concept so not same as current invention spirit and construction and optics-theory (diffusion vs. focus).

Furthermore, the current invention mirror device have other construction for (1) magnify the image from 2 to N-time (N is any number) so it will be curved lens (2) The LED(s) is vertically or horizon offer illumination to the said object or mirror surface directly without the troublesome beveled-edge mirror-area(s) which will reflected (18 side walls of the light chamber 46 may include a reflective material to reflect light from the LED light strips 14 through the rea-side bevel 12*a*) or refracted light beams to make bad light-performance. Also, the (3) '298 need install the J-chamber (20) which is not practical for current invention for installation the mirror with beveled-aged (12*a*). and (4) the current invention preferred $2^{nd}$ side of LED lighted-mirror with normal non-magnify mirror also illumination so this is not existing for the said '298 for single side mirrors for '298 device.⇒So this is nothing to do with '298 patent for concept, application, feature, installation, optics-theory, mirror type, optic-focus vs. diffusion, light-beam emit out directly without go through the beveled-ages, two mirrors with rotating features.

14. US 2012-0294015 (SMED) as earlier discussion for all difference.

15. US 2008-0091250 (Powell) therapy LED desk lamp

'250 PWELL teach a portable DC power source [0012 line 5 to 8] for easily carry to patient room or do therapy.

'250 power teach a controller (126) which is (0017) (Line 2 to 3) line [selecting the operating mode of the desk lamp 140], or (line 4 to line 5) [electronic communication with the LED array 108], or

[line 6 to line] include a display and user to select a broad-spectrum light for general uses such as reading, ➔ These are common LED light device from market place and not a patentable on 2007 when the iPhone came out year!

Powell same as current invention to have this basic LED desk lamp to add powell its features to add a. "Therapy treatment light wave light-beam including infra-red, blue, red light beam➔ (The current invention for reading or working is not use this light color) + b. Portable device➔ (not same as current invention is non-portable device and big-size or weight bas permanently install on desktop before replacing it).

c. [Column 1 (0014) Line 5] The '250 for brightness is very bright for 1,000 to 2,000 lux➔ (This high brightness same as jail-torch light is not use for people reading or working indoor and this brightness will hurt people eyes while long time reading for student, '250 also did not have any anti-glare optic-piece to protect eye, or d. [Column 1 (0016) line 6} for 15-30 inch around 1 to 2.5 feet has 450 lux (This is too bright for people reading ➔ (this is not same as current invention for reading or working or accent light which not allow so bright to heart people eyes especially without the anti-glare protection at all.

e. [Column 2 line 10] include a controller 226 which can include a display and user inputs ➔ Which means this is not like current invention for simple switch or sensor for lower cost desk lamp.

f. [Column 1 (0011) line 5 to 8] for battery power easily carry to patient room or do therapy.

[Column 2 (0018) line 10] The desk lamp 240 may be powered by an internal or external portable power source such as battery. The battery power source may provide the desk lamp 240 with power such that AC power is not required."

For both embodiment all had the same portable power source is batteries.

⇨ This is different with current invention for LED and added functions need more power and batteries do not supply this kind of other added function for power consumptions.

g. [Column 2 (0018) line 15] The batteries may be stored within or proximate to the base 242 or within the LED module 246. The LED module 246 may include one or more LEDs 208, like LED array 108 as described previously.⟹Different with current invention the plurality is not powered by batteries at all.

So➔ The said '250 is not same as LED light of the current invention describe for (a) DC battery power source vs. AC plug-wire (b) portable LED light vs. permanent install on desk top (c) LED light beam for infra-red or blue vs. white light beam only (d) controller is variety functions and memory vs. simple switch or sensor (e) therapy treatment LED desktop light vs. reading or working only without therapy function. (f) movable LED light-module with built-in batteries power source and control vs. non-movable LED light source.

Basing on US patent office have much more the LED desktop light including above discussed LED desktop light of SEMD or others still can get US patents basing on (1) basic LED desktop light with ADDED features so can grant US patents as many of prior arts.

[line 7 to line] allow the user to activate desired therapeutic wave-length so light such as red, yellow, blue, green or infra-red wavelengths or a combinations thereof to treat various conditions.

which had a very complicated data-storage.

16. Re: US Prior art US 2011=0228449 (KEEBLER et al) Filed on Mar. 18, 2010 Public Sep. 22, 2011

=➔ [0026] Regarding FIG. 3, a plurality of direct current powered devices 305, 310, 315 which may be powered by a universal power supply system 100 in accordance with an example embodiment are depicted. In one example a common network router 305 is depicted which receives DC power from the second Plug 300A. in second examples, a multiple media player (i-pod) 310 is depicted which receives DC power from the second plug 300B. In the third examples, a cellular telephone 315 receives DC power from the second plug 300B. In each of these examples, the second plug 300A, 300B, 300C are different in physical dimensions (i.e., device specific) and may operate at different direct current voltages as is shown in FIG. 1➔ so '449 teach all be charge item➔ Device i-pod or others is not USB female receiving port(s) and the device have different direct current voltage as in shown in FIG. 1.

Also, '449 The said universal power supply system 100, That is lack of (1) Without USB ports with only 1 output current around 5V+/−20% and min. 1 Amp current up or more Amp.

(2) Without LED light to offer the area illumination for reading or work or accent light Amp current up or more Amp.

(3) Most important offer many different voltage DC currents not like current invention only export the 5 Volt+/−20% to charge be-charged products.

17. US 2010-0046249 (Mai) for Diffusion film

'249 Mai teach a film with diffusion and need use plurality of substrates made of different material to get the (light incidence surface) and (light emission surface) for different surface of plurality of layer. ➔ This is too complicated than market available for much better optics-lens to make the narrow LED light beam as back light and make the said light diffusion to even brightness.

From Co-inventor co-pending case (#K) U.S. Ser. No. 11/498,874 which also had the optics-piece (5') (5") for incidence and (5") emission surface and back LED light to get even brightness filed on Aug. 4, 2006 which is CIP of Ser. No. 10/954,189 filed on Oct. 1, 2004. Also, the both (5') and (5") is made by injection resin, Not even need to make plurality of layers of the film.

From current invention (#K) U.S. Ser. No. 11/498,874 has other many US prior art which is easier than the filed date Aug. 4, 2006 including U.S. Pat. No. 2,779,630 Clausen, U.S. Pat. No. 5,964,516 Lai, U.S. Pat. No. 6,669,468 PESU, U.S. Pat. No. 6,709,126 Leen, U.S. Pat. No. 6,846,098 BOURDELAIS, U.S. Pat. No. 7,538,832 Hong, US 2006-0062019 Young, US 2007-0076437 all related for the Optics-piece for make light-beam arrangement.

⇒So, Mai teach totally nothing to do with the current invention because current invention will not use this kind of plurality of layer of optic-film etc.

⇒Basing on the above listed 3 group discussion for all (17) US and China prior arts it is no any proper prior art for current invention. Hereafter for more discussion for current invention features.

Hereof, to clear make definition for the above discussed many type of the Chargers and each type has its own USB or Outlet specification such as USB-1.0, USB-2.0, or new standard for USB-3.0 or Outlet for 1,850 Watt, 1,650 Watt as convention market available type which all fall within the current invention scope and claims but these specification is well known and not related to the current invention's parts-name definition as below:

1. (#U-1)=USB-unit Charger: The Unit means it is an individual charger has only charger purpose to have one input-current and passing though inner own circuit to make input current change to one output current to charger other device from its own USB charging-port(s). This unit can be housed or without any hosing and install within the said desk-top housing and all live-wired or electric-carried parts & accessories not touchable by people except the USB-port(s). Here said CHARGING purpose is to has higher electric voltage from circuit and overcome the be-charged energy storage unit such as the rechargeable batteries so the energy storage unit can be charged and supply the power to the be-charged device's circuit to use. NOT directly from USB Charging port to SUPPLY the other device DIRECTLY to the Circuit (lack of Energy storage unit) so can supply power for other device has electricity to make operation. The current USB Charging-port is to Charge only the Energy Storage means, not directly to SUPPLY POWER to other device (lack of energy storage unit).

Also, the current invention's USB-Charging port only take 1 and only 1 of the input power or current and passing through inner circuit to come out the DC current on desired voltage and amperage. It does not have more than one different input current such as AC or DC current as input current or it will be destroying the output current because inner circuit is fixed for one and only one current specification.

Some applications the USB-Unit is just a USB receiving port which connect with the outside housing's transformer, adaptor, inventor, converter which has its built-in circuit to change from AC power source to DC current and from outside housing into the USB conductive receiving-end allow the inserting USB male-prong to insert to deliver the DC current.=>This kind of USB receiving port also is a USB-Unit.

2. (#U-2)=Outlet-unit charger: The unit it is an individual POWER SURPPLIER device and only supply power not CHARGE device which has outlet-receptacle(s) which can receive the other device's prongs to deliver or supply the AC current from the OUTSIDE Housing's outlet-unit power source though the outlet-unit's port(s) conductive piece assembly to other device's prong to get into other device's circuit to power other device.

This unit can be housed or without any hosing and install within the said desk-top housing and all live-wired or electric-carried parts & accessories not touchable by people except the Outlet no electric carried outside parts (s).

3. (#U-3)=USB-Module Charger: This module is not a single USB-Unit Charger. It will be any combination for any number of the (aaa) USB-Unit(s) or/and (bbb) Outlet-unit(s) has its own number of the USB-port(s) or/and Outlet-port(s) to connect with other electric wires or USB charge cable and by the said wire or cable plugs to plug into electric or digital data device's female receiving-port which may has all kind of custom-pin construction in Type A, Type B, Type C so can charge by USB charging port(s) for supplying the DC or/and by the Outlet-unit(s) for supplying the AC current to other devices(s).

This unit can be housed or without any hosing and install within the said desk-top housing and all live-wired or electric-carried parts & accessories not touchable by people except the non-carry electric parts of the said USB-port(s) and/or Outlet-unit(s).

4. (#U-4)=Sealed-unit: This is a unit which has desired combination for any number of USB-unit(s) or/and outlet-unit(s) arrangement or combination and sealed or LED light housing into one piece of the housing, compartment, space, container and the related circuit(s) and construction have to pass each country required related safety standard(s) and get test labs' certification for this sealed unit or construction for the desktop item. The sealed unit only also can pass the related safety standard and get safety certification by itself of USB or/and Outlet sealed unit which not including the other housing parts or accessories non-related to the USB or Outlet.

This sealed unit any live-wire or electric-carried parts & accessories must seal or housing or enclosure within the housing, desktop items, container, space so can pass the US Safety standard requirement(s).

5. (#U-5)=Universal Charger: This is charger which has finished housing and electric-contactor such as prong means, or wired, or quickly-connector(s) which not only can incorporate with the said desk-top items, but it also can use for other applications. One of preferred embodiment is market available USB-2.1 Amp Charger has 3 USB-ports with fixed or foldable traveling prongs. This can install within the current invention desk-items housing by wired or outlets or conductive piece assembly and it also can take apart from the desk-top item's housing and carry with people to plug-into Wall outlets anywhere to charger the computer, communication, consumer electric items or any electric or digital data devices while prong means plug-into outlet on wall or power strip's outlets. This is definition for universal charger for current desk-top items.

6. (#U-6)=USB female receiving means on the desktop items=It equivalent to (USB-Charging-ports released on 2007 and upgrade on 2009) to receiving the USB male plugs from USB-wire, USB-cable which has 2 male plugs on 2 wire/cable ends. One is for Type A and one end may for Min-USB or Micro-USB or other custom-pin construction which are same as be-charged device's USB-Female receiving port so can though the USB wire or USB cable or Jump cable or Bridge cable to build the electric current delivery from the desktop USB Charging-ports to charge the other device's inner energy storage items which is rechargeable battery, recharge battery assembly or any type of energy storage device which offer the electricity to desktop item electricity.

The current invention USB Charging-port has big charging capacity min. over 1.0 Amp up 5 Amp or more which as above discussed USB Charging-port standard release on 2007 and upgrade on 2009. Most important is current invention USB Charging-port only for charging function and DO NOT has any electric data delivery. Or/This will slow down the charging speed or make overheat or whatever bad for the said current invention.

7. (#U-7)=Outlet female receiving piece=It equivalent to (Outlet port) to receiving the other electric or digital data device's prong means so can deliver the AC current from outlet-port(s) through the conductive piece or assembly to the other electric or digital data device inserting prongs directly without passing through any electric controller or circuit whenever the prongs insert into the said Outlet female receiving piece.

8. (#U-8)=Desk Top items has more than one functions: Which are a products has LED or other light source which the said LED or other light source including the LED as an indicator light to show charging or charging status, not only limited for LED(s) is a LED light source for supply LED light beam for illumination. The desktop has more than one electric function which means Not only for illumination but also has $2^{nd}$ functions which can make people eye, ear, nose, mouth, skin to see, hear, smell, eat, drink, feel or is a video or an audio or an image or a sound related things. The said $2^{nd}$ function is existing products which available at market for people to buy and put on desktop or any surface where people will stay, work, sleep as above discussed.

9. (#U-9)=Base of light device: The base including the adjacent pole, bar, stand, step, curved surface, edge, contour or all the surfaces for the base of the light device except the light source and the shade. The said USB-port, USB-unit, USB-module, or Outlet-port, Outlet-unit, Outlet-module, or Sealed-unit, or Universal-unit, or rotatable module can fit within or install or attached or overlay or underlay on anywhere of the said base of the Light device.

The current invention also including the Base of Light device has built-in USB-Charging ports and this base or base has built-in light source can sell individually at the marketplace.

These above (9) details description can clearer for some parts & accessories which use for current invention.

BRIEF DESCRIPTION OF THE DRAWINGS

FIG. 1 is a front view of desk top items with LED light source having current invention definition for USB-unit(s) has USB charging-port(s) release spec which can charge energy storage unit or assembly up to 1.0 Amp or higher which USB Charging ports only can charge the energy storage unit or assembly without any digital data transmit functions. The 1$^{st}$ embodiment can charge rechargeable batteries inside other electric or digital data device(s) minimum from 1.0 Amp or higher as definition of USB Charging-ports and, according to a first preferred embodiment of the invention, which has 2 USB-units and 1 outlet-unit, 12 LEDs, and is powered by a USB plug-wire means from the AC to DC outside housing transformer, or adaptor, or invertor, or converter which already change the AC current to DC current from AC outlets which can supply more higher than 1.0 Amp so can work with definition USB charging-port which has min. 1.0 A up to higher amperage after 2007 and reissue on 2010

FIG. 2 is a side view of the desk top items of the first preferred embodiment, the inner side of the 12 LEDs is a mirror or magnify lens or magnify mirror which can show the image to let people to see or magnify lens make the lighted objects to become super big size to let people can easily read and use the flexible house to ben to fix distance against the tiny objects to let people not hold by hand for long time.

FIG. 3 shows a first design of a second preferred embodiment of the invention having the outside transformer, or adaptor, or invertor AC power source which get power from the any kind of outlet by prongs and the said desk top item having 3 receiving-ends including 2 USB Charging-port(s) USB-unit(s) or one Big USB-Module inside the housing with different power output (2 USB units has 3 USB-ports and 1 outlet-unit has 1 outlet-port) to charge the energy storage unit or assembly by USB Charging-ports or SUPPLY Power by outlet-unit for different electric or digital data device(s), for example 1,000 ma, 2,100 ma (D.C. current output from 2 USB-units has 3 USB charging-ports) and A.C. current output from the 1 outlet-unit to SUPPLY charge different electric or digital data device(s) such as an iPhone™ and iPad™ for DC current by USB-unit's USB Charging-port(s) and other device such as laptop computer for AC current by outlet-unit to get the different requirements for charging DC or SUPPLY AC current. Here of the Desk lamp has the light source available from marketplace for EL or OEL, LED, and all the light source must install on the inside lamp holder or PCB holder.

FIG. 7 also shows the fourth preferred embodiment, which The big base of the Desk top item has sufficient space within so can install all kind of USB-unit(s), Outlet-unit(s), USB-module(s), Outlet-module(s), Sealed-unit has number of the said USB-unit(s) outlet(s) and/or Outlet-unit(s), Universal unit has number of the said USB-units outlet(s) and/or Outlet-unit(s) has relatively universal compartment, or space, or room to fit within, The said such big base of the desk top item can also be powered by wind power, chemical power, battery power, a generator, transformer, adaptor, inverter, inductor, etc.

FIG. 8 shows the first preferred embodiment incorporate with different light source application (Light source is not shown), which has a thicker or higher base to provide a bigger space to arrange bigger size electric parts and accessories to save the cost of super compact, slim, or cute electric parts and accessories, and which also can load rotating USB-unit(s) or a rotating USB-Module so that a first surface of the USB-module will look nice when the USB-unit(s) or USB-Module is not in use. Details of the rotating USB module are shown in FIGS. 18, 19, 20, 21, and 22

FIGS. 9, 10, 11, and 12 show fifth and sixth preferred embodiments in which desk top items with LED means also have a thicker or higher base, and which can add rotating USB-modules with a plurality of USB-unit(s) or/and Outlet-unit(s) or/and a plurality of other receiving means (hereafter as other-ports) to increase the number of function(s), feature(s), effect(s), and/or performance(s), the USB-module having more than 1 surface and the capability of changing the surface for different purposes.

Figure 4:
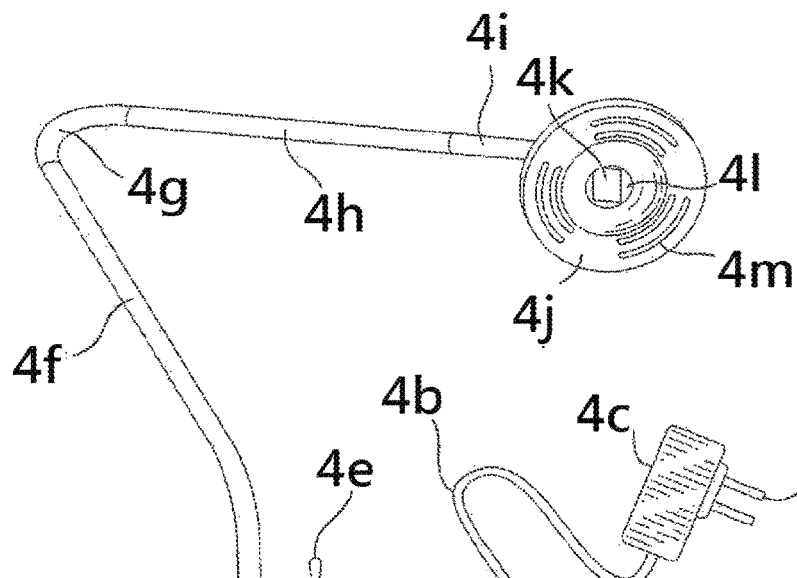
FIG. 4 shows a second design of the second preferred embodiment, which has 2 USB-units has 2 USB charging-ports and 1 outlet-unit has 1 outlet-port to allow people to charge or supply power to, for example, DC current from USB Charging-ports for an iPad™ iPhone™, and AC current from outlet-port for laptop computer or other device which can get power from the outlet-unit. The USB-unit get power from outside transformer, adaptor, inverter to get desired DC current and the outlet-unit get power while prong connect with wall-outlets and directly deliver AC current same as wall outlets current to outlet-unit. Hereof, the Desk lamp is non-LED light source lighting or one-piece super powered LED light source or plurality of LEDs install on PCB.

From the FIG. 9 shown the any kind of light source desk lamp which has 2 rotatable Module and each of rotatable module has built-in desire number of the USB-Units or/and Outlet-unit or/and USB-Module or/and Outlet-module or/and sealed-unit or/and universal-unit to get desired functions. It also has switch means to turn-on or turn-off the said Light source for desk lamp. The base has LED indicator light on the rotatable module's surface to show the charging status.

From the FIG. 10 shown the thicker and curved base for Desk lamp has desire light source for illumination. The desk lamp has wired plug to connect with wall-outlet and has AC current input into inner circuit to transfer the wall-outlet's 120V 60 Hz current into USB-unit(s) needed the DC current and supply the wall-outlet's 120V 60 hertz current to the Outlet-unit(s). The said bulb, incandescent light, florescent light or CFL light source is turn-on or turn-off by the switch or sensor or remote control, or wireless, or blue-tooth, or Wi-Fi controller with update APP software can download from internet or another network so receiver is installed means on the base surface.

From the FIG. 11, shown the base of the said Desk top lighting which may has any type of the light source which has the Rotatable module which has desire number of USB-Unit(s) or/and outlet-unit(s) and optional LED means for charging status indicator lighting. The said base not only has rotatable module and but also has additional outlet-unit or outlet-module(s) to allow to charge or supply AC power to the other electric or digital device which need AC current input to make operation.

From the FIG. 12 also shown the preferred embodiment which the said Desk Top item for preferred light source may select from bulb, CFL, incandescent as light source which has big base and the rear-side has plurality of the outlet-unit(s) from Number 1 to any number, so it can connect with other electric or digital data devices to supply or charge the other devices. The transformer, adaptor, inverter not only supply the DC current to the USB-units but also supply AC current to the said plurality of the AC Outlet-unit(s) furthermore the plurality of the outlet-unit(s) or Outlet-Module(s) also can add the safety protection function such as surge protection like extension cord had. The same application can apply for all base of the lighting device so can have nice wires arrangement for plurality of outlet-unit(s) or Outlet-module (s) on the said base of all kind of lighting device.

FIG. 13 shows a desk top item which has a super big base size so that a plurality of rotating USB-modules can be installed to enable a group of people to charge their electric or digital device(s) at the same time by the USB-unit(s) or USB-Module(s) or SUPPLY AC current by Outlet-Unit(s) or Outlet-Module(s), such as for use in a train station, bus station, airport, meeting room, hotel lobby . . . etc.

FIG. 14 shows desk top items with LED means having USB-unit(s), USB-module, or outlet-unit(s) to allow people to charge energy-storage unit or assembly inside the other electric or digital device(s) by USB-unit(s) or USB-Module(s), or supply the AC current to prong(s) device by outlet-unit(s) or outlet-module(s), the items including for example a radio, time piece, weather station display, fruit blender, food machine, liquid machine, LED lighting, light fixture, image projector, image, electric fan, heater or any conventional items with LED means built-in to offer the area illumination, or shown digital time, or shown image, or shown the charging status. The said other functions or the said USB-unit(s) or Outlet-unit(s) can install on the anywhere of the base, pole, steps, flat areas of the said Desk top items and not limited only on the base one surface.

FIGS. 15, 16, 16A and 17 show different LEDs means arrangement which used for LED lighting one of function(s) for offering the area illumination in the above-discussed preferred embodiments or other desk top items.

FIGS. 18, 19, 19A 20, 21, and 22 show details of a USB-module with at least one USB-units and a plurality of additional receiving means (hereafter as Additional-ports) such as USB-unit(s), outlet-unit(s), Internet-unit(s), adaptor-unit(s), other light source means, or other light sources with appropriate parts and accessories.

FIGS. 23, 24, 25, 26, 27, 28, and 29 show all kinds of desk top items which offer function(s), effects(s), and/or performance(s) to people's eye, nose, mouth, and/or ears for a period while people are working, resting, sleeping, or standing.

Figure 30:
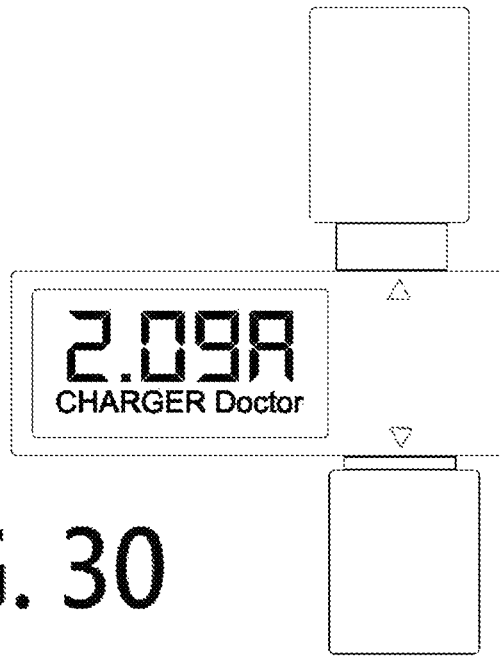
Figure 31:
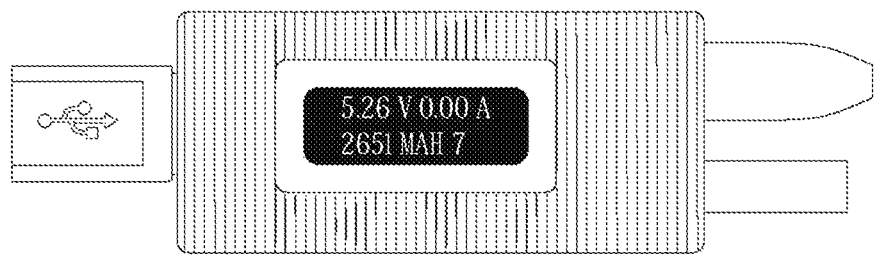

FIGS. 30, 31 show the quick charger system which has minimum output current is 2.1 Amp which is the current invention features and claim basing on 2010 Wikipedia details described on above details. This also is evidence before USB 3.0 specification and definition came out on 2010, marketplace do not have any USB can charge bigger current such as 2.1 Amp to meet the safety standard. The following section also have details discussion for USB 3.0 VS. Apple company start to use USB port on 2012 from I-Phone 5. Before 2012 I-phone and all other phone use multiple pins connector.

FIGS. 32A1, 32A2, 32B1, 32B2, 32B3, 32B4, 32C1, 32C2, 32C3, 32C4, 32C5, 32C6, 32C7, 32D1, 32D2, 32D3, 32D4 show some preferred embodiment for the above discussed for parts FIGS. 33, 33A, 33B, is an isometric view of a fourth preferred embodiment, which includes a power-wire arrangement for a desktop hand-reachable USB device embodiment that has (1) a built-in USB charger with 2 USB-port(s) powered by outside AC-plug wire to supply AC power to internal AC-to-DC circuit, or (2) USB device has plurality of linkable or connectable separated USB-unit(s) from power source main-wire(s) to more than one of branch-wire(s) for each separated USB-unit(s) while USB device without outlets.

FIG. 33A shown the co-pending Ser. No. 13/117,277 (hereafter as #FFF-2011) FIG. 16 item (I) has one input DC power source through the power source output main-wire and plurality of branch-wire(s) for plurality of separated USB-unit(s) with preferred distance away from each other.

FIG. 33B show one USB device has output main-wire to split into plurality of branch wires to connect or link with plurality of separated individual housing USB-unit(s) to supply more than one location having USB-unit(s) to let people buy one desktop items, reading light, accent light, time related products, air flow related products, essential oil diffusor, fan device or any combination of these items; have plurality USB-unit(s) arrange on different location(s).

FIGS. 34, 34A, 34B, and 34C show one of preferred desktop USB device only has USB-port(s) without outlet(s) so can supply input DC from external transformer (hereafter as TRF). The current output from transformer already changed the home AC power to DC power with predetermined input DC power and distribute to number of USB-port(s) which is build-in USB-device(s) and this USB device only have device-housing without linkable or connectable plurality of separated USB-unit(s) away with others. Which also shown wire storage-arrangement which includes construction parts to form a space, gap, or dimension to allow application of simple physics and mechanical theory to arrange a wire by twisting a top cover to wind r release the wire when people sit at the desk and charge thelf other electric devices by a hand-reachable USB charger or outlet, the wire arrangement being situated on the bottom of the USB charger related unit or product using an overlay so that there is no need to take up any extra space on the desktop.

FIG. 35, are isometric views of a fifth preferred embodiment of the invention, the desktop USB device has outlet(s) so only can powered by AC-plug wire and input AC power into and connect with built-in at least one of AC-to-DC circuit, IC, LED(s), wired or wireless control system, wi-fi or Z-way or ZigBee or Blue-tooth wireless system; to set, adjust, change, control at least one of (1) LED light effects, (2) color, (3) brightness, (4) other function(s) or effect(s).

FIGS. 35A. 35B, are isometric views of a sixth preferred embodiment of the invention, the said desktop USB device is one desktop USB power station and its main-housing has AC power input main-wire and built-in at least one of (1) outlet(s), (2) USB-charge system with number of USB-port(s), (3) LED(s) for pre-determined light effects, (4) main-housing power output main-wire(s), (5) connector or distribution kits or sets, (6) at least one of branched-wire(s) to connect with at least one of separated and away from device, (7) at least one separated and away from others USB-unit(s), (8) at least one USB-port(s) built-in separated and away from each other USB-unit(s), (9) at least one functional or decorative device or item or unit arrange on the said at least one of device housing, or USB-unit, or external transformer, (10) storage wire-arrangement with desired space, gap, groove to arrange wired or be-charged items.

FIGS. 36, 36A, 36B, 36C, 36D are isometric views of a seventh preferred embodiment of the invention, the said USB device is one of power strip or extension cord and its main-housing has AC power input main-wire and built-in at least one of (1) outlet(s), (2) USB-charge system with number of USB-port(s), (3) LED(s) for pre-determined light effects, (4) main-housing power output main-wire(s), (5) connector or distribution kits or sets, (6) at least one of branched-wire(s) to connect with at least one of separated and away from device, (7) at least one separated and away from others USB-unit(s), (8) at least one USB-port(s) built-in separated and away from each other USB-unit(s), (9) at least one functional or decorative device or item or unit arrange on the said at least one of device housing, or USB-unit, or external transformer, (10) storage wire-arrangement with desired space, gap, groove to arrange wired or be-charged items.

FIGS. 37, 37A, 37B, 37C, 37D, 37E, 37F 37G, 37H are isometric views of a eighth preferred embodiment of the invention, the said USB device is one of desktop items, desktop reading light, desktop accent light, desktop LED or LCD display time related products, desktop light with built-in air-flow device or bladeless fan device, desktop essential oil diffusor, desktop project light, desktop reading or accent light has time/date/week/temperatures displayer products with USB charger; and its main-housing has AC power input main-wire and built-in at least one of (1) outlet(s), (2) USB-charge system with number of USB-port(s), (3) LED(s) for pre-determined light effects, (4) main-housing power output main-wire(s), (5) connector or distribution kits or sets, (6) at least one of branched-wire(s) to connect with at least one of separated and away from device, (7) at least one separated and away from others USB-unit(s), (8) at least one USB-port(s) built-in separated and away from each other USB-unit(s), (9) at least one functional or decorative device or item or unit arrange on the said at least one of device housing, or USB-unit, or external transformer, (10) storage wire-arrangement with desired space, gap, groove to arrange wired or be-charged items.

FIGS. 38, 38A (Parent FIGS. 14, 13) show the traditional extension cord or power strip has preferred number of outlets with power or surge on-off LED indicator light with additional DC power section which has built-in AC-to-DC circuit to change outlet(s) AC current on buss bar to DC power to output through extension cord or power strip output main-wire(s) to at least one of branch-wire(s) to deliver the DC power to each separated away USB-unit(s). Each of separated and distance away USB-unit has preferred functional or decorative or treatment or finish as inventor parent filed case (#UUU-2) (#UUU-1) (#GGG-more than dozen family filed cases).

DETAILED DESCRIPTION OF THE PREFERRED EMBODIMENTS

U.S. application Ser. No. 13/117,227 filed on May 27, 2011 (hereafter as #FFF-2011)
and
U.S. application Ser. No. 13/161,643 filed on Jun. 16, 2011 (hereafter as #GGG-2011)
U.S. application Ser. No. 15/899,492 filed on Feb. 20, 2018 (hereafter as #UUU-2)
which is CIP of
U.S. application Ser. No. 15/340,367 filed on Nov. 1, 2016 (hereafter as #UUU-1)
which is CIP of
U.S. application Ser. No. 13/870,447 filed on Apr. 25, 2013 (hereafter as #UUU-2013)
which is CIP of
which is CIP of
U.S. application Ser. No. 12/938,628 filed on Nov. 3, 2010 (hereafter as #UU-2010).
which is CIP of
U.S. Ser. No. 14/951,872 (hereafter as #GGG-10)
which is CIP filing of
U.S. Ser. No. 14/870,601 (hereafter as #GGG-9),
which is CIP filing of
U.S. Ser. No. 14/834,613 (hereafter as #GGG-8),
which is CIP
U.S. Ser. No. 14/834,823 (hereafter as #GGG-7),
which is CIP filing of
U.S. Ser. No. 14/834,557 (hereafter as #GGG-6),
which is CIP filing of
U.S. Ser. No. 14/858,538 (hereafter as #GGG-5-1),
which is CIP filing of
U.S. Ser. No. 14/839,935 (hereafter as #GGG-5),
which is CIP filing of
U.S. Ser. No. 14/827,810 (hereafter as #GGG-4C),
which is CIP filing of
U.S. Ser. No. 14/189,062 (hereafter as #GGG-4),
which is CIP filing of
U.S. Ser. No. 14/643,026 (hereafter as #GGG-3C),
which is CIP filing of
U.S. Ser. No. 14/548,620 (hereafter as #GGG-2C),
which is CIP filing of U.S. Ser. No. 14/548,561 (hereafter as #GGG-1C), which is CIP filing of U.S. Ser. No. 14/189,062 (hereafter as #GGG-3) which is CIP filing of U.S. Pat. No. 8,911,137, which is CIP filing of U.S. Pat. No. 8,915,608 (hereafter as #GGG-1), which is CIP filing of U.S. Pat. No. 8,783,936 (hereafter as #GGG-2011) (#GGG) family has all details discussion for the USB charging port features and method to making same.

This filing is Continue of filing of below 2 co-pending filing case (#GGG-2011) U.S. application Ser. No. 13/161,643 filed Jun. 16, 2011 &

(#FFF-2011) U.S. application Ser. No. 13/117,227 filed on May 27, 2011.

The current invention also CIP for

U.S. application Ser. No. 15,458,498 Filed on Mar. 14, 2017 (hereafter as #LLL-1) which is CIP filing for U.S. application Ser. No. 13,367,687 (hereafter as #LLL-2011) now pay issue fee.

U.S. application Ser. No. 12,938,628 filed on Nov. 3, 2010 (hereafter as #UU-2010) for Power strips or extension cord or LED light bar has built-in LED(s) and outlet(s) with additional added USB charger with USB-port(s).

The present invention provides improvements over the sealed-units disclosed in U.S. patent application Ser. Nos. 12/502,661, 12/292,580, 12/566,322, 11/498,874, 11/527,629, 12/622,000, and 12/624,621, which have uniform dimensions and shapes to fit into the same uniformly dimensioned compartment and thereby enable the universal sealed-unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit, conductive piece, contactor, receiving ends, output-ends, input-ends, electric parts and accessories, prong(s), rotating kits, cable with a plug, cable with USB-plug(s), printed circuit board, flexible printed circuit board, wires, a cable, a digital data cable, a conductive piece, or any related electric parts or accessories available from the marketplace to get electric power from a prong-cable, USB-cable has USB-plug(s), prong(s), or USB-receiving port has all kind of custom-Pins, outlet-unit's or USB-unit's receiving-end(s) (hereafter as outlet-ports or USB-ports) and supply power to a variety of electric devices.

The universal module has a same power-supplying function as the "sealed-unit" for the "LED light devices" described in the inventor's issued U.S. Pat. No. 8,342,732 (#I-1), U.S. Pat. No. 8,305,846 (#J-2), U.S. Pat. No. 8,231,246 (#EE-1), U.S. Pat. No. 8,002,456 (#GG-08), U.S. Pat. No. 7,726,839 (#V-08), U.S. Pat. No. 7,726,841 (#W-08), U.S. Pat. No. 7,726,869 (#Y-08), U.S. Pat. No. 7,618,150 (#S-07), and U.S. Pat. No. 7,722,230 (#AA-08) and U.S. patent application Ser. No. 12/566,322 (#M-1), Ser. No. 12/073,889 (#X-08), Ser. No. 12/894,865 (#T-1), Ser. No. 12/003,809 (#V-08) or the "outlet device" of the inventor's U.S. Pat. No. 7,824,185 (#BB-08). Furthermore, the interchangeable "sealed-unit or battery-pack" of the inventor's U.S. patent application Ser. No. 12/622,000 (#HH-09), Ser. No. 12/295,562 (#HH-1) also utilizes concepts shared by the present invention.

FIG. 1 is a front view of a desk top item (1 $a$) with LED (1 $h$) (1 $i$) and USB-unit(s) (1 $d$) (1 $e$) has USB Charging-port(s) as above discuss specification released on 2007 and upgrade on 2010 which can have charging capacity minimum 1.0 Amp up to 5 Amp or higher however The USB Charging-port(s) do not have digital data or electric data delivery while need such big and quickly charging speed. So, before 2007 all the charging from the out-of-date USB port is too small and less only 500 ma or lower charging capability and may have the overheating for fire risk. So, from 2007 to 2010 come out the current inventions said (USB charging-ports) has more strictly for USB Charging port(s) material and all details so can allow to quickly charge from minimum 1.0 A to 5.0 Amp and from 2007 to 2015 come out higher for 2.1 Amp or 2.4 Amp.

The current inventions disclosure the time table and USB development on the above discussion to make clear different for USB Charger limitation before 2007 and make big difference for any USB Charging-port preferred only has Charging-Function and not have the Digital/electric data delivery while for USB Charging ports if want to get safety and quickly Charging capacity as above reports shown evidence.

From FIG. 1, the USB-Unit(s) (1$d$) (1$e$) has USB Charging-ports for charging the energy-storage unit or assembly including the rechargeable batteries (not shown) inside the other electric or digital data device(s) according to a first preferred embodiment of the invention which has 2 USB-units (1 $d$) (1 $e$) and 1 outlet-unit (1 $f$) at the front of the base. The location for the USB-Unit(s) or Outlet-unit(s) preferred to arrange on front of the desktop items' front housing so people can easily to reach without move or turn direction of the items for every time to charge the other device(s). However, for Outlet-unit(s) or Outlet-Module(s) can put on back because it may SUPPLY power to the other electric device(s) such as printer, scanner, Fax machine which can just one time plug and not every day need to plug into the Outlet-unit or Outlet-Module. The laptop carry computer need every day repeat use Outlets-Unit or Outlet-Module so need to put on front or sides for easily operation.

The first preferred embodiment is a 12 LED USB light powered by a USB plug-wire means (1 $b$) (1 $c$) which can be an USB-plug (1$c$) or AC Plug (not shown) has wire from different power source.

$1^{st}$ type: The USB-Plug Wire can connect with the circuit which outside the desk lamp housing has at least one of the transformer, or adaptor, or invertor, or converter to change the outlet's AC current into DC current at outside circuit housing and outside circuit housing has the USB-receiving port(s) to accepted the USB-Plug-wires to build the DC current delivery from Outside circuit housing to the Desk Lamp housing. Or $2^{nd}$ type: The AC-Plug wire can connect with the AC outlets and get the AC current into the inside desktop housing's circuit which has at least one of the transformer, or adaptor, or invertor, or converter to make the input desktop housing AC current to change to DC current and has other electric parts & accessories to deliver the DC current to said USB Charging-port(s) or/and to LED light source.

The said $1^{st}$ type or $2^{nd}$ type of USB-Plug wire or AC-plug wire both has the said 2003 specification quickly charger USB charging-ports and includes an adjustment arm (1 $g$). Hereof, the 12 LEDs is offering the area illumination.

FIG. 2 is a side view of the first preferred embodiment of a desk top item (1 *a*) with LEDs (2 *h*) (2 *i*) showing 1 USB-unit (2 *e*) and 2 outlet-units (2 *d*) (2 *f*) on the side of the base. The LED means has 12 LEDs (21) in the USB-Plug-Wire as above discussed 1$^{st}$ Type preferred model which is powered light (2 *h*) and is powered from the USB plug-wire mean (2 *b*) (2 *c*) and has USB Charging port(s) 2(*e*), 2(*f*) to quickly charge the energy storage unit or assembly including rechargeable batteries inside the other electric or digital device.

FIG. 3 a first design of a second preferred embodiment which has 2 USB-unit(s) (3 *m*) (3*n*) has USB charging-port(s) (3*n*) (3*m*) to charge the energy-storage units or assembly DC current by the said USB Charging-port(s) has minimum 1.0 Amp and an outlet-unit (3 *p*) has outlet (3*p*) to supply the AC current to the prong(s) of the said other electric or digital device. Both have different power type and output to charge or supply different electric or digital data device(s).

The USB-unit(s) has USB charging-port(s) which has minimum DC current charging capacity at 1.0 Amp which equivalent 1,000 ma, or higher Amperage such as 2,100 ma units to charge the rechargeable batteries inside of the different electric or digital data device(s) such as an iPhone™ and iPad™ that have different requirement for charging current.

The Outlet-unit (3*p*) which get power from the outlet's power source which has unlimited AC current and will go through the conductive material and piece or assembly to supply the power to the outlet-unit (3*p*) at the desktop items housing to the prongs while the prongs of the other electric or digital device insert into the said desk lamp outlet-unit(s).

FIG. 3 shows a first design of a second preferred embodiment of the invention having the outside transformer (3*c*), or adaptor (3*c*), or invertor (3*c*) power source which get power from the outlet (not shown) by prongs (3*d*) and the said desk top item (3*a*) having 2 USB-unit(s) (3*m*) (3*n*) with different power output (2 USB units has 3 USB-ports) which has its 3 USB Charging-port(s) and everyone has minimum 1.0 A charging capacity to charge the energy-storage unit or assembly including rechargeable batteries inside of the computer, communication, or consumer electric products including the power bank which has a lot of rechargeable batteries assembly inside. such as an iPhone™ and iPad™ for DC current And 1 outlet-unit has 1 outlet-port has different current and to SUPPLY the AC current into the said other electric or digital data device(s)'s while the prong(s) of other device's insert into the said outlet-unit's receiving port(s). other device such as laptop computer for AC current to get the different requirements Here of the Desk lamp has the light source available from market place for any desire type including or Energy saving light source, EL, OEL, LEDs.

FIG. 4 shows a second design of the second preferred embodiment which has 2 USB-units and 1 outlet-unit to allow people to charge DC current power to an iPad™, iPhone™ by the USB Charging port(s), or supply power to the laptop computer, or other device by outlet-unit(s) or outlet-Module(s). Both can get power from the USB-unit(s) or outlet-Unit. The drawing also shows the differences between the first and second preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

The difference or variation or replaceable or alternative or replaceable including following parts for current invention;
(a) Light source
(b) Installation, location
(c) Installation space, compartment, room, housing, construction
(d) USB Charging-port 1.0 A, 2.1 A, 3.1 A, 1.2 A, 2.4 A, 3.6 A, 4.2 A, 4.8 A or any combination for the USB ports
(e) Power source come from: (e-1) AC Plug wire, (e-2) USB plug wire, (e-3) Outside housing Transformer, or invertor, or adaptor, or converter (e-4)
(f) Function of desk top items: as above discussed products.

Figure 5:
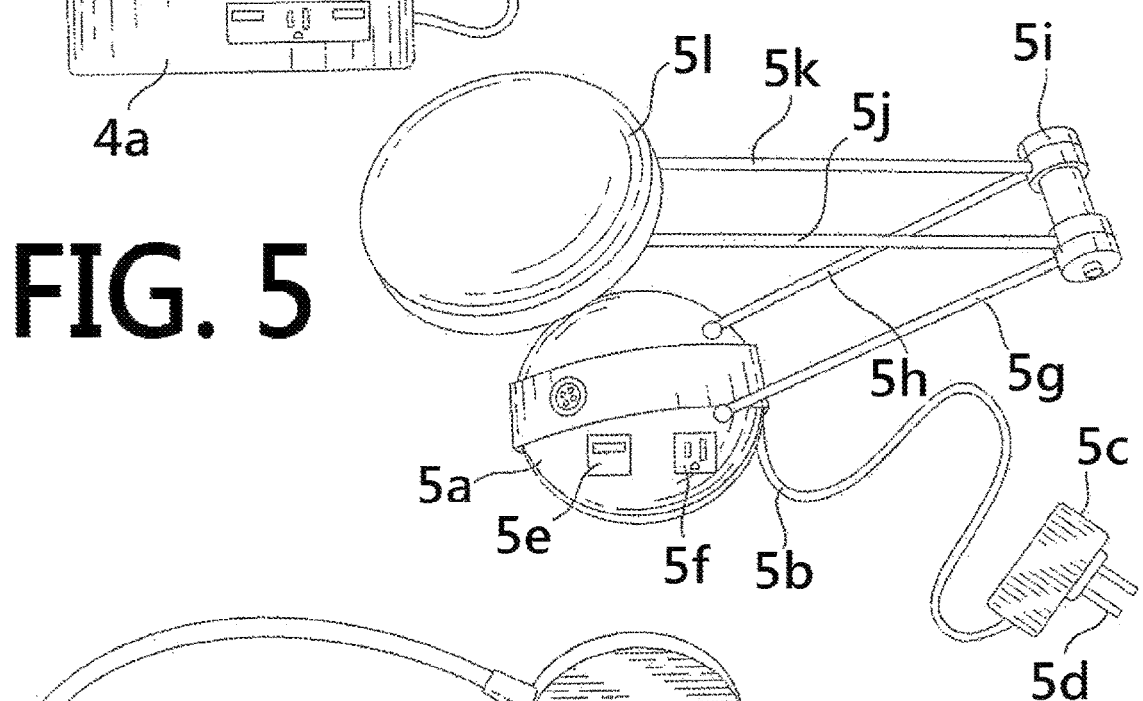
FIG. 5 shows a third preferred embodiment of a desk top item in the form of an LED lighting fixture with adjustable arms to enable adjustment of the height, orientation, direction, and/or angle of the LED lamp to provide the best illumination. The built-in 1 USB-unit has 1 USB charging-port has minimum 1.0 Amp or higher charging capability and 1 outlet-unit has 1 outlet-port has a lower cost than the above-discussed items with a plurality of USB-units and outlet-units, and is powered by a UL listed adaptor OR transformer plugged into a wall outlet that supplies 120 Volt AC current and transfer to DC current for USB-unit has 1 USB charging-port, rather than by a USB plug and wire for out-of-date earlier than USB Charging-ports definition release on 2007 and update on 2010 for charging higher than computer old-USB port only supply 500 ma and had heat issues and problem. The 2007 and 2010 new USB Charging-ports has minimum charging capability 1.0 Amp up to 5 Amp and Not Allow the digital data delivery while Charging the said energy-storage unit or assembly which may is a rechargeable battery. Any out-of-date before 2007 USB charger is not possibly get safety and steady and quickly charger compare with 2007 release and 2010 update for new USB Charging-ports which has none over heat and do not do digital data delivery while charging.

FIG. 4 shows a second design of the second preferred embodiment, which has 2 USB-units has 2 USB-ports and 1 outlet-unit has 1 outlet-port to allow people to supply power to, for example, DC current from USB-ports for an iPad™, iPhone™, and AC current from outlet-port for laptop computer or other device which can get power from the USB-units or outlet-unit. The USB-unit get power from outside transformer (4*c*), adaptor (4*c*), inverter (4*c*) to get desired DC current and the outlet-unit get power while prong (4*d*) connect with wall-outlets and directly deliver AC current same as wall-outlets current to outlet-unit. FIG. 5 shows a third preferred embodiment of a desk top item in the form of an LED lighting fixture (5 *a*) with adjustable arms (5 *g*) to (5 *j*) to enable the LED lamp to be moved to a desired height, orientation, direction, and/or angle to get the best illumination to people. The built-in 1 USB-unit (5 *e*) and 1 outlet-unit (5 *j*) have a lower cost than other above-discussed USB-units and outlet-units because they do not need to be made as compact. The desk top item is powered the transformer (5 *c*) (5 *d*) or a UL listed adaptor (5 *c*) (5 *d*) that receives power from a wall-outlet for 120 Volt AC current rather than the USB plug and wire of the first preferred embodiment. This kind of DC current already changed from AC to DC current can save a lot of work and labor for inner circuit because no need change AC to DC inside the desk top items housing. The inside housing circuit can be a simple or add other functions such as light sensor, photo sensor, motion sensor, blue tooth, infra-red wireless controller, wireless controller with Wi-Fi, APP software controller, or other wired or wireless operation, color changing, brightness changing, timer, time delay, image display, project image display, optics filter to reduce glare for vision improvement or other added functions, features, performance, effects for people eye, nose, mouth, ear, skin, body to make people more convince to use the desktop items has built-in USB-Unit, USB-Module, sealed unit, universal unit, outlet-unit, Outlet-module as above discussed.

Other features are this desktop items become universal model for all over the world so no need to change any inner circuit just change the outside housing transformer, or invertor, or adaptor, or converter specification and prong(s) specification, then, same desktop items with same inner circuit can sell all over the word.

FIG. 5 shows a third preferred embodiment of a desk top item has built-in 1 USB-unit (5*a*) has 1 USB-port and 1 outlet-unit (5*f*) has 1 outlet-port has a lower cost than the above-discussed items with a plurality of USB-units and outlet-units, and is powered by a UL listed adaptor OR a transformer plugged into a wall-outlet (not shown) that supplies 120 Volt AC current and transfer to DC current for USB-unit (5*e*) has 1 USB-port, rather than by a USB plug and wire (2*b*) (2*c*) or (1*b*) (1*c*). Whenever change the outside housing transformer, or adaptor, or invertor, or convertor and prong(s) specification even no need to change simple inner circuit can sell same function unit to all over the word. It also because the all AC to DC current change is made outside of desktop housing so the base or housing or unit of the said simple inner circuit will reduce to very slim and thin to make more value looking for sales!

Figure 6:
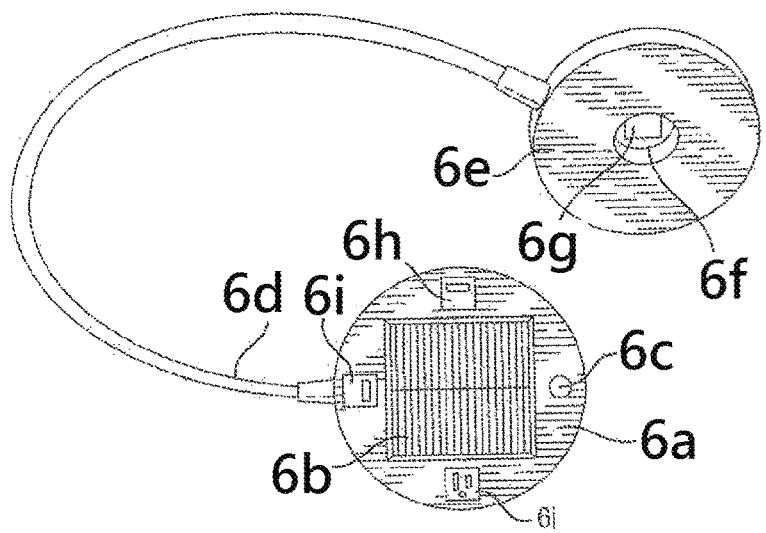
FIG. 6 shows a fourth preferred embodiment which is powered by solar power and stores the solar electricity inside rechargeable batteries to provide enough power to charge other electric or digital data device(s) through built-in USB-unit(s) and outlet-unit(s) incorporated with proper circuit, or controller for quickly charging capacity, or voltage pump-up circuit, means to meet market requirements. The current embodiment, the Solar or chemical powered Desk lamp which get current from Solar or Chemical already is DC current so no need transformer to make the current change from AC to DC.

FIG. 6 shows a fourth preferred embodiment which is powered by a solar power array (6 *b*) and which stores the solar electricity inside rechargeable batteries that have enough power to charge other electric or digital data device(s) though the built-in USB-unit(s) (6 *i*) (6 *h*) and outlet-unit (6 *j*) having appropriate circuit means to meet market requirements.

It also can incorporate with the co-inventor's pending filing to use the inventor's pump up inner rechargeable batteries output-end voltage so can charge the higher voltage of the desk lamp items' input-current voltage.

FIG. 7 also shows the fourth preferred embodiment, which the desk top items is a desk lamp can also be powered by other available power sources including wind power, chemical power, battery power, a generator, a transformer, adaptors, an inverter, an inductor, etc. FIG. 7 also shows the fourth preferred embodiment, which The big base (7*a*) of the Desk top item has sufficient space within so can install all kind of USB-unit(s), Outlet-unit(s), USB-module(s), Outlet-module(s), Sealed-unit has number of the said USB-outlet(s) and/or Outlet-unit(s), Universal unit has number of the said USB-outlet(s) and/or Outlet-unit(s) has relatively universal compartment to fit within, The said such big base (7*a*) of the desk top item can also be powered by wind power, chemical power, battery power, a generator, transformer, adaptor, inverter, inductor from the cable (7*e*).

FIG. 8 shows that the base of the desk top item of the first preferred embodiment incorporate with different light source application (Light source is not shown) may be made thicker or higher to accommodate bigger size electric parts and accessories to save a lot of the cost of super compact, slim, or cute size electric parts and accessories. Furthermore, the thicker or higher base can also accommodate a rotating USB-unit(s) or USB-module that can be rotated from a first surface to a second surface so that the first surface of the USB-module will look nice when the USB-unit(s) or module is not in use. Details of the rotating USB module can be understood from FIGS. 18, 19, 20, 21, and 22, the details of which are explained in the inventor's co-pending U.S. patent application Ser. No. 13/117,227 (#FFF-11) and Ser. No. 12/950,017 (#CCC-10). It will be appreciated that the details disclosed in the co-pending application may be applied to the present embodiments without departing from the scope of the current invention.

All the above discussed the USB Charging-port(s) of current invention as the definition released on 2007 and update 2010 for (AAA) Quickly charger which minimum had 1.0 Amp to 5.0 Amp charging capability (BBB) While quickly charger with higher over 1.0 Amp capacity, not allow for any digital or electric data transit or deliver by same USB-unit or USB-Module or USB Charging-ports (CCC) the out of date earlier than 2006 has limited for charging capacity less than 500 ma or so and has risk for overheat because the USB-ports the specification or construction or conductive cross section is too few to carry bigger current go thought and cause over-heat and has fire risk (DDD) The USB charging ports of current invention only allow one of input current not workable for more than one input current such as sometime is AC and while power fail use DC battery power as input power (EEE) The USB charging ports as current invention only has Charge DC current by USB-port or SUPPLY AC power by Outlet unit. No any digital/electric data delivery or transmit for quickly charger USB-Port as current invention (FFF) The current invention has housing, space, compartment, room to install the said circuit and related electric parts & accessories inside the desktop housing (GGG) The current invention has movable, removable, Universal USB-Charger unit can install, movable, removable, replace feature too. (HHH) The current invention USB-Charging ports incorporate with jump-wire or bridge-wire or USB-wires has 2 male plug and one plug into the Desktop USB charging-ports and one other male-plug into the Other device's USB-Plug receiving ends (device's USB-port) to make the current delivery from Desktop to the other device. (III) The said USB-Wires has 2 mail plugs, the 2 male plug can be any type including Type A, Type B, Type C for construction. (JJJ) The said USB-Wire has 2 male plugs; everyone plug needs to match the USB-female receiving ports for Pins. Maybe the same or different on the size can be standard Type A, Mini, or Micro USB specification if the receiving-end match the Plug-in-end for pins.

FIGS. 9, 10, 11, and 12 show fifth and sixth preferred embodiments which also have a thicker or higher (9*h*) base for the desk top items with LED means where the LED is an indicator light (9*p*) for charging status, and to which rotating USB-modules having a plurality of USB-unit(s) and other receiving means (hereafter as other-ports) can be added to increase the number of function(s), feature(s), effects, and/or performance(s). The USB-modules (9 *k*) to (9 *m*), (10(*g*), and (11 *e*) to (11 *j*) of these embodiments have more than 1 surface to enable different surfaces to be exposed for different purposes. The more than 1 surface of the USB-module can be any number from 2 to N. From FIG. 9 can see the USB/Outlet module has 2 of the USB-unit(s) (9*m*) and 3 of Outlet-unit(s) (9*n*) and one LED charging indicator light (9*p*) which show people the USB-unit(s) is charging now and one of the marking plate (9*l*) to show all the 3 outlet-unit(s) max. wattage can use such as 1,650 Watt for all other electric device total rating, but not for 1,850 Watt which is for hair-dryer or heater device. The release (9*j*) is a locker and also is an elastic-release while touch it the module will automatically rotate from surface (9*i*) and change to the other surface which has all the USB-Unit (9*m*) or/and Outlet-unit (9*n*) or/and other type of receiving means including Wi-Fi, internet, phone, digital data, or any other receiving means for electric or digital data device(s). The switch (9*f*) turn-on and turn-off the said Bulb or CFL or energy-bulb or fluorescent-tube light source of the top part of the desk top items or the other functions on top of the said desk top item. The said electric wire or code and the plug which has no any transformer or adaptor or invertor inside so the current from the Prong (9*d*) for 120 Volt Alternative current directly to deliver to the inner circuit means to change from AC to DC for USB-unit(s) and at the same time the prongs (9*d*) also deliver the 120 Volt AC current to the rotatable module's Outlet-unit(s) to supply the 120 Volt AC current to other electric device. The same time the function of the top part of the desk top item has its own electric arrangement to keep the original pre-determined or existing functions.

FIGS. 9, 10, 11, and 12 show fifth and sixth preferred embodiments in which desk top items with LED means as charging status indicator light (9*p*), It also have a thicker or higher (9*h*) base, and which can add rotating USB-modules with a plurality of USB-unit(s) (9*n*) or/and Outlet-unit(s) (9*m*) or/and a plurality of other receiving means (hereafter as other-ports) to increase the number of function(s), feature(s), effect(s), and/or performance(s), the USB-module having more than 1 surface (9*i*) and the capability of changing the surface for different purposes (9*k*).

From the FIG. 9 shown the any kind of light source desk lamp (9*a*) which has 2 rotatable Module (9K) (9*j*) and each of rotatable module (9*k*) (9*j*) has built-in desire number of the
1. USB-Units (9*m*) or/and
2. Outlet-unit (9*n*) or/and
3. USB-Module (combine the 2 USB-units into one piece and in one housing or PCB) or/and
4. Outlet-module (combine the 3 outlet-units into one piece and in one housing or PCB) or/and sealed-unit (has more than one of UBS-unit(s) or/and
5. outlet-unit(s)) or/and
6. universal-unit (at least has one USB-unit or/and outlet-units has housing to fit into uniform compartment which within many of the desk top items housing)

to get desired functions. It also has switch means to turn-on or turn-off the said Light source for desk lamp or top part of desk top item's function as existing. The one LED indicator light (9*p*) on the one of the rotatable module's surface (9*k*) to show the charging status.

From the FIG. 10 shown the thicker and curved base for Desk top item which is a desk lamp (10*a*) has desire light source for illumination. The desk lamp (10*a*) has wired plug (10*b*) (10*c*) to connect with wall-outlet (not shown) and has AC 120 Volt current input into inner circuit (not shown) to transfer the wall-outlet's 120V current into USB-unit(s) needed the DC current and supply the wall-outlet's 120V current to the Outlet-unit(s). The said bulb, incandescent light, florescent light or CFL or energy saving light source is turn-on or turn-off by the switch (10*f*) or sensor (10*f*) or remote control (10*f*) on the base (10*a*) top or side of the surface.

From the FIG. 11, shown the base (11*a*) of the said Desk top lighting which may has any type of the light source (not shown on top part) which has the Rotatable module (11*f*) which has desire number of USB-Unit(s) or/and outlet-unit(s) and optional LED to shown charging status as indicator light. The said base (11*a*) not only has rotatable module (11*f*) and but also has additional outlet-unit or outlet-module(s) (11 *c*) (11*d*) to allow to charge or supply AC power to the other electric or digital device which need AC current input to make operation. It also can have more outlet-unit(s) up to 1 to N number (N can be any number) if the base can fit within the plurality number of the said Outlet-unit(s) so the current invention's desk top items base (11*a*) can replace the market existing power-strips which lay on the ground to supply the same 120 Volt current.

From the FIG. 12 also shown the preferred embodiment which the said Desk Top item is a lighting has preferred light source may select from bulb, CFL, incandescent, energy saving bulb or tube as light source which has big base (12*a*) and the rear-side of base has 3 or plurality of the outlet-unit(s) from Number 1 to any number so it can connect with other electric or digital data devices to supply or charge the other devices. The special design for current invention transformer (not shown), adaptor (not shown), inverter (not shown) inside or outside base which not only supply the DC current to the USB-units but also supply AC current to the said plurality of the AC Outlet-unit(s) while the said transformer, inverter, adaptor has special design for 120 Volt current not passing though the current changing circuit for the special model for current invention. From FIG. 12 shown the wired plug (12C) has prong (12*d*) has no any circuit inside so can deliver the wall-outlet 120 Volt direct to the base (11*a*) 3 outlets to let people to connect with the desk top laptop, or speaker or lava light or other electric or digital devices which need 120 Volt AC current to operation.

The plurality of outlet-units or Outlet-module can install on rear-ends or sides of base of the lighting device, so it can have nice and net wires arrangement on the surface such as desk top or floor for floor lamp base. This kind of arrangement for base of lighting device will save people to use a lot of power strips or power cords or extension cord which is ugly and occupied too many wall-outlet space and outlets. This is other feature for current invention has a plurality of Outlet-unit or outlet-module on the base of ling device. It can add the surge protection for such more than 3 outlet-unit or 3 Outlet-module so can have 1 more Plus feature of this Outlet-unit on the base of lighting device.

FIG. 13 shows a desk top item (13 *a*) which has a super big base (13 *h*) so that a plurality of rotating USB-Modules (13 *c*) to (13 *g*) can be installed to enable a group of people to charge their electric or digital device(s) at the same time, such as in a train station, bus station, airport, meeting room, hotel lobby . . . etc.

FIG. 14 shows desk top items with LED means (14*c*) is a function indicator light to shown the charging status or power-on-off status and USB-unit(s) (14 *h*) (14 *g*) (14 *p*) (14 *q*), USB-module(s), or outlet-unit(s) (14*i*) (14 *j*) (14 *n*) install on the pole or base or part of the said Desk Top items to allow people to charge other electric or digital device(s), the items has at least one of the functions including a radio (14*d*), timepiece (FIG. 27), weather station display (FIG. 27), fruit blender, food machine (FIG. 28), liquid machine (FIG. 25), LED lighting (FIG. 1 to FIG. 6), light fixture (FIG. 7 to FIG. 12), projector or image presentation or reflection (FIG. 24), electric fan (FIG. 29), heater or any conventional items (FIG. 28) with LED built-in as indicator light (FIG. 9 to FIG. 11 on module surface) or the said LED is light source to offer the area illumination (FIGS. 1 to 6 as light source), or shown digital time (FIG. 27), or shown image (FIG. 24), or shown the charging status (FIG. 9 to FIG. 11 on module surface). The said other functions or the said USB-unit(s) or Outlet-unit(s) can install on the any-where of the base, pole, steps, flat areas of the said Desk top items and not limited only on the base one surface as FIG. 14 shown.

Figure 16:
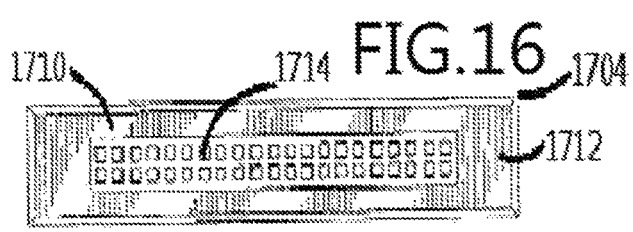
Figure 16A:
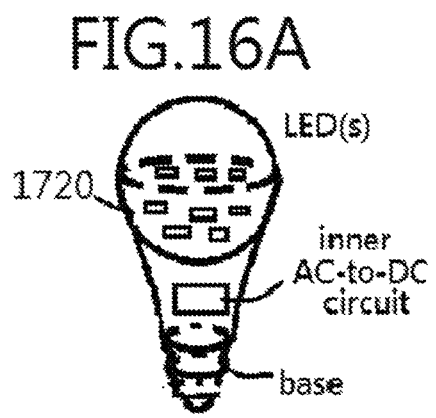
Figure 17:
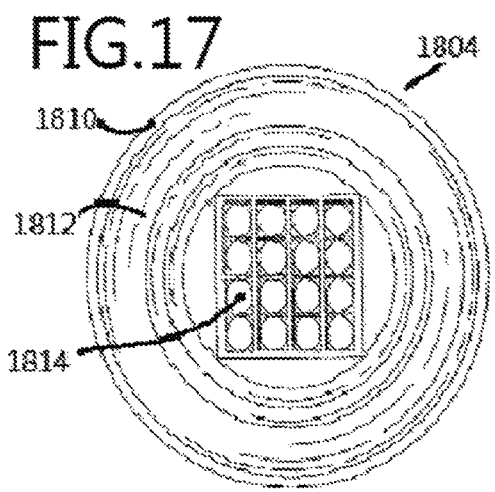
Figure 18:
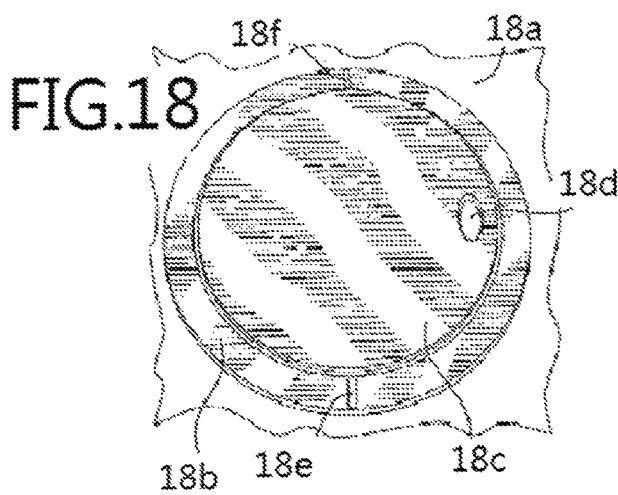
Figure 19A:
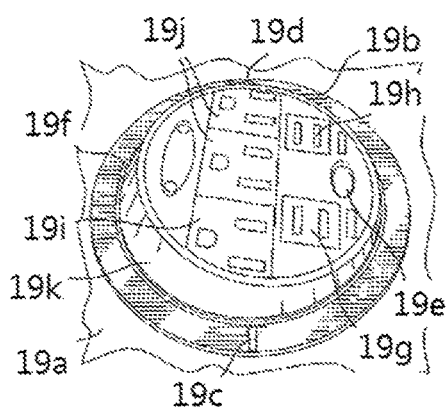
Figure 19:
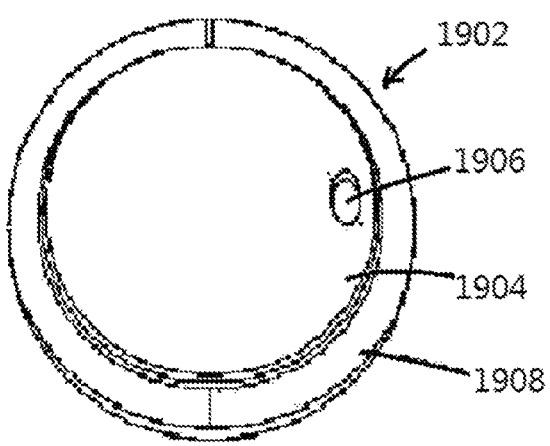
Figure 20:
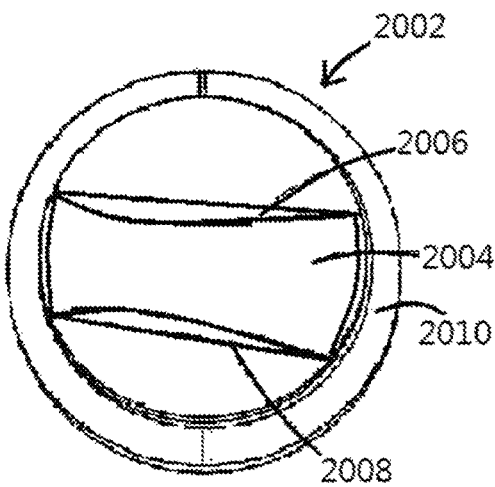
Figure 23:
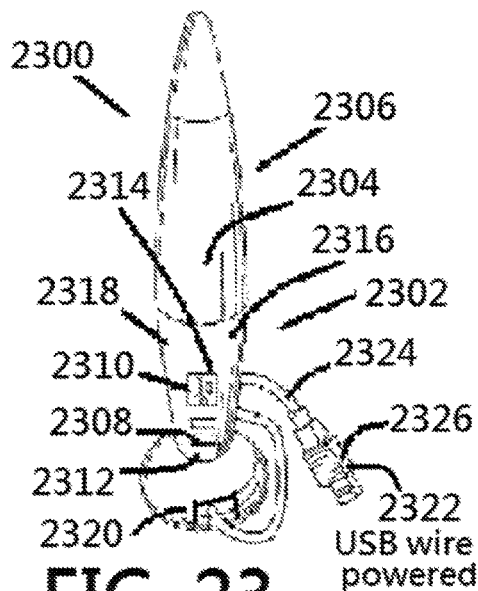
Figure 24:
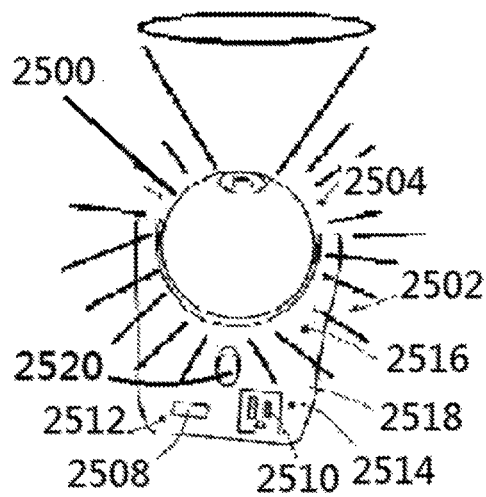
Figure 25:
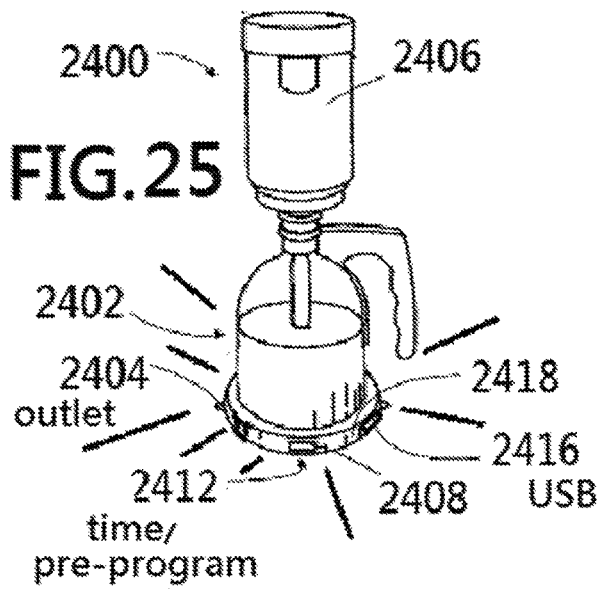
Figure 26:
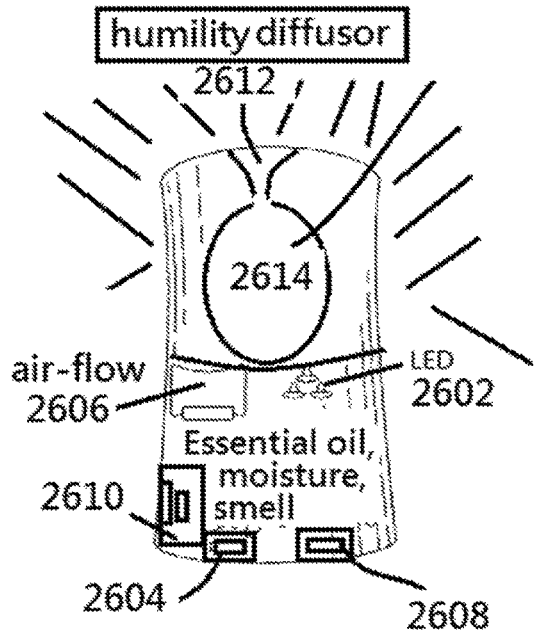
Figure 27:
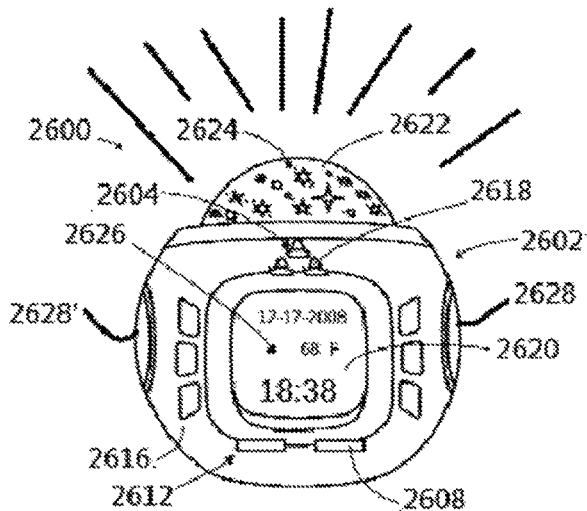
Figure 28:
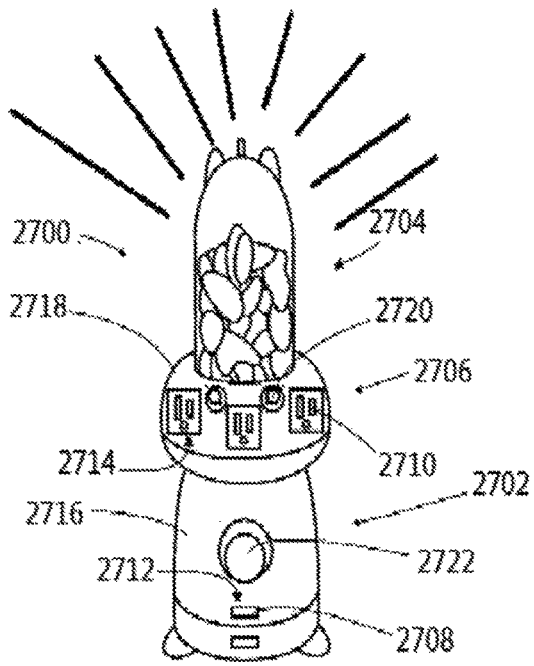
Figure 29:
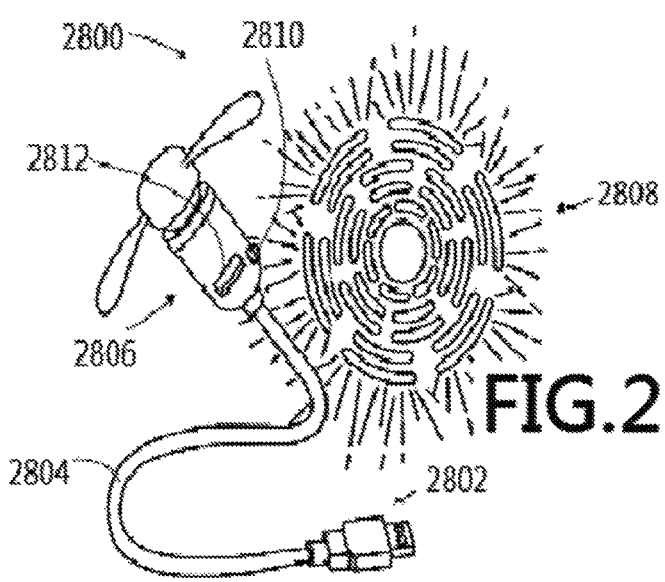

FIGS. 15, 16, and 17 show different LEDs arrangement used for LED lighting as light source to offer the areas illumination in the above-discussed preferred embodiments or other LED desk lamp or LED lamp for a desktop.

FIGS. 18, 19, 20, 21, and 22 show details of a USB-Module (18 *b*) (19 *b*) with at least one USB-unit (19 *g*) has 2 USB-Ports and a plurality of an additional receiving means, which may include a USB-unit(s) (19 *h*), outlet-unit(s) (19 *i*) (19*j*), internet-unit(s), adaptor-unit(s), other light means, or another light source with appropriate parts and accessories, or any conventional available receiving means, the USB-module (18 *b*) (19 *b*) having at least more than 2 surface(s) (e.g., surface (18 *c*) on one side and the USB-unit(s) on the other side), each surface with its own special design and its preferred receiving means from above listed type to has desired functions to let people to use.

FIGS. 23, 24, 25, 26, 27, 28, and 29 show all kinds of desk top items which offer function(s), effects(s), performance(s) to people's eyes, nose, mouth, and ears so that people stay nearby for a period as they work, rest, sleep, or stand. The desk top items each have
(A) LED (for area illumination or indicator light to shown charging status or create image for time or projection image as above discussed) and (B) have a USB-unit(s) has its own quickly Charging-sport(s) has minimum 1.0 Amp to 5 Amp charging capacity as specification release on 2007 update on 2010 to charge energy-storage unit or assembly including rechargeable-batteries inside of the other electric or digital data device(s)

and are arranged to
1. generate, exhibit, or provide light beams, or offer area illumination
2. show or present the image, at least including of a projection, a time display, a clock,
3. Offer or play music, sound,
4. Display photos, digital signals,
5. Create or produce the air flow at a desired temperature, moisture, steam, smells,
6. Offer the liquid, coffee/tea, and/or food, or
7. to serve as any other conventional device For people stay around for period while their other devices are charging.

At least one of the desk top device may include at least one of function(s) for people eye, ears, nose, mouth, skin to feel or sense or eat or smell or see or hear and the device let people to can easily to reach, touch, operate, or manage the said desk top device.

The device has desire number of the USB-Unit or USB-Module or Outlet-unit or Outlet-module or Sealed-unit or Universal-unit are installed or arranged on or within the device's substrate(s), base, pole, LED light housing. And the desk top device is arranged on the location, or place where people will stay for period, such as a desk, table, bed, chair, land, grass, or wherever else people work, rest, sit, stand, sleep or a take nap.

The as noted above, the desk top items may offer electric signals or visible or audio or smell or food or air functions related to people's eyes, ear, nose, mouth, or body, such as illumination, sound, images, brightness, visual effects, smell, water, liquid, food, wind, moisture, airflow or any conventional functions of electric devices, such as LED lighting, a clock, projector machine, image to see, digital photo frame, time display, air freshener, electric perfume freshener, moisturizer, electric fan, electric heater, electric steam spreader, electric cooler, electric air conditioner, or other conventionally available items that can be placed to let people easily reach, touch, operate, or manage the objects.

The desk top items may be powered by a direct current (DC) power source or alternating current (AC) power source having appropriate electric parts and accessories or components, such as circuit, IC, sensor, a motion sensor, timer, time delay, timer, resilient kits, conductive kits, transformer, inverter, adaptor, wire, prongs, UL listed adapter, PIR remote controller, infrared controller, wireless controller, blue-tooth controller, Internet controller, Wi-Fi controller, master power controller, and/or AC power outlet-unit(s) to offer electric power at a voltage (Volt) and amperage (Amp or ma) sufficient to achieve a desired charging time. The USB-unit(s) only serve as a power source for charging energy-storage unit or assembly including rechargeable batteries inside the other electric or digital device(s) and do not have an electric data transfer function. If plurality of USB-unit provided, the USB-units can be arranged to have different output power to charge different electric or digital data device(s). If additional outlet-units are provided the outlet-units may be AC outlet-unit(s) that serve as an AC power source with optional surge protection features.

Electric or digital data device(s) that may be charged by the USB-unit(s) by its USB Charging-ports for quickly charger capacity minimum has 1.0 Amp capacity include an MP3 or MP4 player, smart phone, computer, iPhone™, iPad™, video game, digital visual equipment, communication equipment, and other consumer electric products including the rechargeable batteries application such as Power bank for storage power tank.

The USB-unit or USB-module of the preferred desk top items may be turned on or turned off for a predetermined time by switch, sensor, timer, photo sensor, motion sensor, time delay, and/or master control power controller, infra-red wireless, remote controller, wireless controller, APP software, Wi-Fi or internet or network wireless controller, Z-wave remote controller.

All receiving port(s) in the desk top items, including USB-units or USB modules, may have a removable cover to allow kids or others to safely touch the items and prevent dust, or water from getting into the receiving means.

The USB-unit or USB-module to charge other electric or digital device(s) can be removable from the desk top items and carried with people to use when people leave the desk top items. For this purpose, the USB-unit(s) or USB-module(s) can be disassembled from the desk top items and re-assembled into the said desk top items by quick connector means, adaptor means, assembly means, or fixing means, with each of the USB-unit(s) or USB-module(s) having its own safety certification(s) so that the individual USB-unit(s) or USB-module(s) can be tested by safety authorities and sold separately.

The USB-unit(s) includes USB charging-ports which is an electric charging unit which has a USB-female receiving end to receive a USB-male plug from the USB-wire which has 2 male plugs on 2 ends to deliver electric power from the USB-female receiving means (USB Charging-ports) to the other device's/USB-wire's USB-male plug. The preferred USB charging-ports (USB-female receiving means) gets power from a power source and uses its circuit to convert or transform the electric power to a desired waveform, voltage, and current enough to charge Energy-Storage unit or assembly inside of the other electric or digital device(s) through the USB male plug insert into desktop items USB-female receiving port.

The items of these embodiments may be in the form of lighting, a desk lamp, table lighting, lava light, projection light, time piece, electric fan, air freshener, indicator coffee machine, indicator sound device, and visual device has LED(s).

FIGS. 30,31 show the quick charger system which has minimum output current is 2.1 Amp which is the current invention features and claim basing on 2010 Wikipedia details described on above details. This also is evidence before USB 3.0 specification and definition came out on 2010, marketplace do not have any USB can charge bigger current such as 2.1 Amp to meet the safety standard. The following section also have details discussion for USB 3.0 VS. Apple company start to use USB port on 2012 from I-Phone 5. Before 2012 I-phone and all other phone use multiple pins connector.

FIGS. 32A1, 32A2P 32B1, 32B2, 32B3, 32B4, 32C1, 32C2, 32C3, 32C4, 32C5, 32C6, 32C7, 32D1, 32D2, 32D3, 32D4 show some preferred embodiment for the above discussed for parts as below listed.

FIG. 32A1 (1) USB-unit: The Unit means it is an individual charger has only charger purpose to have one input-current and passing though inner own circuit to make input current change to one output current to charger other device from its own USB port(s). This unit can be housed or without any hosing and install within the said desk-top housing and all live-wired or electric-carried parts & accessories not touchable by people except the USB-port(s).

The Charger only take 1 and only 1 of the input power or current and passing through inner circuit to come out the DC current on desired voltage and amperage. It cannot have more than one different input current such as AC or DC current as input current or it will be destroying the output current because inner circuit is fixed for one and only one current specification.

FIG. 32A2P USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top housing and all live-wired or electric-carried parts & accessories not touchable by people except the USB-port(s).

FIGS. 32B1, 32B2, 32B3, 32B4 shown Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to another device's prong to get into other device's circuit to power other device. This unit can be housed or without any hosing and install within the said desk-top housing and all live-wired or electric-carried parts & accessories not touchable by people except the USB-port(s).

FIGS. 32C1, 32C2, 32C3, 32C4, 32C5, 32C6, 32C7 shown Sealed-unit: This is a unit which has desired combination for any number of USB-unit(s) or/and outlet-unit(s) arrangement or combination and sealed into one piece of the housing and passed all USA required related safety standard(s) and get test labs' certification for this sealed unit only which not including the other housing parts or accessories non-related to the USB or Outlet charger. This sealed unit any live-wire or electric-carried parts & accessories must seal so called sealed unit so can pass the US Safety standard requirement(s).

FIGS. 32C1, 32C2, 32C3, 32C4, 32C5, 32C6, 32C7 shown Universal Charger: This is charger which has finished housing and electric-contactor such as prong means, or wired, or quickly-connector(s) which not only can incorporate with the said desk-top units, but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong means plug-into outlet on wall or power strip's outlets. This is definition for universal charger for current desk-top items.

From above discussion for the USB Charging-port which has minimum 1.0 Amp to 5.0 Amp or higher amperage to allow people to get short time charger without any digital or electric data delivery is different with out of date 500 ma slow charger and has digital data delivery which will cause the overheat and fire risk. The current invention also has one and only one power source which is not like has AC input or Battery power pack to supply more than one power source into to make to the USB port which is not practical and increase a lot of trouble for construction and expensive.

The current invention as co-inventor parent filed including: This application is a continuation of (#GG-4C) U.S. patent application Ser. No. 14/827,810 filed on Aug. 17, 2015 which is Continuation of (#GG-3C) U.S. patent application Ser. No. 14/643,026 which is Continuation of (#GGG-2C) U.S. patent application Ser. No. 14/548,620 which is Continuation of (#GGG-1C) U.S. patent application Ser. No. 14/540,561 which is Continuation of (#GGG-4) U.S. patent application Ser. No. 14/189,162 now is U.S. Pat. No. 8,931,947 which is continuation of (#GGG-3) U.S. patent application Ser. No. 14/144,703, filed Dec. 31, 2013, which is continuation of (#GGG-2) U.S. patent application Ser. No. 14/105,737 now is U.S. Pat. No. 8,911,137 which is continuation of (#GGG-1) U.S. patent application Ser. No. 14/105,607 now is U.S. Pat. No. 8,915,608 which is continuation of (#GGG-2011) U.S. patent application Ser. No. 13/161,643 now is U.S. Pat. No. 8,783,936, these parent filing case cover all desktop items and lighting device and desk top items.

Furthermore, The current invention offers a simple way to install a power station or products on a desk surface so that there is no need for people to bend their body or knee to a lower position in order to obtain charging and prevent injury or damage to the human waist and knee. Furthermore, From FIG. 33 and following drawing, the current invention one power station circuit to supply more than one of USB-unit(s) which separated with other housing of USB-unit(s) and each of separated USB-unit(s) has its own branch-wire to connect with the power source which is one of (1) Plug-in wall transformer, or (2) external DC power source, (3) Main power station has built-in AC-to-DC circuit to output pre-determined DC current for USB-port(s) built-in more than one of the USB-unit(s) which get power by branch-wire(s) with or without connector, quickly connectors, wired kits.

Furthermore, From FIG. 33 the separated USB-unit(s) (218 FIG. 33) of USB power station system. The output main-wire and branch-wire(s) is one of
(aa) DC power from branch-wires and main output wire (172) by USB-plug, or
(bb) DC power from branch-wires and main output-wire (171) by external AC-to-DC circuit or transformer, or
(cc) DC power from branch-wires and main output-wire (271) from AC-to-DC circuit built-in of desktop power station.

It is appreciated all these wire arrangements for output main-wire and plurality of branch-wire(s) with preferred length so can have only one power station with many individual housing USB-unit(s) to put on many different locations to save people money.

The said plurality separated individual USB-units has its preferred length so can have one power station on living room and put separated individual USB-unit(s) on different desk or table or couch or seat to offer each seated person to charge their i-phone or i-pad as the earlier (#FFF-2011) FIGS. shown the more than one USB-unit(s) connect with USB-plug or external transformer or AC-plug power station circuit.

It is appreciated all the other US prior arts which filed before 2010 is not able to supply USB output current higher than 1.0 Amp because USB 3.0 which can supply bigger current up to 2 Amp announced on 2010. Also, I-phone and i-pad applied Type A to get power and input DC power from Micro-USB, Type C is start from 2012 of i-phone 5 on 2012.

Majority power station or desktop items has the USB charger which 100% is male-plug to directly connect with be-charge other phone before 2012, even i-phone 1 to 4 use the 30 pins female receiving port, and other phone use different female receiving port(s). Hence, any patent filed before 2010 is not proper US prior art again the current invention (#FFF-2011) and (#GGG-2011) filed case products has FEMALE receiving port(s) which is male-plug of TYPE A of external outside one end of USB-wire. Other at least one of male USB-plug is one of micro-USB, or others which matching the be-charged products female receiving port(s).

The current invention for desktop item or The power station of the invention can be adapted to include the unique features described in the inventor's co-pending U.S. patent filings in order to supply power to charge the majority of electric, digital-data, audio, video, or internet devices on a desk top without the need to frequently bend the body to or near the ground when connecting to an outlet or USB port, or making use of an LED unit. Wherein, the charging or DC current delivery between desktop USB power station itself or branched USB-unit(s) to be-charged products by external USB-wire(s) which has at least two end(s) with at least one of male-plug(s) on each one end.

This is not same as all Desktop items with USB charger before inventor earlier and parent filed case. Those out-of-date USB charger device for built-in or added-on has MALE PLUG which matching all kind of different FEMALE receiving port(s) of NOKIA, ERICSON, SONY, MOTOROLA and each of them with different FEMAL receiving ports so not good for universal until 2012 i-phone 5 start to incorporate with external USB wire has 2 ends at least one end is Type A to get power and other end is preferred female receiving ports, so only need have right USB wire, the said Desktop or Wall mounted USB charge can have uniform have Type A USB-Female receiving ports to get universal products.

FIG. 33 shows a device having only 2 USB ports (216) without an AC power source outlet(s), so that can be powered by at least one
(1) AC-plug wire to get AC power and connect device built-in AC-to-DC circuit, or
(2) External AC-to-DC transformer, or
(3) External DC power source by small gauge USB wire or conductive wire;

FIG. 33 show one of preferred USB device has AC-plug (217) power input wire (174) to supply AC power to the USB-charger. This kind of USB charger may be installed on a desktop or other surface at a hand-reachable location using traditional attachment kits such as glue, double sided tape, Velcro tape, catches, hooks, screws, a suction cup, magnetic-means, catch-means, hold-kits, heavy-unit(s), catch-holder sets, or any other attachment kits or fixing-sets; to enable easy use of the USB charger within the hand reachable distance such as desktop or table wall or table legs or bed walls or bed legs.

While the USB device has any number of built-in AC outlet(s), it needs to use heavy duty electric cord such as #14 gauge and very good attachment device or kits so can hold the USB device having outlets on the desktop or other surface. The good attachment enough to overcome the very heavy weight of the #14-gauge wire. The USB device may has storage-wire arrangement to hold, store, coil, receive, release, pull, twist, extend, fold, and/or retract a wire by a spring, elastic, roller, or rotating means to cause the wire to be well arranged to achieve pre-designed requirements, performance, functions, or effects. Same as storage wire-arrangement, the device optional having at least one (a) space or construction or electric system to arrange be-charged products fit within the space of USB device, or (b) space to offer be-charged product can be charged by wireless charging system.

FIG. 33A, show the co-pending filed case U.S. application Ser. No. 13/117,227 (hereafter as #FFF-2011) FIG. 16 items G, H, I shown, the one USB device has more than one of separated USB-unit(s) (161) and each separated USB-unit(s) (161) powered by external DC power source by at least one of power source which may selected one from;

(aa) From FIG. 33B, DC power from branch-wires (175) (176) which connected with USB device output main-wire (174) shown on drawing wires, it also shown on FIG. 4A Item by USB-plug (160), or From FIG. 33B show the DC power source is one of USB male-plug (172) connect to DC power source (not shown) which may be a DC storage device or DC generation or DC Power bank or computer have female Type A or Type C or other type port(s), and through the output main-wire (174) and branch-wires (175) (176) to deliver DC power to each USB-Unit(s) (218) each having preferred length of branch-wire(s) to make preferred distance to deliver DC power to at least two USB-unit(s) located at different and space away locations.

(bb) DC power from branch-wires (175) (176) as shown on FIG. 4B drawing wires or two branch-wire (160) of FIG. 33A Item I. The more details shown on FIG. 4B DC power is from external transformer (171) output main-wire (174) through the output main-wire (174) and go through connected branch-wires (175) (176) to each separated USB-unit(s) (218).

(cc) DC power from branch-wires (175) (176) and main output-wire (174) from AC-to-DC circuit (713) built-in of desktop power station.

Any one of above (aa) (bb) (cc) to supply more than one of USB-unit(s) (218) which separated with others USB-unit(s) and each of separated USB-unit(s) has its own branch-wire (175) (176) to connect with the power source output main-wire (174) which is one of
(1) Plug-in wall transformer (171), or
(2) external DC power source (not shown),
(3) Main power station (218M) has built-in AC-to-DC circuit (173) to output pre-determined DC power to at least one of USB-port(s) (16) built-in numbers of separated and distance away USB-unit(s) (218) which get power by branch-wire(s) (175) (176) with or without connector, quickly connectors, wired kits.

Furthermore, From FIG. 33B shown more than one of separated USB-unit(s) (218) of USB device or power station system (218M). The output main-wire (174) and branch-wire(s) (175) (176) is one of (aa) DC power from branch-wires (175) (176) and output main-wire (174) having USB-plug (172), or
(bb) DC power from branch-wires (175) (176) output main-wire (174) is from external AC-to-DC circuit or transformer (172 or TRF), or
(cc) DC power from branch-wires (175) (176) and output main-wire (174) from AC-to-DC circuit (173) built-in of USB device or power station (18M).

From FIG. 33B also show all main-wire or branch-wire no need use #14 gauge AC wire because it only carry the DC current, so for the Desktop or floor lighting or USB device without AC-outlet(s) it can use #18 gauge wire so can save a lot of cost.

It is appreciated all these power-wire arrangements including output main-wire and plurality of branch-wire(s) with preferred length; these power-wire(s) arrangement only for one USB device or power station, so the current invention only need one USB device or power station can supply DC power to many individual USB-unit(s) to put on many different locations to save people money.

The said plurality separated individual USB-units has its preferred length so can have one power station on living room and put separated individual USB-unit(s) on different desk or bed side wall, side bed table, bed frame, couch, floor lamp surface, pole, bar, stand, or seat to offer person to charge their i-phone or i-pad as the earlier (#FFF-2011) FIG. 33A shown the more than one USB-unit(s) (218) connect with USB-plug (172) or external transformer (171) or AC-plug USB device or power station (173) built-in AC-to-DC and other circuit (173).

It is appreciated all the other US prior arts which filed before 2010 is not able to supply USB output current higher than 1.0 Amp because USB 3.0 which can supply bigger current up to 2 Amp announced on 2010 as above listed inventor parent filed case details description for Wikipedia reports of (#GGG-5) (#GGG-6) (#GGG-7) (#GGG-8) (#GGG-9) (#GGG-11).

Also, i-phone and i-pad applied Type A to get power and input DC power from Micro-USB, Type C is start from 2012 for i-phone 5 on 2012.

Majority US prior arts for power station or desktop items has the built-in USB charger which all built-in USB charger is one of male-plug to directly insert the MALE plug into the be-charge products FEMALE receiving port(s) before 2012. This is totally different with current invention the USB device has FEMALE RECEIVING PORT(s) to receiving MALE-PLUG of SEPARATED USB-JUMP-WIRE HAVING AT LEAST TWO MALE-PLUGS. Furthermore, even i-phone 1 to 4 the phone receiving-port is one of 30 pins female receiving-port, and other phone use different female receiving port(s). Hence, any patent filed before 2010 belong to none proper US prior art VS. the current invention (#FFF-2011) and (#GGG-2011) filed case products has FEMALE receiving port(s) which is male-plug of TYPE A of external outside one end of USB-wire. Other at least one of male USB-plug is one of micro-USB, or others which matching the below-charged products female receiving port(s).

FIG. 34 shows one of preferred USB device having wire-storage arrangement and 3 USB ports in a flat and thin USB device, the AC power input wire (172) being coiled or wrapped under the bottom of the round flat and thin USB charger unit. The round flat and thin unit can be put under base of another existing desktop device, such as a desk-lamp base, coffee cup base, coffee machine base, ashtray base, beverage cup base, phone base, calculator base, medicine bottle base, or other bottle or container base so that the round flat and thin USB charger will not occupy a new space to take away from the limited desk top space. The wire can be coiled or wrapped under the USB-charger unit base, within the housing, or within the walls as described below. The wire arrangement means may have parts and accessories to hold store, coil, receive, release, pull, twist, extend, fold, or retract the wire by a spring, elastic, roller or rotating means to cause the wire or receiving-end(s) of the wire to be well arranged for use in connection with pre-designed requirements, performances, functions, or effects. Since the USE-charger related products do not have AC outlets, LED-units, or other electric function devices built-in, the input AC power wire can be smaller than required for an AC power outlet device.

As shown in FIGS. 34, 34A show top and bottom view of one preferred power-wire and storage-wire arrangement USB device, the device have a round and thin housing (220) with two Type-A USB ports (25) with a central island-shaped wire arrangement mechanism (221), which can easily coil or wrap the power source main-wire within a space, gap room, or compartment (222). The island-shaped wire arrangement mechanism located on bottom of device to stop the wire from falling out from the space, gap, room, or compartment (222). The island-shaped wire arrangement mechanism allows the wire's length to easily be seen when the wire is inside the space. The output-end of the wire arrangement means has a cutout (224), so enable the flat and thin USB-charger or USB-unit to be installed on any surface.

- The USB charger or USB device has built-in outlet(s) or USB-charger and another function device(s) may be round or have any desired geometric shape without departing from the scope of the current invention. Because the USB-charger or USB device related products of FIGS. 34 and 34A only has USB ports (225) without other outlets, LED-units, or other electric function devices, the built-in AC input power wire can be smaller than required for a device with AC output power requirements.
- As shown in FIG. 34B, the storage-wire arrangement on the bottom of unit includes a center pole (226) around which the wire is coiled or wrapped, and a built-in three island-shaped mechanism's cover or roof (223) to stop power source main-wire (171) from falling from base. A wire output-end with cut-outs (224) has a hold-function to hold the wire in position. The USB device or USB charger has a predetermined built-in heavy weight, suction cup, magnetic means, double sided foam tape, Velcro tape, screw, base, or other attachment or fixing-means to secure the round flat and thin USB charger unit in a position without being moved and make a nice and neat wire-storage arrangement from an AC power source to supply a desired current from 1.0 A up to 50 A or more from the USB-ports (25), which is not possible to obtain from any existing device such as a laptop computer's USB ports, whose USB belong to USB2.0 not USB 3.0 standard so before 2010 all USB charger or USB device can only supply 0.5 A or a maximum of below 1.0 A current. The current invention's USB charger can have a higher output of more than 1.0 Amp up to 50 Amps or more depending on market requirements. Because the USB-charger or USB-device related product of FIG. 34B only has USB ports (25) and no AC outlets, LED-units, or other electric function device(s) built-in, so the USB device no need to get the AC-plug to get AC current with very expensive #14 gauge wire. The USB device only have USB-port(s) the input wire can use #18 gauge which smaller than would be required for USB device have built-in AC outlets or AC devices with higher power requirements were included. And #14 gauge AC wire is a super expensive cost.
- FIG. 34C shows the preferred USB-charger or USB device in the form of a round-flat unit which can underlay any existing desktop items or device, and this arrangement have to have a flat top surface so this underlay arrangement does not need to occupy any additional desktop space. As shown in FIG. 34C, the USB-charger related product only has USB ports (225) without any additional outlets, LED-units, or other electric function device(s), so the USB device (220) can incorporated with external transformer (TRF) to supply DC power through output main-wire (171) which less expensive than AC outlet device needed #14 gauge wire.

FIG. 35A, shows one preferred embodiment has a geometrically shaped YSB device or USB charger having both USB-ports (229) and built-in AC outlets (228) which is different with earlier FIGS. 33, 33B, 34, 34A, 34B, 34C only have USB-port(s), so FIG. 35 need a heavy duty electric cord. The heavy #14 gauge wire its cord's weight very heavy to pull on and move the unit in the absence of attachment means to fix the unit at a desired location. The attachment means may include a heavy weight, magnetic means, glue, double sided foam tape, screws, a catch-n-hook fastener, Velcro means, or other market-available skills or materials as FIG. 12A show some of preferred attachment kit(s).

From FIGS. 35, 35A, 35B, 35B1 show the current invention for Desktop or floor light or USB device which has built-in AC-outlet(s) so it need get AC power from the AC-Plug Wire which is very heavy and very costly, so the current invention use a very short length for this expensive wire such as only 1 to 2 feet which is enough to let device connect with home wall outlet and lay on the ground or lower position. But, use a very long #18 gauge wire from the said Desktop or floor light device or USB device so can let USB-unit(s) to put on room at least one on desktop or floor+one on side-bed table, or one on bed-wall, or one on bed-frame, or one on bed-legs, or one on anywhere; These desktop or floor lighting or USB-device or extension cord can fix or attached or install on the anywhere while people use preferred attachment kits. The FIG. 12 attachment kits also have details discussion on following drawings.

The geometrically shaped unit is illustrated as a FIG. 35, the round flat and thin unit having interior magnetic and heavy weight pieces to overcome pulling force exerted by the heavy duty #14 gauge AC electric cord, which is required by some safety authorities to be #14 gauge, although the gauge may be variable based on safety requirements for different applications and countries. The preferred round flat and thin unit is designed to underlay any items put on top of it because it is thin, flat, and water resistant, and all receiving USB-ports or outlets ports are on a side with a nice slope so that anything can be put on top and there is no need for any new space on the desktop when using the current invention's unit, which may be (1) a simple USB charger with a small diameter electric wire such as #18 gauge as earlier FIGS. 33, 33B, 34, 34A, 34B, 34C,
(2) a combination of a USB-charger and outlet unit need #14 gauge electric wire go through built-in AC-to-DC circuit,
(3) a combination of a USB-charger, outlet unit, and LED-unit need #14 gauge electric wire go through built-in AC-to-DC circuit, or
(4) a combination of units with more than three functions selected from any electric, electronic, or digital data device or internet devices functions.

FIGS. 35, 35A, 35B, 35B1 show some preferred embodiment of USB device (218M5) (218M6) or USB charger (218M5) (218M6) related products having USB ports (229) and AC outlets (228) optional have preferred numbers of LEDs or other electric function device(s) Such as co-pending or earlier filed case including (#GGG) (#UUU) family which cover any functional or decoration or geometric shape products, device, items within the said desk top items as (#GGG) and (#UUU) family details listed hereafter for quickly research the claims and scope and idea for any decorative or functions items within the USB charger or USB device is well protected by inventor parent co-pending and issued patents, including;

U.S. application Ser. No. 15/899,492 filed on Feb. 20, 2018 (hereafter as #UUU-2) which is CIP of
U.S. application Ser. No. 15/340,367 filed on Nov. 1, 2016 (hereafter as #UUU-1) which is CIP of
U.S. application Ser. No. 13/870,447 filed on Apr. 25, 2013 (hereafter as #UUU-2013) which is CIP of
U.S. application Ser. No. 13/117,227 filed on May 27, 2011 (hereafter as #FFF-2011) and
The above listed inventor parent filed cases' drawing, claims with or without IC, switch, control system, wireless system, Wi-Fi, Zigbee, Z-way, Blue tooth, RF or IR remote controller to make setting, adjusting, selection, changing the desired color, brightness, function(s), effects.

From FIG. 35 one of preferred USB device (218M5) having a built-in AC-plug with input power main-wire (217) which meets the AC outlet power wire requirements. And, inside the USB device optionally incorporates other at least one or more additional outlet device components selected from (i) surge or others protection, (ii) remote or wireless control system, (iii) LED area or status indicator illumination, (iv) a master power outlets (that controls all other outlets by causing the other outlets to follow the master), (v) sensor(s), (vi) remote controller, (vii) current leakage warning system, and (viii) auto shut off system to provide the outlets with greater safety and convenient performance.

FIG. 35A, shows one preferred embodiment of a round flat and thin USB device (218M6) or USB charger (218M6) related product which has 4 USB ports (229) and 4 outlets (228) as well as at least one built-in additional function device (not shown) selected from market-available electric, electronic, digital-data, communications, computer, or other devices. Basing on built-in not only USB port(s) (229) but also have AC-outlet(s) (228) and plurality of LED(s) (228a) offer at least one area or status indicator illumination, so the input power have to be AC power from AC-plug wire (217) and the input main-wire (271) into the USB device (218M6) to connect with AC outlet(s) (228) by conductive piece(s) which are individual or part of circuit (6AA).

The circuit (6AA) not only supply AC power to built-in AC-outlet(s)(228). The circuit (6AA) has built-in AC-to-DC circuit for at least one of DC operated parts or items including (i) USB port(s) (229), (ii) LED(s) (228a), (iii) IC, (iv) electric parts and accessories, (v) charging status system, (vi) wireless control system, (vii) wireless receiving system, (viii) Wi-Fi system, (ix) ZigBee, Z-way, blue tooth system, (x) camera system, (xi) storage system or (xii) audio system, or (xiii) Video system, or (xiv) other system; needed predetermined wattage of DC power.

From 35A show the built-in circuit (6AA) have connect with at least one of branch-wires (175) (176) and each has preferred length to deliver the DC power under pre-determined watt or current amount to at least one of separated individual USB-unit(s) (FIG. 35B) and FIG. 35B1). Each USB-unit(s) (218c) (218d) has preferred number of USB port(s) (229) connect with the input branch-wire (175) (175) to get pre-determined input DC wattage to share or to each build-in USB-port(s). One of preferred embodiment, the input wattage or DC power is 2.4 Amp from one of branch wires, so can let preferred 2 USB-ports to share this 2.4 Amp current to charger be-charged products by external male-USB plug of USB-jump wire. This branch-wire(s) for separated individual USB-unit(s) for USB-device or USB charger related products such as above listed parent filed (#GGG) (#UUU) (#FFF) (#UU) family including 1. (#GGG) for any desktop items or reading light, accent light, project light, lighted mirror, air-flow device, time display, digital alarm clock, liquid/smell/moistures dispensing equipment, essential diffusors, or other desktop items shown on following drawing and discussion FIGS. 4PP, 3PP, 23PP, 25Pp, 14PP, 29PP, 26PP.
2. (#UUU) for any desktop items with any decorative or functions device, items, finished, treatment for USB power station show on following drawing and discussion on parent filed case (#UUU-2)(#UUU-1) (#UUU-2013) those are CIP of (GGG).
3. (#UU) for any LED light bar, LED and outlet light bar, LED and outlet and USB light bar, LED and outlet and USB power strips or extension cord applications which show on following drawing and discussion FIGS. 5P, 3P, 4P and FIGS. 14P, 13P.

the current invention incorporated the power-wire arrangement including (1) main-wire(s) to connect with at least one of (2) branch-wire(s) for at least one of (3) separated individual USB-unit(s) which has at least one of (4) built-in USB-port(s) which with or without at least one of (5) decorative or functional items, device, products, finish, treatment for said USB-unit(s) or with or without the said preferred control system(s).

FIGS. 35B and 35B1, also shows a preferred space for the USB-charger (218M6) and USB device (218M6) or USB-unit (218c) (218d) its body having space for wire-storage arrangement for round flat and thin unit (218M6) (not including the heavy AC electric cord and its plug-means). As above discussion, the separated individual more than one of USB unit(s) (218c) (218d) bottom have center bolt (230) and island-shape cover or roof (231) to allow wire(s) can coil around the center pole (230) without fall out. Also, the separated individual USB unit(s) (218c) (218d) also can have built-in other decorative or functional item, device, products, treatments, finish. One of preferred functional device is wireless charging system (29a) connect with preferred circuit(s) and powered by branch-wire (175) (176).

FIGS. 35B, 35B1 also shows the USB-Unit(s) (218c) (218d) bottom construction for the bottom storage-wire arrangement which has a center pole (230) to hold an island-shaped stopper (231) to prevent the wire falling out from the USB-Unit(s) (218c) (218d) bottom built-in space, room, or compartment (232) that holds the wire when it is coiled or wrapped around the center pole (230) and which extends to a curved wall (223). In this embodiment each of USB-Unit(s) (18c) (18d) has 6 AC outlets (228) and 2 USB-ports (229) are preferably arranged within the bottom of the unit.

From inventor co-pending or parent filed case has FIGS. 5P, 3P, 4P show the extension cord (218M7) (218M8) (218M9) or power strips (218M7) (218M8) (218M9) as co-pending US application Ser. No. 13/117,277 filed on May 27, 2011 (hereafter as #FFF-2011) and U.S. application Ser. No. 12/938,628 filed on Nov. 3, 2010 (hereafter as #UU-2010) shown the extension cord (218M7) (218M8) (218M9) or power strips (218M7) (218M8) (218M9) having at least one 1. LED (34a) for power or surge (34a) on-off, 2. Outlet(s) (331R=Rotatable) (331F=Fixed), 3. USB (333) or any market only a. Outlet(s) (331R=Rotatable) (331F=Fixed) and b. LED(s) (34a) for power on-off or surge protection light (34a).

From FIG. 36 (parent FIG. 4), the current invention added the quickly connector (336a) or directly wired (336a) for DC power output main-wire (174) with or without distribution kids (174a) to get the extension cord (218M9) (218M7) (218M8) or power strips (218M9) (218M7) (218M8) internal built-in AC-to-DC (not shown) pre-determined DC power through the output main-wire (174) to deliver to at least one of branch-wire(s) (175) (176) so can offer the pre-determined DC power to the each separated away and individual USB-unit(s) (218E) (218F) has DC power to supply power to the said at least one (A) USB-port(s) (229) and (B) optional wireless charging system (229a) to make at least one type of charging system for i-phone or i-pad or other communication or tablet device has Type A, Type C, micro USB, lighting USB system, or other has similar or equal function or replaceable adaptor and input ends, or USB-Jump-Wire(s) or other quickly connector system. The said USB-Unit(s) (218E) (218F) are same as USB-unit (218C) (218D) of FIG. 35B or FIG. 35B1. This is same as above discussed with or without the wireless charging system, or with or without the storage-wire arrangement is depend on market requirement. However, the said any USB-unit(s) (218E) (218F) or USB-device(s) (218M9) has any decorative or functional or treatment or finish powered by USB-wire (not shown), AC Plug-wire (336W), External transformer output main-wire (174) all should fall within the inventor's earlier filed and co-pending filed case U.S. application Ser. No. 15/899,492 filed on Feb. 20, 2018 (hereafter as #UUU-2) which is CIP of U.S. application Ser. No. 15/340,367 filed on Nov. 1, 2016 (hereafter as #UUU-1) which is CIP of U.S. application Ser. No. 13/870,447 filed on Apr. 25, 2013 (hereafter as #UUU-2013) which is CIP of U.S. application Ser. No. 13/117,227 filed on May 27, 2011 (hereafter as #FFF-2011) and U.S. application Ser. No. 13/161,643 filed on Jun. 16, 2011 (#hereafter as #GGG-2011) which is CIP of U.S. application Ser. No. 12/938,628 filed on Nov. 3, 2010 (hereafter as #UU-2010).

From FIG. 36 (parent FIG. 4) can see the AC plug-wire (336W) is very short which can be just same length for home outlet location to ground which approximately 30-45 cm (1 to 1.5 feet). So, the AC plug wire (336W) can only use Max. 45 cm (1.5 feet) can let extension cord (218M9) flat lay down on ground and AC-plug (336) can safety and never been pull out by its heavy weight AC-wire (226W). This super short AC wire length (336W) is not existing at marketplace. All marketplace at least 3 feet or 6 feet for power strip sold at DOLLAR CHAIN STORS. So, current invention made a big improvement to shorten the very expensive AC-wire (336W) to shortest length which enough to let power strip lay down ground. The power strip (218M9) use much longer cheap #18 gauge wire for output main-wire and branch wire(s) so can let laydown ground power strip (218M9) DC power delivery to not only one for desktop or floor light device or other electric device or USB device but also has plurality of separated USB-unit(s) can from same power strip DC output wires of #18 gauge to install desired number of USB-unit(s) on anywhere including wall, legs, top surface(s) of room furniture(s), side-table, closet(s), cabinet(s), chair(s), bed-frame, bed-walls, bed-legs, working table, couch, sofa, seat by FIG. 12 preferred attachment kits.

FIG. 36 (parent FIG. 4) and FIGS. 38, 38A (Parent FIG. No. 14 and 13) had same concept to use most shortage length such as 45 cm (1.5 Feet) to save the very expensive and very heavy #14 gauge wire cost and let Power strip (218M9) and (218M13) to lay on ground, and use super long length of cheap #18 gauge or safety authorities approval #20, #22 or other #gauge wire to have at least one or plurality of separated distance away USB-unit(s) with build-in USB-port(s) on many different location where people work, rest, sleep, watch TV from one of the said Power strip (218M9 of FIG. 36) or (218M13 of FIG. 38, 38A). Hence, the current invention to make big improvement for market all power strip with build-in USB-port(s) on the power strip body which is bad idea because power strip need use #14 gauge wire so heavy so it is not stay on desktop or top of any surface because (1) too heavy for #14 gauge wires and (2) too ugly for the power strip, and (3) Power strips received more than one AC operated products to add more #14 gauge wired weight so it only can lay on ground . . . however, The market all kind of power strip have built-in USB port(s) on extension cord in order to offer easily handle or plug-in AC-plug of be-supplier power device(s), so people add more length for #14 gauge AC-wire, so it is not make cheaper cost. The current invention on contrary to reduce the length of #14\gauge AC-wire from Dollar Chain stores 6 feet to 1.5 feet to save money. Also, the current invention offers more than one or plurality of separated distance away many USB-port(s) is located on any locations people will stay, work, reading, rest, sleeping . . . . This is big improvement for all market extension cord and power strips still need bend the body to plug the USB-wire and only one location near the power strip less than 1 Meter (3 feet) because Apple all USB wire only is 1 meter 3 feet . . . . Hence, the current invention not only supply super low cost extension cord (because shorten #14 gauge wire to 1.5 feet) and also supply more than on separated location(s) and distance away for many USB-unit(s) having built-in USB-port from only one extension cord . . . . This is Big improvement for all market extension cord. This is biggest improvement for market all extension cord as FIG. 36 (218M9) and FIGS. 38, 38A (18M13) shown.

FIGS. 37, 37A, 37B, 37C, 37D, 37E, 37F, 35B, 35B1 (Parent or this invention FIGS. 4, 3, 23, 25, 14, 29, 26, 24, 27, 28) show the co-pending and parent filed case for desktop item or desk top reading light or desk top accent light including the Reading light (18M10, 18M111 of FIG. 37), Accent light (18M11 and 18M12, and 18M13 of FIGS. 37A, 37B, 37C), Glitter or Lava or accent light with color changing by IC (18M12 and 18M13 of FIGS. 37B, 37C), Project or accent light (18M12 and 18M13 of FIG. 37B and FIG. 37C) IC control for color and brightness or dimmable switch or wireless controller control light device (FIG. 37C), base of all kind of LED light (18M14 of FIG. 37D) has multiple functions (FIG. 37D), Clock (18M15 of FIG. 37E) or Digital alarm clock (18M16 of FIG. 37E) or desktop time related piece (18M16 of FIG. 37F), Accent light (18M16 of FIG. 37E) or pin-hole image project light (18M16 of FIG. 37F and FIG. 37E) or time related products (18M16 of FIG. 37E and FIG. 37F) or audio device with all kind of music, melody, rhythm, sound device (18M16 of FIG. 37E and FIG. 37F) incorporate the current output main-wire (174) through the direct wired or use all kind of connector, USB-plug and USB-Port, adaptor and receiving-ends to deliver the each above FIGS. 37, 37A, 37B, 37C, 37D, 37E, 37F (Parent or this invention FIGS. 4, 3, 23, 25, 14, 29, 26, 24, 27, 28) for all kind of desktop electric devices' (18M10 to 18M16) DC power to at least one of branch-wire(s) (175) (176) or more to the at least one of USB-Unit(s) (FIG. 35B and FIG. 35B1). From FIGS. 37, 37A, 37B, 37C, 37D, 37E, 37F, 35B, 35B1 (Parent or this invention FIGS. 4, 3, 23, 25, 14, 29, 26, 24, 27, 28) the details of the said (a) Desktop items connected with AC power source & built-in AC-to-DC circuit, or external transformer or external DC power source, (b) connector or directly wired the power output main-wire(s), (c) optional distribution kids, (d) at least one or plurality of branch-wire(s), (e) separated and distance away each of USB-unit(s), (f) with or without wireless or other decorative or functional items, device, unit on each of USB device (18M10) (18M11) (18M12) (18M13) (18M14) (18M15) (18M16) or USB-Unit(s)(218G) (218H), (g) with or without wireless charging system on USB device or USB-unit(s), (h) with or without Outlet(s), LED(s), other control system of USB device or USB-unit(s) (218G) (218H) as above discussed so not discus again.

FIGS. 38, 38A (Parent FIGS. 14, 13) show the market power strips or extension cord (218M17) has the AC plug (14-1) with preferred 2 wires (14-2) (14-3) or one #14 gauge AC wire (13-2) supply AC power into the power strip or extension cord (13-1) inner at least 2 electric (+) (−)(13-7) (13-8) and optional ground pole (13-9). The said extension cord (18M17) or (13-1) for current invention add one space to install at least one circuit(s) (13-9) which has at least one of (i) IC, (ii) Sensor(s), (iii) wi-fi system, (iv) Z-way system, (v) ZigBee system, (vi) RF or IR remote control system, (vii) wireless control system, (viii) AC-to-DC circuit to change input AC from the AC electric (+) (−) electric pole or buss piece into the circuit(s) (13-9) or into AC-to-DC circuit (171) to get DC power for DC operated device at least including (a) IC, (b) LEDs for power or surge or charging or status indicator light (13-4) or the LEDs on the separated and distance away USB-unit(s)(218I) (218J).

FIGS. 38, 38A (Parent FIGS. 14, 13) USB device (218M17) which connected with USB-Unit(s) (218I) which has built-in at least one preferable device selected from above listed items. Here the preferred choice from LED(s) indicator light (133*d*) which has one window and insider has at least one of Red, Green, Blue LEDs (133*d*) to show the charging status for low-power, charging, fully charged. It also can have multiple windows, opening(s), holes to put single color LED(s) including one of each Red, Green, Blue (133*e*) to show the charging status and-or surge status and-or power-on/off status, furthermore basing inventor's parent co-pending or patented claim, the said USB-unit (218I) (218J) or USB device (218M17) to add any functional or decorative or treatment or polished or printing or painting all fall within the said inventor's earlier parent co-pending or patented claims or concept or idea or scope or constructions.

From FIG. 38, the power strip (218M17) has AC power source input to the power strip (218M17) from AC plug-wire (14-1) and through AC wire (142) (143) or #14 gauge (13-2) into power strip. The power strip has preferred number of outlet(s) with or without exposure USB-port(s) (13-12). The input AC power deliver from No. 1 outlet to final outlet by conductive piece and connect by conductive piece (13-6) (13-7) (13-8) for $1^{st}$ and $2^{nd}$ electric pole and optional ground pole with built-in AC-to-DC circuit (13-1').

The built-in AC-to-DC circuit (13-1') connected at least one of (1) with or without the exposed USB-port(s), (2) external separated distance away number of USB-unit(s) (218I) (281J) by wired or USB plug, adaptor, connectors, assemble kits (13-10).

The built-in AC-to-DC circuit (13-1') same as LED night light has built-in AC-to-DC circuit and prong (14-6) to insert into home outlets. So, the current invention for the said extension cord or power strip also equivalent with the LED night light which has built-in AC-to-DC circuit and prong.

The DC power output from the AC-to-DC circuit (13-1') deliver to preferred number of USB-unit(s)(218I) (218J) and each (218I) (218J) is separated from Extension cord (218M17) or LED night Light (218M17) by AC-to-DC circuit output main-wire (174) and plurality of branch-wire(s) (175) (176) with or without special wire arrangement (174a of FIGS. 36, 37) from one main-wire to plurality of branch-wire(s) (175) (176).

The alternative the DC power out from the AC-to-DC circuit, It also can get DC power from external DC power source such as (1) Power bank, (2) computer, (3) energy storage device from solar module, chemical compound or other power generator(s) or device, (4) Products has connect ends or terminal or USB port(s). Hence, the external DC power source can simple input the DC power by wires and connector to supply from one DC power source to any number of separated distance-away USB-unit(s). Also, those USB-unit(s) also can have any decorative or functional or any shape of body or any treatment on body surface as inventor parent filed and co-pending or issued patents such as above listed U.S. application Ser. No. 15/899,492 filed on Feb. 20, 2018 (hereafter as #UUU-2).

The DC power input to the USB-Unit(s) (218J) which as inventor issued U.S. application Ser. No. 15/899,492 filed on Feb. 20, 2018 (hereafter as #UUU-2) disclosure and claims. The USB-unit(s) (218J) has geometric shape and size which can use any kind of attachment kits to install on anywhere of desk, chair, wall, bed, furniture, cabinet, side-table, bed frame, seat including wall, surface, legs by preferred one of above discussed attachment kits or select from Velcro-tape, foam tape, magnetic, clipper, hook, screw, phone hole with screw or nail on wall, overlay or underlay of furniture, fasten straps, rope, wire. Such as one bed room for kids have reading/working table, bed, side table, closet, cabinets, the current invention can offer one of (A) desktop reading or working or accent light, or (B) Power strip like FIGS. 38 and 36 put on ground, or (C) LED night light plug-into wall outlet(s), or (D) External DC power source products; Any one of those as FIGS. 33, 34, 35, 36, 37, 38 belong to (218M1 to 218M17) item with separated distance-away plurality USB-unit(s) belong to (218A to 218J) from single one products (218M1 to 218M17) can have plurality of USB-unit (218A to 218J), so while people study, work, rest, sleep at any where have one hand-reachable USB-unit(s) can charge at least or more than one of I-phone or I-Pad or tablet or any other DC operated products.

The current invention only show some examples for desktop items, USB device, Plug-in nigh light, desktop reading light, desktop accent light which has DC input current from (AA) external transformer or (BB) external DC power source, or (CC) built-in AC-to-DC circuit. All these should be fall within current invention claims. Some of preferred products including (i) all drawing show on this invention and (ii) all items belong to (218M1 to 218M17), (iii) all items has DC current can supply the separated distance-away USB-unit(s) should be still fall within the current invention scope and claims.

From FIG. 38 show the USB-unit (218J) has geometric shape with at least one of optional (i) color changing or color selection illumination (313i), (ii) shape, (iii) size, (iv) surface has any treatment, or functional or decorative or finish, printing, painting, cartoon or military design or arts or design (313j), (v) time related display, alarm, time setting, wakeup light, sleep light, countdown timer (133g), (vi) AI system for communication and taking and memories, (vii) Wi-Fi system, (viii) DC input power port(s), (ix) texture, marking, polished, metallized, painting (133h), (x) curve, round, wave, flat, geometric shape (133f), (xi) output power USB port (216). It is appreciated the USB-unit(s) or USB-device (218M1 to 218M17) or other USB item having decorative or functional items should fall within the current invention claim even those already patented on inventor earlier filed case (#UUU-2) but it still for parent filed case.

From FIG. 38 show the other USB-unit (218i) which is a tiny unit which may only has 1 USB port(s) to make it is pretty small so can attached on bed frame, bed head wall, bed legs, home wall, side wall of furniture. The other preferred features of USB-unit (218I) which has recess space to install any type of USB-port(s) including Type A, Type C or combination Type A and Type C or micro USB. The recess arrangement to prevent the USB plug handle-area or USB connection wires to easily bended to destroy or handle-area too long outside the USB-unit(s) body.

FIG. 38 show the USB-unit (218i) has built-in LEDs for at least one of (AA) preferred light effects area, or (BB) preferred functions of status indicator light including at least have single color with different brightness or flashing functions, or at least have multiple colors to make different color for different status, or at least have color changing and-or color selection and-or brightness adjustable area illumination; those function can use built-in IC and-or control circuit (133c) to make preferred light effects, functions, indicator lights.

Furthermore FIG. 38 show one of connect with extension bar (218M17) by USB-plug to link with at least or more than one USB-unit(s). The USB plug (172) insert into receiving-end (13-10) of extension cord DC-section's (13-11) port(s) (13-10) and get DC power through the main-wire (174) and optional distribution connector (174a of FIG. 36) to each of branch-wire(s) (175) (176). This is one of alternative or equal function or replaceable skill. It is appreciated the other skill to get DC power from desktop items, desktop lighting/accent light/reading light, desktop USB item, USB device, extension cord, plug-in night light should all fall within the current invention and scope and claims.

From FIGS. 38, 38A which show same concept for above discussed USB device including;
(A) FIGS. 33, 33A, 33B, and FIGS. 34, 34A, 34B, 34C
(B) FIGS. 35, 35A, 35B, 35B1;
(C) FIGS. 36, 36A, 36B, 35B, 35B1;
(D) FIGS. 37, 37A, 37B, 37C, 37D, 37E, 37F, 35B, 35B1;
(E) FIGS. 38, 38A, The current invention may also be applied to the following:

(A) A desktop LED light device having rotatable outlets or electric receiving sockets and at least one can receive outside DC power source to input DC power to operate the LED light, it is similar with disclosed in co-pending U.S. patent application Ser. No. 12/950,017, filed Nov. 19, 2010;
(B) an electrical device having a built-in universal USB-unit(s) and outlet-unit(s), as disclosed in co-pending U.S. patent application Ser. No. 13/117,227, filed May 27, 2011;
(C) a desktop LED device having a USB-unit(s) or outlet-unit(s) to charge an electric or digital device, as disclosed in co-pending U.S. patent application Ser. No. 13/161,643, filed Jun. 16, 2011; and
(D) a multiple function LED night light as dis-closed in U.S. patent application Ser. No. 11/806,285, filed May 31, 2007.

The current invention and related filing case have features at least cover as below feature and function including:

1. A Quick USB charging-ports assembly for lighting device, consist of;

At least one of USB charging ports has minimum 1.0 A up to 5.0 Amp charging capacity and specification released on 2007 and update on 2010.

The USB charging ports only has charging function without any electric or digital data transmit or delivery.

At least one of circuit incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device (s).

A lighting device and its parts has base for desk, surface, floor, wall installation and has housing space with opening to install the USB charging port(s).

2. The Quick USB charging ports assembly for lighting device, the said power source is from outside the light device housing's AC to DC transformer, adaptor, converter, invertor which has circuit-kits inside to change the AC current to DC current.

3. The Quick USB charging ports assembly for lighting device, the said power source is from AC wall or extension cord or other's outlet and get power by the AC plug and wire to the light device inner-circuit which has transformer, invertor, adaptor, converter assembly inside and change the input AC current to DC current.

4. The Quick USB charging ports assembly for lighting device, the said light device has LED or LEDs to offer at least one function select from illumination, area illumination, indicator light, lighted image, project image, time display, charging status, date or/and calendar display, temperature display, message display.

5. The Quick USB charging ports assembly for lighting device, the said light device has non-LED light source to offer illumination.

6. The Quick USB charging ports assembly for lighting device, the said light device housing space including light device's base, pole, bar, stationary organizer, compartment, construction, stand, clip base, or other housing space.

7. The Quickly USB charging ports assembly for lighting device, the said circuit has more than one circuit-kits or circuit-inner which for transformer, invertor, adaptor, converter inside the outside or light device's housing, and the said more than one circuit is circuit-inside that make device not only supply the DC current to the USB charging-ports but also arrange the power or electric functions to the other functions including light source, LED(s), time display, message display, wireless communication, image display, timer, date/calendar/weather display, other added functions, temperature/humility display, remote controller, Wi-Fi controller, image controller, IP cam, infra-red controller, wireless communication controller.

8. The Quick USB charging ports assembly for lighting device, the said lighting device is one of desk lamp, floor lamp, wall lamp, outdoor lighting, night light.

9. The Quick USB charging ports assembly for lighting device, the said other electric or digital products is a communication equipment, computer equipment, consumer electric products which has the DC energy storage unit or assembly inside the products and can be rechargeable.

10. The Quick USB charging ports assembly for lighting device, the said USB charging-port is a type A construction which same as majority of laptop computer USB port but has minimum 1.0 A up to 5 Amp or higher charging capacity.

11. The Quick USB charging ports assembly for lighting device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

12. The Quickly USB charging ports assembly for lighting device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

13. The Quickly USB charging ports assembly for lighting device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

14. The Quick USB charging ports assembly for lighting device, the said only one input power source, the said USB charging-port(s) only take output-end's DC current from (1) the circuit-inner while without the outside device's housing transformer; or (2) circuit-kits while has the outside device's housing transformer.

15. The Quick USB charging ports assembly for lighting device, the said light device further incorporate with Outlet-unit or Outlet-Module to SUPPLY the AC current directly though only conductive-kits or assembly from the outlet receiving port(s) to the other electric or digital device's has conductive prongs and the said Outlet-unit or outlet-module install within or on anywhere the light device.
16. The Quick USB charging ports assembly for lighting device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
17. The Quick USB charging ports assembly for lighting device, the said light device has added outlet-unit which has number 1 to N (any number) and has surge-protection for number over the 3 or more to offer the more safety.
18. The Quick USB charging ports assembly for lighting device, the said USB charging-ports or/and Outlet-units can arrange on any parts of the said lighting device including base, pole, bar, stand, stationer-organizer, added housing construction, clips.
19. The Quick USB charging ports assembly for lighting device, the said lighting device light source is a built-in LED(s), CFL, Power saving bulb, separated LED bulb, Florescent tube, LED tube, EL, OEL or other market available light source.
20. The Quick USB charging ports assembly for lighting device, the said lighting device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects.
21. The Quickly USB charging ports assembly for lighting device, the said lighting device is a floor lamp has the USB charging-port on the anywhere of housing, base, added desk, bar, stand, pole and has number of outlets on the base or stand number from I to N (any number) so work as power strip has outlets up to N with optional surge protection and has only one wire with AC-Plug to plug-into Wall
22. A Quick USB charging-ports assembly for digital alarm clock or time related device, consist of;
    At least one of USB charging-ports has minimum 1.0 A up to 5.0 Amp charging capacity and specification released on 2007 and update on 2010.
    The said USB charging-ports only has charging function without any electric or digital data transmit or delivery.
    A circuit incorporate with the said USB charging-port(s) and only has one input power source and the said circuit supply DC current to charge the energy storage unit or assembly including battery, batteries, rechargeable battery inside the said other electric or digital data product(s) though an outside housing's USB-wire has at least 2 male plugs to connect with USB charging-ports and be-charged product's USB receiving-ports to deliver the DC current.
    The said USB charging-port(s) is universal type can fit for all different USB-Wire at least one of plug(s) so can charge all different be-charged device(s).
    A digital alarm clock or time related device has housing with opening to install the USB charging port(s).
23. The Quick USB charging ports assembly for digital alarm clock or time related device, the said power source is from outside the digital alarm clock or time related device housing's AC to DC transformer, adaptor, converter, invertor which has circuit-kits inside to change the AC current to DC current.
24. The Quick USB charging ports assembly for digital alarm clock or time related device, the said power source is from outside digital alarm clock or time related device housing's AC wall outlet and get power by the AC plug and wire to the light device inner-circuit which has transformer, invertor, adaptor, converter assembly inside and change the input AC current to DC current.
25. The Quick USB charging ports assembly for digital alarm clock or time related device, the said device has LED or LEDs to offer at least one function select from illumination, indicator light, lighted image, project image, time display, charging status, date or/and calendar display, temperature display, message display.
26. The Quick USB charging ports assembly for digital alarm clock or time related device, the said device has non-LED light source to offer illumination indicator light, lighted image, project image, time display, charging status, date or/and calendar display, temperature display, message display.
27. The Quick USB charging ports assembly for digital alarm clock or time related device, the said light device housing including light device's base, stationary construction, compartment, organizer, holder for phone or iPad or power-bank, be-charged products, or other housing arrangement has space.
28. The Quickly USB charging ports assembly for digital alarm clock or time related device, the said circuit has more than one circuit-inside for transformer, invertor, adaptor, converter inside the light device's housing that not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, Wi-Fi controller, image controller, IP cam, infra-red controller, wireless communication controller.
29. The Quickly USB charging ports assembly for digital alarm clock or time related device, the said digital alarm clock or time piece device is one of clock, LED time piece, LED segments has 8 construction, time piece has audio parts & accessories, wall clock, night light time piece, desktop item has time display products, desktop time piece, digital alarm time piece, alarm clock, digital or analog time piece.
30. The Quick USB charging ports assembly for digital alarm clock or related piece, the said other electric or digital products is a communication equipment, computer equipment, consumer electric products which has the DC energy storage unit or assembly inside the products and can be rechargeable.
31. The Quick USB charging ports assembly for digital alarm clock or time related device, the said USB charging-port is a type A construction which same as majority of laptop computer USB port but has minimum 1.0 A up to 5 Amp or higher charging capacity.

32. The Quick USB charging ports assembly for digital alarm clock or time related device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

33. The Quickly USB charging ports assembly for digital alarm clock or time related device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

34. The Quickly USB charging ports assembly for digital alarm clock or time related device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

35. The Quick USB charging ports assembly for digital alarm clock or time related device, the said only one input power source, the said USB charging-port(s) only take output-end's DC current from
    (3) the circuit-inner while without the outside device's housing transformer; or
    (4) circuit-kits while has the outside device's housing transformer.

36. The Quick USB charging ports assembly for digital alarm clock or time related device, the said device further incorporates with Outlet-unit or Outlet-Module to SUPPLY the AC current directly though only conductive-kits or assembly from the outlet to the other electric or digital device has conductive prongs equipment and the said Outlet-unit or outlet-module install within or on anywhere the device.

37. The Quick USB charging ports assembly for digital alarm clock or time related device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

38. The Quick USB charging ports assembly for digital alarm clock or time related device, the said device has added outlet-unit which has number 1 to N (any number) and has surge-protection for number over the 3 or more to offer the more safety.

39. The Quickly USB charging ports assembly for digital alarm clock or time related device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

40. The Quick USB charging ports assembly for digital alarm clock or time related device, the said device light source is a built-in LED(s), liquid crystal display, CFL, Power saving bulb, separated LED bulb, Florescent tube, LED tube, EL, OEL or other market available light source.

41. The Quickly USB charging ports assembly for digital alarm clock or time related device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

42. The Quickly USB charging ports assembly for digital alarm clock or time related device, the said device is a time related product has the USB charging-port on the anywhere of housing, base and has number of outlets on the base or housing with number from 1 to N (any number) so work as power strip has outlets up to N with optional surge protection and has only one wire with AC-Plug to plug-into Wall.

43. Quickly USB charging ports assembly for lighting device, consist of;
    A USB charging ports has minimum 1.0 A up to 5.0 Amp charging capacity and specification released on 2007 and update on 2010.
    The USB charging ports only has charging function without any electric or digital data transmit or delivery.
    A circuit incorporate with USB charging port(s) and only has one input power source and supply DC current to charge the energy storage unit or assembly including battery, batteries, rechargeable battery inside the said other electric or digital data product (s). The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
    A lighting device has housing and bar, stand, base, pole, clipper, holder with opening to install the USB charging port(s) for quickly charging.

44. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

45. Quickly USB charging ports assembly for lighting device, the said USB-unit, USB-module, Outlet-unit, Outlet-module, USB Universal kits, USB sealed-unit can have number from 1 to N (any number).

46. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.

47. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

48. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall.

49. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

50. Quickly USB charging ports assembly for lighting device, the said USB wire has at least two male plugs one prefers TYPE A and the other prefer is mini-USB or micro-USB or Type C USB has smaller, compact, thin, narrow USB construction but quickly charging and bigger charging capacity.

51. Quickly USB charging ports assembly for lighting device, the said light device has optic film added to prevent reflection from the LED, LEDs, LED Bulb or other light source.

52. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.

53. Quickly USB charging ports assembly for lighting device, the said lighting device incorporate with switch, sensor, motion sensor, timer, to turn on and turn off the lighting device.

54. A Quick USB charging-ports assembly for lighted cosmetic mirror device, consist of;

At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and individual USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device (s).

A lighted cosmetic mirror device has image related function including magnify, reflective face, reflective body, reflect objects with light source to see under dark environment has housing with opening to install the USB charging port(s).

55. The Quick USB charging ports assembly for lighted cosmetic mirror device has image related function, the said power source is from outside the device housing's AC to DC transformer, adaptor, converter, invertor which has circuit-kits inside to change the AC current to DC current.

56. The Quick USB charging ports assembly for lighted cosmetic mirror device has Image related function, the said power source is from outside Image related device housing's AC wall outlet and get power by the AC plug and wire to the device inner-circuit which has transformer, invertor, adaptor, converter assembly inside and change the input AC current to DC current.

57. The Quick USB charging ports assembly for lighted cosmetic mirror device has Image related function, the said device has LED or LEDs to offer at least one function select from illumination, indicator light, lighted image, project image, time display, charging status, date or/and calendar display, temperature display, message display, color changing, brightness changing, dimmer the light brightness.

58. The Quick USB charging ports assembly for lighted cosmetic mirror device has Image related function, the said device has non-LED light source to offer illumination, indicator light, lighted image, project image, time display, charging status, date or/and calendar display, temperature display, message display, different color of light, different brightness, dimmer the light brightness.

59. The Quickly USB charging ports assembly for lighted cosmetic mirror device has Image related function, the said light device housing has at least one parts or desire combination select from light device's mirror, reflective surface, reflective and magnify kits or assembly, magnify lens, optics lens, optics assembly, base, bar, stand, pole, hook, stationary construction, compartment, compartment for the install all electric parts & accessories, organizer, holder for phone or iPad or power-bank, be-charged products, or other housing arrangement has space.

60. The Quickly USB charging ports assembly for lighted cosmetic mirror device has Image related function, the said circuit has more than one of circuit-kits, or circuit-inner, there has other circuit-inside which beside the said transformer, invertor, adaptor, converter fit inside of the light device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, Wi-Fi controller, image controller, IP cam, infra-red controller, wireless communication controller.

61. The Quickly USB charging ports assembly for lighted cosmetic mirror device has Image related function, the said lighted cosmetic mirror device has image related function is one device has desire combination select from desktop mirror, wall mounted mirror, time piece, LED segments has 8 construction, time piece has audio parts & accessories, clock, night light, desktop item has reflective mirror-like surface and functions, desktop time piece, digital alarm time piece, alarm clock, digital or analog time piece, weather station, radio.

62. The Quick USB charging ports assembly for lighted cosmetic mirror device has Image related function, the said other electric or digital products is a communication equipment, computer equipment, consumer electric products which has the DC energy storage unit or assembly inside the products and can be rechargeable.

63. The Quick USB charging ports assembly for lighted cosmetic mirror device has Image related function, the said USB charging-port is a type A construction which same as majority of laptop computer USB port(s) but has minimum 1.0 A up to 5 Amp or higher charging capacity and do not allow has data delivery.
64. The Quick USB charging ports assembly for lighted cosmetic mirror device has image related function, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
65. The Quickly USB charging ports assembly for lighted cosmetic mirror device has Image related function, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
66. The Quickly USB charging ports assembly for lighted cosmetic mirror device has Image related function, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
67. The Quick USB charging ports assembly for lighted cosmetic mirror device has Image related function, the said only one input power source, the said USB charging-port(s) only take output-end's DC current from
(5) the circuit-inner while without the outside device's housing transformer; or
(6) circuit-kits while has the outside device's housing transformer.
68. The Quick USB charging ports assembly for lighted cosmetic mirror device has Image related function, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.
69. The Quickly USB charging ports assembly for lighted cosmetic mirror device has Image related function, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, moisture machine, humility machine, or any machine, tools, kits, equipment for people to make cosmetic purpose for face, hair, body, skin, hand, foot, leg, arms which need to use AC power source all belong to cosmetic related kits.
70. The Quickly USB charging ports assembly for lighted cosmetic mirror device has Image related function, the said outlet-unit or outlet-module or universal unit or sealed units has Outlet receiving ports which may drive different cosmetic related kits and supply the AC current up to 1,850 Watt for hair dryer, 1,650 Wall for normal electric device or any other bigger or lower Watt needed for people while people use the Lighted cosmetic mirror device.
71. The Quick USB charging ports assembly for lighted cosmetic mirror device has Image related function, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
72. The Quick USB charging ports assembly for lighted cosmetic mirror device has Image related function, the said device has added outlet-unit which has number 1 to N (any number) and has surge-protection for number over the 3 or more to offer added surge protection circuit or the over-heat breaker circuit or the said over-load circuit, current leakage circuit for the more safety.
73. The Quickly USB charging ports assembly for lighted cosmetic mirror device has Image related function, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
74. The Quickly USB charging ports assembly for lighted cosmetic mirror device has Image related function, the said device light source is a built-in LED(s), CFL, Power saving bulb, separated LED bulb, Florescent tube, cold cathord tube, LED tube, EL, OEL or other market available light source.
75. The Quickly USB charging ports assembly for lighted cosmetic mirror device has Image related function, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
76. The Quickly USB charging ports assembly for lighted cosmetic mirror device has Image related function, the said device is a lighted cosmetic mirror product has the USB charging-port on the anywhere of housing, base and has number of outlets on the base or housing with number from 1 to N (any number) so work as power strip has outlets up to N with optional surge protection and has only one wire with AC-Plug to plug-into Wall.
77. Quickly USB charging ports assembly for lighting device, consist of;
A USB charging ports has minimum 1.0 A up to 5.0 Amp charging capacity and specification released on 2007 and update on 2010.
The USB charging ports only has charging function without any electric or digital data transmit or delivery.
A circuit incorporate with USB charging port(s) and only has one input power source and supply DC current to charge the energy storage unit or assembly including battery, batteries, rechargeable battery inside the said other electric or digital data product(s). The said circuit incorporate with an outside housing's and separated USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

78. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

79. Quickly USB charging ports assembly for lighting device, the said USB-unit, USB-module, Outlet-unit, Outlet-module, USB Universal kits, USB sealed-unit can have number from 1 to N (any number).

80. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.

81. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

82. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall.

83. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

84. Quickly USB charging ports assembly for lighting device, the said USB wire has at least two male plugs one prefers TYPE A and the other prefer is mini-USB or micro-USB or Type C USB has smaller, compact, thin, narrow USB construction but quickly charging and bigger charging capacity.

85. Quickly USB charging ports assembly for lighting device, the said light device has optic film added to prevent reflection from the LED, LEDs, LED Bulb or other light source.

86. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.

87. Quickly USB charging ports assembly for lighting device, the said lighting device incorporate with switch, sensor, motion sensor, timer, to turn on and turn off the lighting device.

88. A Quickly USB charging-ports assembly for desktop power station device, consist of;

At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and separated USB-wire which has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device (s).

A desktop power station device has more than one power charging or-and supplying function including more than one receiving-port(s) to connect different other products' plug or insert-end or prongs or add extra function(s) select from lighting, LED(s), illumination, controller, wireless communication, motion detection, surge protection, leakage current function, overheat function and device, charging status indicator and device has housing with opening to install the USB charging port(s) and other receiving-ports for other functions.

89. The Quickly USB charging ports assembly for desktop power station device, the said power source is from outside the device housing's AC to DC transformer, adaptor, converter, invertor which has circuit-kits inside to change the AC current to DC current.

90. The Quickly USB charging ports assembly for desktop power station device, the said power source is from outside device housing's AC wall outlet and get power by the AC plug and wire to the device inner-circuit which has transformer, invertor, adaptor, converter assembly inside and change the input AC current to DC current.

91. The Quickly USB charging ports assembly for desktop power station device, the said device has LED or LEDs to offer at least one function select from illumination, indicator light, lighted image, project image, time display, charging status, date or/and calendar display, temperature display, message display, color changing, brightness changing, dimmer the light brightness.

92. The Quickly USB charging ports assembly for desktop power station device, the said device has extra lighting which is a non-LED light source to offer illumination, indicator light, lighted image, project image, time display, charging status, date or/and calendar display, temperature display, message display, different color of light, different brightness, dimmer the light brightness.

93. The Quickly USB charging ports assembly for desktop power station device, the said device housing has at least one parts or desire combination select from device's plurality of AC outlets, female receiving-ports for mail plug, insert-end, prong, connector, adaptor to build the electric signal delivery, audio connector, video connector, wireless communication receiver or transmitter, Bluetooth sets, wife set, base, bar, stand, stationary construction or organizer, compartment, compartment for the install all electric parts & accessories, organizer, holder for phone or iPad or power-bank, be-charged products, or other housing arrangement has space.
94. The Quickly USB charging ports assembly for desktop power station device, the said circuit has more than one of circuit-kits, or circuit-inner, there has other circuit-inside which beside the said transformer, invertor, adaptor, converter fit inside of the device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, Wi-Fi controller, image controller, IP cam, infra-red controller, wireless communication controller.
95. The Quickly USB charging ports assembly for desktop power station device, the said desktop power station device has power charging or-and supplying function is one device has desire combination select from USB charger, AC Power supplier, time piece, LED segments has 8 construction, time piece has audio parts & accessories, clock, night light, working light, digital alarm time piece, alarm clock, digital or analog time piece, weather station, radio, temperature, fan, video device, wireless communication equipment such as wife, APP, screen, TV.
96. The Quickly USB charging ports assembly for desktop power station device, the said other electric or digital products is a communication equipment, computer equipment, consumer electric products which has the DC energy storage unit or assembly inside the products and can be rechargeable.
97. The Quickly USB charging ports assembly for desktop power station device, the said USB charging-port is a type A construction which same as majority of laptop computer USB port(s) but has minimum 1.0 A up to 5 Amp or higher charging capacity and do not allow has data delivery.
98. The Quickly USB charging ports assembly for desktop power station device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
99. The Quickly USB charging ports assembly for desktop power station device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
100. The Quickly USB charging ports assembly for desktop power station device, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
101. The Quickly USB charging ports assembly for_desktop power station device, the said only one input power source, the said USB charging-port(s) only take output-end's DC current from
(7) the circuit-inner while without the outside device's housing transformer; or
(8) circuit-kits while has the outside device's housing transformer.
102. The Quickly USB charging ports assembly for desktop power station device, the said device further incorporates with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.
103. The Quickly USB charging ports assembly for desktop power station device, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, machine, electric tools, or any machine, tools, kits, equipment for people to work which need to use AC power source.
104. The Quickly USB charging-ports assembly for desktop power station device, the said outlet-unit or outlet-module or universal unit or sealed units has Outlet receiving ports which may drive different machine, tools, kits and supply the AC current up to 1,850 Watt, 1,650 Wall for normal electric device or any other bigger or lower Watt needed for people while people use the equipment, machine, electric products.
105. The Quickly USB charging ports assembly for desktop power station device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
106. The Quickly USB charging ports assembly for desktop power station device, the said device has added outlet-unit which has number 1 to N (any number) and has surge-protection for number over the 3 or more to offer added surge protection circuit or the over-heat breaker circuit or the said over-load circuit, current leakage circuit for the more safety.
107. The Quickly USB charging ports assembly for desktop power station device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
108. The Quickly USB charging ports assembly for desktop power station device, the said device light source is a built-in LED(s), CFL, Power saving bulb, separated LED bulb, Florescent tube, cold-cathode tube, LED tube, EL, OEL or other market available light source.
109. The Quickly USB charging ports assembly for desktop power station device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

110. The Quickly USB charging ports assembly for desktop power station device, the said device has the USB charging-port on the anywhere of housing, base and has number of outlets on the base or housing with number from 1 to N (any number) so work as power strip has outlets up to N with optional surge protection and has only one wire with AC-Plug to plug-into Wall.

111. Quickly USB charging ports assembly for lighting device, consist of;
   A USB charging ports has minimum 1.0 A up to 5.0 Amp charging capacity and specification released on 2007 and update on 2010.
   The USB charging ports only has charging function without any electric or digital data transmit or delivery.
   A circuit incorporate with USB charging port(s) and only has one input power source and supply DC current to charge the energy storage unit or assembly including battery, batteries, rechargeable battery inside the said other electric or digital data product(s). The said USB charging-ports incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
   A lighting device has housing and bar, stand, base, pole, clipper, holder with opening to install the USB charging port(s) for quickly charging.

112. Quickly USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

113. Quickly USB charging ports assembly for lighting device, the said USB-unit, USB-module, Outlet-unit, Outlet-module, USB Universal kits, USB sealed-unit can have number from 1 to N (any number).

114. Quickly USB charging ports assembly for lighting device, the said clipper has spring device so can clip the variety desk, table, bed, tube, bar, post, edge so can install the desktop lighting device on many place where has the thickness equal or less than clipper's two arms opening width.

115. Quickly USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

116. Quickly USB charging ports assembly for lighting device, the said lighting device for desk, floor, wall, ceiling, landscape, ground, table, bed, moving table, bed cushion table, or any flat surface can put lighting device without vibration to make the lighting device to fall.

117. Quickly USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

118. Quickly USB charging ports assembly for lighting device, the said USB wire has at least two male plugs one prefers TYPE A and the other prefer is mini-USB or micro-USB or Type C USB has smaller, compact, thin, narrow USB construction but quickly charging and bigger charging capacity.

119. Quickly USB charging ports assembly for lighting device, the said light device has optic film added to prevent reflection from the LED, LEDs, LED Bulb or other light source.

120. Quickly USB charging ports assembly for lighting device, the said outlet-unit or outlet-module has added surge protection, or master controller or wireless communication by Wife, APP, remote controller, infra-red, RF remote, timer, time delay, dimmer, color changing, brightness controller functions or features.

121. Quickly USB charging ports assembly for lighting device, the said lighting device incorporate with switch, sensor, motion sensor, timer, to turn on and turn off the lighting device.

122. Quickly USB charging ports assembly for lighting device, consist of;
   At least one of USB charging-ports has minimum 1.0 A up to 5.0 Amp around DC 5 Volt or has desire combination for 1.0 A, 2.1 A, 1.2 A, 2.4 A, 3.1 A, 3.6 A, 4.2 A, 4.8 A or other combination for Big Amperage output-current to get quickly charger function and not overheat caused high voltage from transformer output-end to charge the battery.
   The USB charging ports only has charging function without any electric or digital data transmit or delivery.
   At least one of circuit-kits inside the outside housing or circuit-inner inside the lighting device housing and both incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.
   The $2^{nd}$ or more circuit-inside which inside the Light device's housing to supply the power to the said added functions beside the USB Charging-ports and the said $2^{nd}$ or more circuit-inside has electric parts & accessories or $2^{nd}$ transformer to get enough electric current which current needed is bigger than USB Charger needed to said plurality LEDs or plurality different color LEDs or other light source, dinner, switch, motion sensor, remote controller, PIR sensor, or Time display, alarm, controller, wireless communication device, wireless controller, IR photo diode, IP cam, or other market available electric functions to prevent from overheat by one of the transformer to supply the Big Amperage of current to Quickly USB Charging-port and the Plurality of different colors LEDs.

The said USB charging-port(s) is universal type can fit for all different USB-Wire at least one of plug(s) so can charge all different be-charged device (s).

The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

Hereafter, list other (16) features basing on all above listed inventor co-pending, earlier filed, patented text, drawing, idea.

123. From FIGS. 5P, 4P, 3P and FIG. 14P, 13P shown
A Power strip has separated and distance away UBS-unit(s), comprising;
At least one AC Outlet(s) and status indicator light fit within the power strip
At least one AC-to-DC circuit built-in power strip to change AC-plug wire input AC power to DC power and deliver pre-determined wattage DC from power strip power output end through at least one main-wire(s) to more than one of branch-wire(s) to desired number(s) of separated and distance away from power strip and others USB-unit(s).

124. A Power strip has separated and distance away UBS-unit(s) as discussion 123, at least one functional or decorative or treatment or finish item, device, products fit into at least one power strip or USB-unit(s).

125. A Power strip has separated and distance away UBS-unit(s) as discussion 123, power strip has at least one or more outlet incorporate with components or system selected from (i) surge or others protection, (ii) remote or wireless control system, (iii) LED area or status indicator illumination, (iv) a master power outlets (that controls all other outlets by causing the other outlets to follow the master), (v) sensor(s), (vi) remote controller, (vii) current leakage warning system, (viii) IC, (ix) wireless system, (x) wi-fi or Z-way or Zigbee or blue tooth system, and (xi) auto shut off system to provide the outlets with greater safety and convenient performance; to setting, adjusting, selecting, changing at least of light, illumination, power on/off, or other functions or effect(s).

126. A Power strip has separated and distance away UBS-unit(s) as discussion 123, the said power strip or USB-unit(s) has at least one USB-port(s) for input or output the DC power.

127. A Power strip has separated and distance away USB-unit(s) as discussion 123, the USB-unit(s) has built-in wire storage arrangement.

128. A Power strip has separated and distance away UBS-unit(s) as discussion 123, The power strip has at least one attachment selected from (i) a heavy weight, (ii) magnetic means, (iii) glue, (iv) double sided foam tape, (v) screws, (vi) a catch-n-hook fastener, (vii) Velcro tape, or (ix) other market-available skills or materials.

129. A Power strip has separated and distance away UBS-unit(s) as discussion 123, the female USB-port(s) built-in power strip or USB-unit(s) configure for male plug selected from (i) Type A (ii) Type C, (iii) Micro USB, (iv) lighting of Apple company, (v) android, (vi) one of market communication or tablet equipment, (vii) USB ports jump or connection wire with have 2 male plug (s).

130. A Power strip has separated and distance away UBS-unit(s) as discussion 123, the main wire is much shorter than branch-wire to save cost and power strip close the home outlet(s) and USB-unit(s) has enough length to arranged or attached or install on more than one location(s) such as desktop, side-bed table, bed frame, bed legs (two sides) so buy one power strips get plurality of location with USB-unit(s).

131. From FIGS. 4PP, 2PP, 23PP, 25PP, 14PP, 29PP, 26PP shown;
An LED lighting device for Desktop or floor installation has separated and distance away UBS-unit(s), comprising;
At least one (a) external transformer through output main wire, (b) external DC power source through USB wire; supply DC power for at least one light device and more than one USB-unit(s) separated and distance away from light device and other USB-unit (s).
At least one LED(s) offer at least one of area or status indicator; illumination.
At least one IC incorporate at least one of circuit or control system to make at least one of
(1) Color changing,
(2) color selection,
(3) function selections,
(4) brightness adjusting,
(5) on-off light.
At least one (A) main-wire(s) connected with external transformer, (B) USB wire(s) connect with external DC power source; to deliver pre-determined wattage DC power to more than one of branch-wire(s) to at least one of USB female port(s) built-in desired number(s) of separated and distance away from power strip and other USB-unit(s).

132. From FIG. 4, 4B, 5A, 5B, 5C, 5D, and FIGS. 4PP, 2PP, 23PP, 25PP, 14PP, 29PP, 26PP shown;
An LED lighting device for Desktop or floor installation has separated and distance away UBS-unit(s), comprising;
At least one built-in AC-to-DC circuit change home AC power to DC power to supply power to at least one (i) LED lighting and (ii) at least one USB-unit(s) which are separated and distance away from light device and other USB-unit(s).
At least one LED(s) offer at least one of area or status indicator; illumination.
At least one IC incorporate at least one of circuit or control system to make at least one of
(a) Color changing,
(b) color selection,
(c) function selections,
(d) brightness adjusting,
(e) on-off light.
At least one main-wire(s) connected with device to deliver pre-determined wattage DC power to more than one of branch-wire(s) to at least one of USB female port(s) built-in desired number(s) of USB-unit(s).

133. An LED lighting device for Desktop or floor installation has separated and distance away UBS-unit(s) as discussion 131 and 132, the female USB-port(s) built-in power strip or USB-unit(s) configure for male plug selected from (i) Type A (ii) Type C, (iii) Micro USB, (iv) lighting of Apple company, (v) android, (vi) one of market communication or tablet equipment, (vii) USB ports jump or connection wire with have 2 male plug (s).

134. An LED lighting device for Desktop or floor installation has separated and distance away UBS-unit(s) as discussion 131 and 132, the main-wire is shorter than branch-wire.

135. An LED light device for desktop or floor installation has separated and distance away UBS-unit(s) as discussion 131 and 132, at least one functional or decorative or treatment or finish item, device, products fit into at least one light device or USB-unit(s).

136. An LED light device for desktop or floor installation has separated and distance away UBS-unit(s) as discussion 131 and 132, the said LED light devise is one of (i) reading light, (ii) accent light, (iii) floor light, (iv) lighted mirror, (v) digital alarm clock, (vi) time related products, (vii) project image or patterns light, (viii) Lava or glitter light, (ix) steam, moisture, smell diffusor, (x) essential oil diffusor, (xi) color changing and color selection incorporated IC accent light, (xii) USB wire powered light, (xiii)

137. An LED light device for desktop or floor installation has separated and distance away UBS-unit(s) as discussion 131 and 132, the USB-unit(s) has enough length to arrange install not only light device location but also has plurality number to install on side-bed table, bed frame, bed legs, living room table, couch table, floor light levels, furniture flat areas or use attachment kits to tie or glue or hold on table legs, walls.

138. A plug-in LED light has separated and distance away USB-unit(s), comprising.
   At least one LED(s) to offer at least one area or status indicator; illumination.
   At least one AC-to-DC circuit built-in plug-in nigh light to change home AC power to DC power to supply to LED(s) and at least or more than one separated and distance away USB-unit(s).
   Wherein, LED light has at least one of electric parts or accessories selected from (i) circuit, (ii) IC, (iii) sensor(s), (iv) selection switch, (v) dimmer switch, (vi) power fail system, (vii) function selection system, (viii) photo sensor; to make pre-determined light function(s), effects(s), cycle(s), duration(s), color(s), brightness(s).
   At least one main-wire(s) connected with plug-in night light to deliver pre-determined wattage DC power to more than one of branch-wire(s) to at least one of USB female port(s) built-in desired number(s) of USB-unit(s).

The above 138 features for different MAIN DEVICE are fall within the PARENT Filing for desktop items definition which has functions as description as below: desk top item function means in said desk top item housing for providing at least one of the following functions: a display of light beams from the LED, projection, an image, projection of a time image, clock functions, illumination of an area, playing of music, serving as a source of power or electric signals, display of photos, transmission of digital signals, providing air flow at a desired temperature, generating moisture, steam, or smells, dispensing liquid, brewing coffee/tea, preparing food, and displaying charging status;

To enable people to easily reach, touch, operate, or manage the desk top items, the USB-unit(s) or USB-module(s) are installed on or within the item or a substrate(s). The items may be positioned at a location where people will stay for a period, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is appreciated all the above discussion, background, brief, details description or alternative, replaceable, equal function, similar concept for quickly USB Charing-port which has initial public specification to overcome the overheating, overcome problem cause while had electric or digital data delivery, overcome only can charge one certain be-charged device because the USB port has male plug with custom-pin arrangement which not fit for variety of the be-charged device(s) so cause big return for not universal, or the more than 2 power source input to the same USB port which will make cost increased and consumer confused with expensive circuit board, so the current inventions same as the parent filing cases as above listed and has the minimum 1.0 Amp to 5 Amp or higher with safety USB charging-ports which can allow Big current passing though without heat problems to prevent overheating and cause the unit risk to fire and quickly charging capacity to save people waiting time is the most important than the charger from out-of-date 500 ma slow charger. The desktop items, lighting items, image items, lighted cosmetic mirror items, digital alarm clock, power station on desktop or any other more application as the parent filing case covered should be still fall within the current invention.

I claim:

1. An LED lighting device, comprising:
   a housing;
   at least one USB charging unit included in the housing for supplying charging power to an external device;
   an AC outlet included in the housing;
   at least one LED included in the housing; and
   a USB input wire extending from the housing of the LED lighting device,
   wherein the USB input wire includes a USB plug configured to fit into a USB outlet of an external device for supplying power from the external device to the AC outlet and the at least one LED.

2. An LED lighting device as claimed in claim 1, wherein the LED lighting device is one of a reading light, accent light, floor light, lighted mirror, digital alarm clock, clock or timer, projection light, lava or glitter light, lighting device with a steam, moisture, or smell diffuser, lighting device with an essential oil diffusor, accent or night light with IC-controlled color changing and color selection, or light device controlled by motion, a sensor, radar, IR, RF, Wi-Fi, or a wireless controller.

3. An LED lighting device as claimed in claim 1, wherein the wire extending from a housing of the LED lighting device enables arrangement or installation of either the lighting device or the charging unit on one or more of a bedside table, bed frame, bed leg, living room table, couch table, floor light stand or frame, shelf, flat furniture surface, or another surface, by an attachment kit, tie, glue, or holder.

\* \* \* \* \*